(12) United States Patent
Fullerton et al.

(10) Patent No.: US 7,772,952 B2
(45) Date of Patent: Aug. 10, 2010

(54) METHOD FOR CODING FIELD EMISSION STRUCTURES USING A CODING COMBINATION

(75) Inventors: Larry W. Fullerton, New Hope, AL (US); Mark D. Roberts, Huntsville, AL (US); James L. Richards, Fayetteville, TN (US)

(73) Assignee: Cedar Ridge Research, LLC, New Hope, AL (US)

( * ) Notice: Subject to any disclaimer, the term of this patent is extended or adjusted under 35 U.S.C. 154(b) by 0 days.

(21) Appl. No.: 12/479,501

(22) Filed: Jun. 5, 2009

(65) Prior Publication Data

US 2010/0045414 A1 Feb. 25, 2010

Related U.S. Application Data

(63) Continuation of application No. 12/358,423, filed on Jan. 23, 2009, which is a continuation-in-part of application No. 12/123,718, filed on May 20, 2008.

(60) Provisional application No. 61/123,019, filed on Apr. 4, 2008.

(51) Int. Cl.
*H01F 7/02* (2006.01)
(52) U.S. Cl. ...................................... 335/306; 335/285
(58) Field of Classification Search ................ 335/285, 335/302–306; 24/303; 310/80, 103, 90.5, 310/308, 309
See application file for complete search history.

(56) References Cited

U.S. PATENT DOCUMENTS

| | | | |
|---|---|---|---|
| 381,968 A | 5/1888 | Tesla | |
| 493,858 A | 3/1893 | Edison | |
| 996,933 A | 7/1911 | Lindquist | |
| 1,236,234 A | 8/1917 | Troje | |
| 2,389,298 A | 11/1945 | Ellis | |
| 2,570,625 A | 10/1951 | Zimmerman et al. | |
| 2,722,617 A | 11/1955 | Cluwen et al. | |
| 2,932,545 A | 4/1960 | Foley | |
| 3,102,314 A | 9/1963 | Alderfer | |
| 3,208,296 A | 9/1965 | Baermann | |
| 3,288,511 A | 11/1966 | Tavano | |

(Continued)

FOREIGN PATENT DOCUMENTS

FR 823395 1/1938

(Continued)

OTHER PUBLICATIONS http://www.schmersalusa.com/safety_controllers/drawings/aes.pdf.

(Continued)

*Primary Examiner*—Ramon M Barrera
(74) *Attorney, Agent, or Firm*—Venable LLP; Robert S. Babayi

(57) ABSTRACT

An improved field emission system and method is provided that involves field emission structures having electric or magnetic field sources. The magnitudes, polarities, and positions of the magnetic or electric field sources are configured to have desirable correlation properties, which may be in accordance with a code. The correlation properties correspond to a desired spatial force function where spatial forces between field emission structures correspond to relative alignment, separation distance, and the spatial force function.

20 Claims, 60 Drawing Sheets

U.S. PATENT DOCUMENTS

| | | | |
|---|---|---|---|
| 3,468,576 | A | 9/1969 | Beyer et al |
| 3,474,366 | A | 10/1969 | Barney |
| 3,696,258 | A | 10/1972 | Anderson et al. |
| 3,802,034 | A | 4/1974 | Bookless |
| 3,845,430 | A | 10/1974 | Petkewicz et al. |
| 4,079,558 | A | 3/1978 | Forham |
| 4,222,489 | A | 9/1980 | Hutter |
| 4,453,294 | A | 6/1984 | Morita |
| 4,535,278 | A | 8/1985 | Asakawa |
| 4,547,756 | A | 10/1985 | Miller et al. |
| 4,629,131 | A | 12/1986 | Podell |
| 4,941,236 | A | 7/1990 | Sherman et al. |
| 5,050,276 | A | 9/1991 | Pemberton |
| 5,367,891 | A | 11/1994 | Furuyama |
| 5,383,049 | A | 1/1995 | Carr |
| 5,495,221 | A | 2/1996 | Post |
| 5,512,732 | A | 4/1996 | Yagnik et al. |
| 5,631,093 | A | 5/1997 | Perry et al. |
| 5,631,618 | A | 5/1997 | Trumper et al. |
| 6,072,251 | A | 6/2000 | Markle |
| 6,170,131 | B1 | 1/2001 | Shin |
| 6,275,778 | B1 | 8/2001 | Shimada et al. |
| 6,285,097 | B1 | 9/2001 | Hazelton et al. |
| 6,457,179 | B1 | 10/2002 | Prendergast |
| 6,467,326 | B1 | 10/2002 | Garrigus |
| 6,607,304 | B1 | 8/2003 | Lake et al. |
| 6,720,698 | B2 | 4/2004 | Galbraith |
| 6,847,134 | B2 | 1/2005 | Frissen et al. |
| 6,862,748 | B2 | 3/2005 | Prendergast |
| 6,927,657 | B1 | 8/2005 | Wu |
| 6,971,147 | B2 | 12/2005 | Halstead |
| 7,031,160 | B2 | 4/2006 | Tillotson |
| 7,066,778 | B2 | 6/2006 | Kretzschmar |
| 7,362,018 | B1 | 4/2008 | Kulogo et al. |
| 7,444,683 | B2 | 11/2008 | Prendergast et al. |
| 2004/0003487 | A1 | 1/2004 | Reiter |
| 2004/0244636 | A1 | 12/2004 | Meadow et al. |
| 2005/0102802 | A1 | 5/2005 | Sitbon et al. |
| 2006/0066428 | A1 | 3/2006 | McCarthy et al. |
| 2006/0189259 | A1 | 8/2006 | Park et al. |
| 2006/0214756 | A1 | 9/2006 | Elliott et al. |
| 2006/0290451 | A1 | 12/2006 | Prendergast et al. |
| 2008/0181804 | A1 | 7/2008 | Tanigawa et al. |
| 2008/0186683 | A1 | 8/2008 | Ligtenberg et al. |
| 2008/0272868 | A1 | 11/2008 | Prendergast et al. |
| 2008/0282517 | A1 | 11/2008 | Claro |
| 2009/0021333 | A1 | 1/2009 | Fiedler |

FOREIGN PATENT DOCUMENTS

WO    WO 2007081830 A2 *    7/2007

OTHER PUBLICATIONS http://www.farnell.com/datasheets/36449.pdf.
http://www.schmersalusa.com/catalog_pdfs/BNS_B20.pdf.
http://www.schmersalusa.com/machine_guarding/coded_magnet/drawings/bns333.pdf.
International Search Report and Written Opinion dated May 14, 2009, issued in corresponding Int'l Application No. PCT/US2009/038925.

* cited by examiner

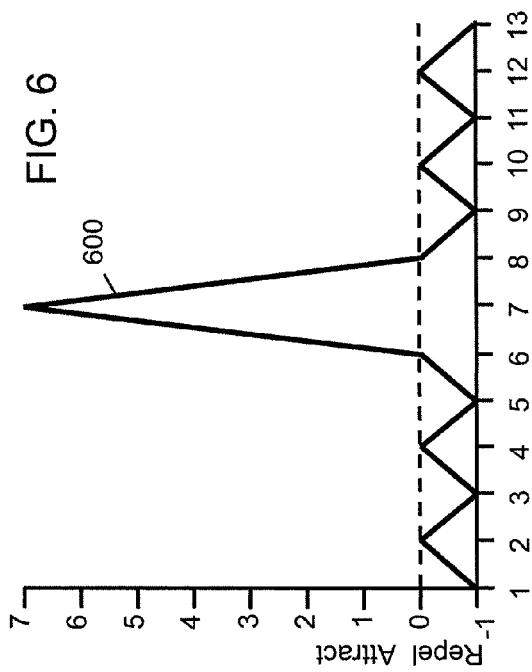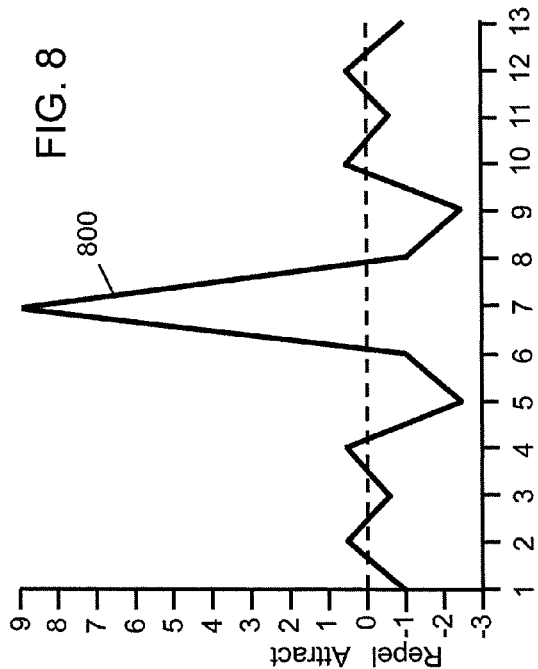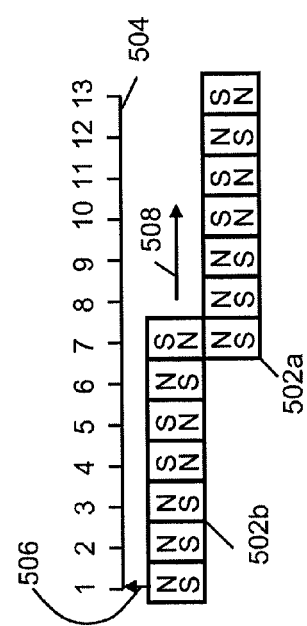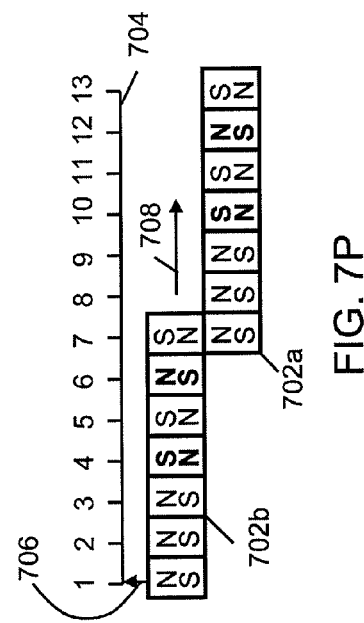

FIG. 9A  Barker - 7 code = +1 +1 +1 −1 −1 +1 −1

FIG. 11A Barker-7 code = +1 +1 +1 -1 -1 +1 -1

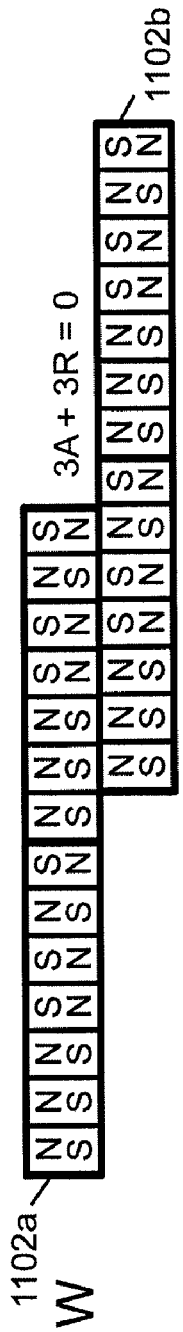
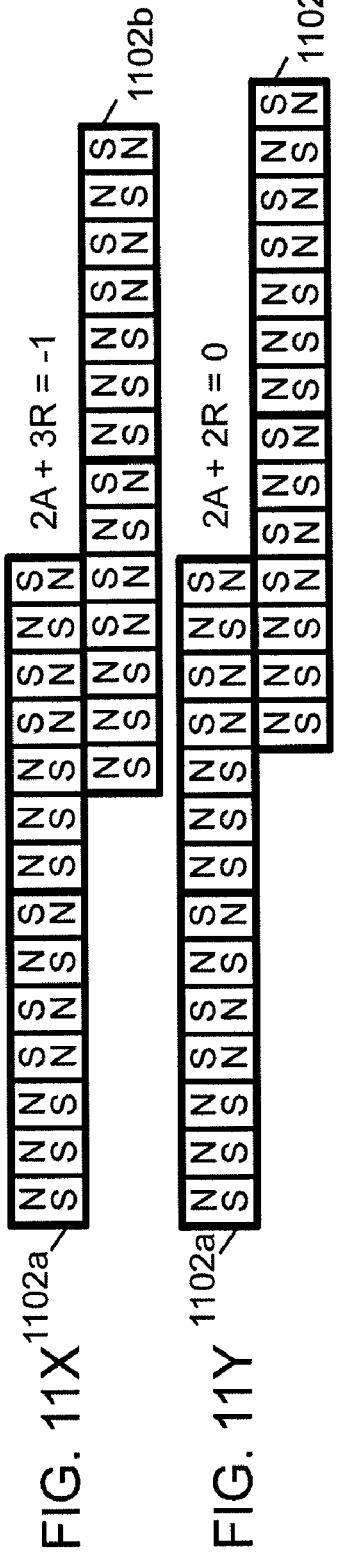
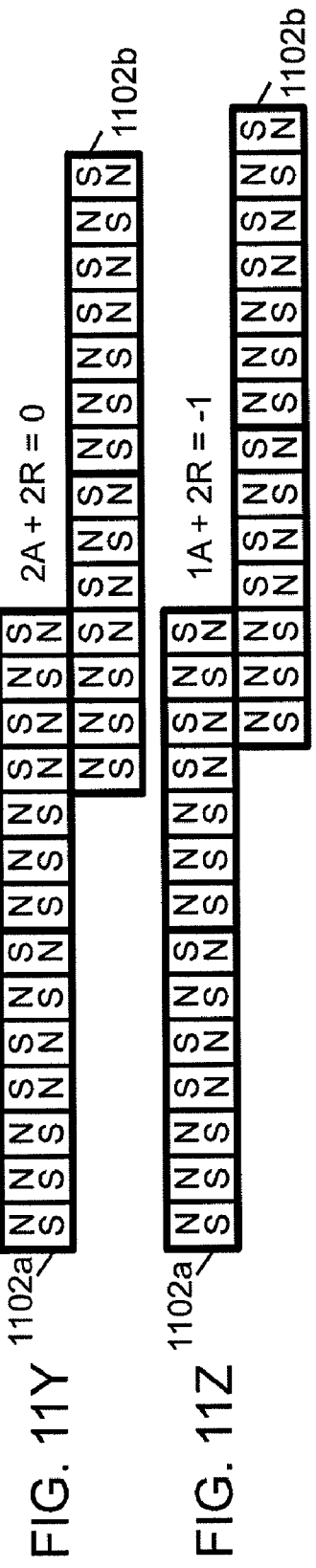
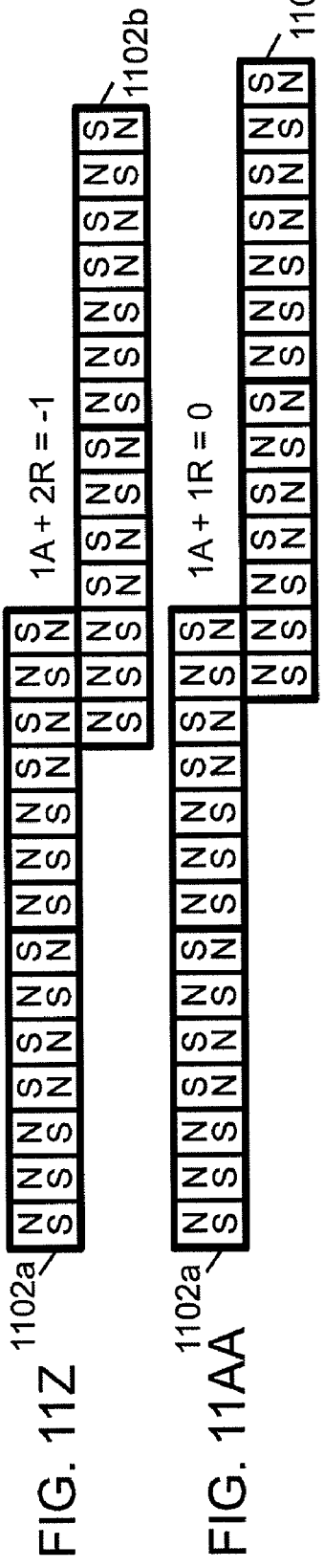
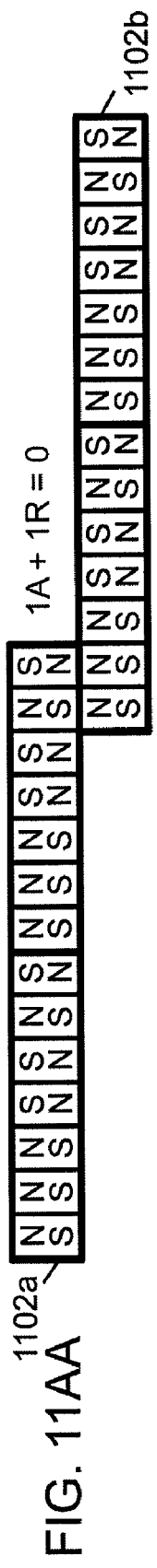
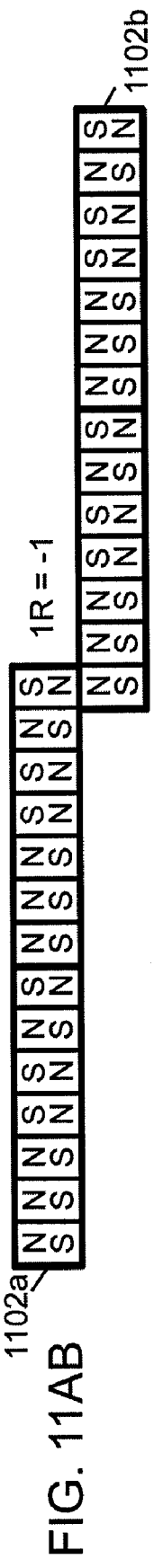
FIG. 11W  FIG. 11X  FIG. 11Y  FIG. 11Z  FIG. 11AA  FIG. 11AB FIG. 13A
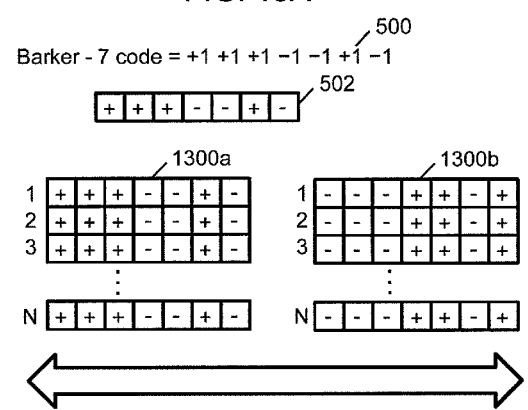
FIG. 13B
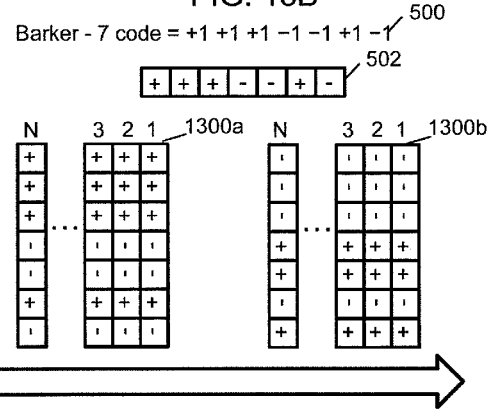
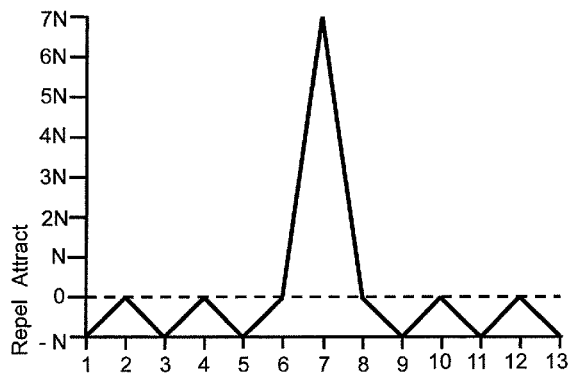
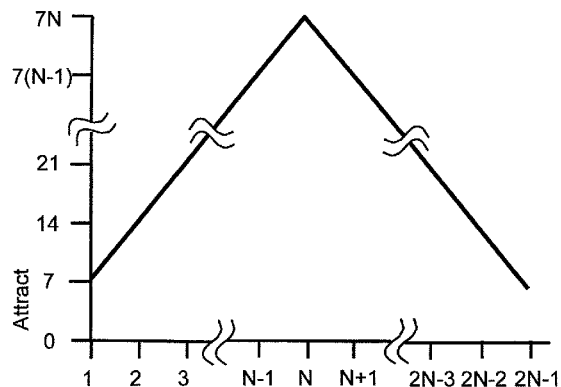

Barker 7x7 wrapped code:

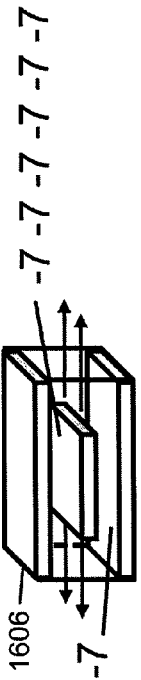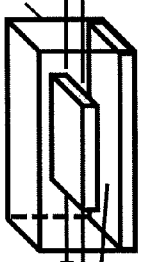
FIG. 16A

FIG. 16B

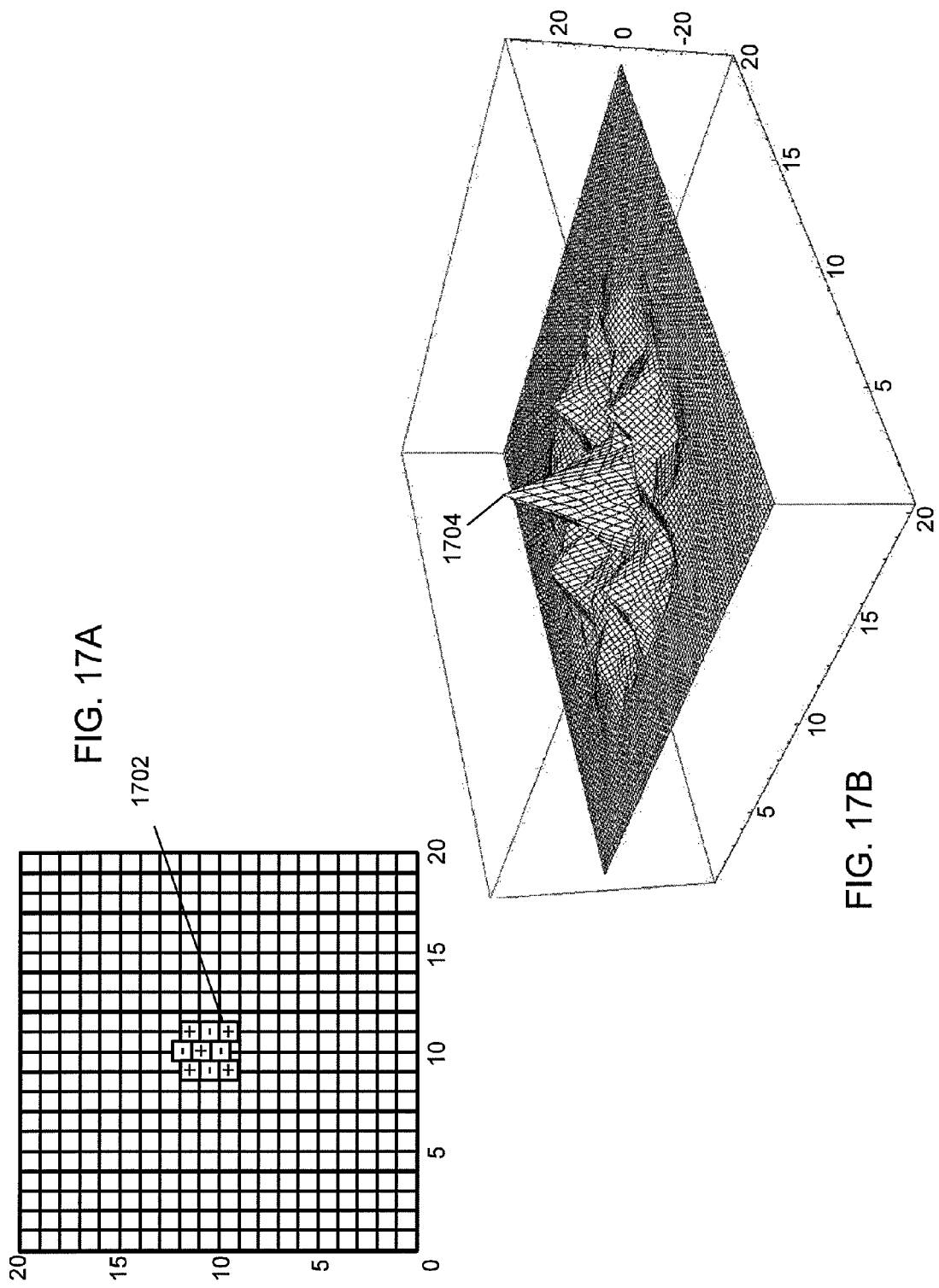

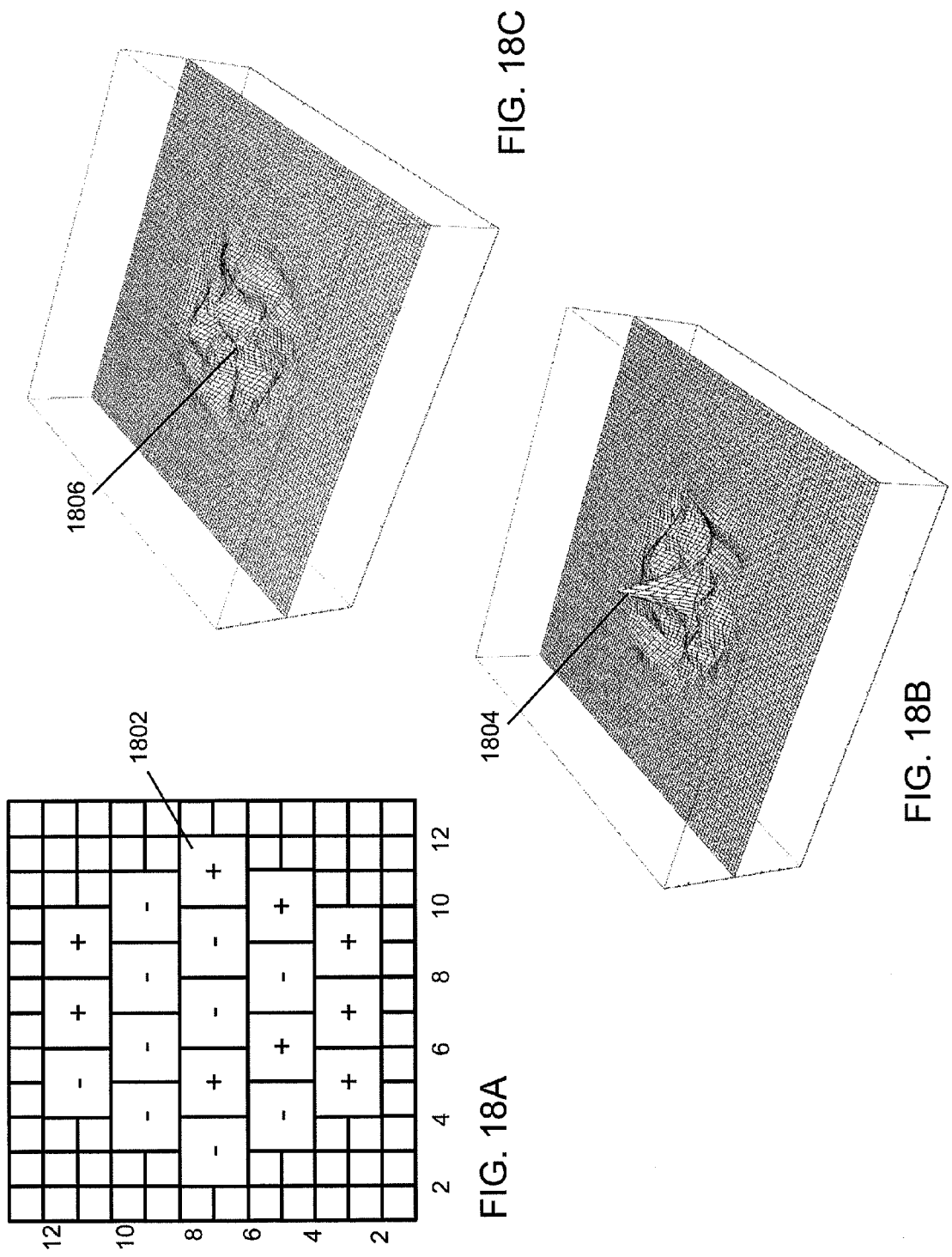

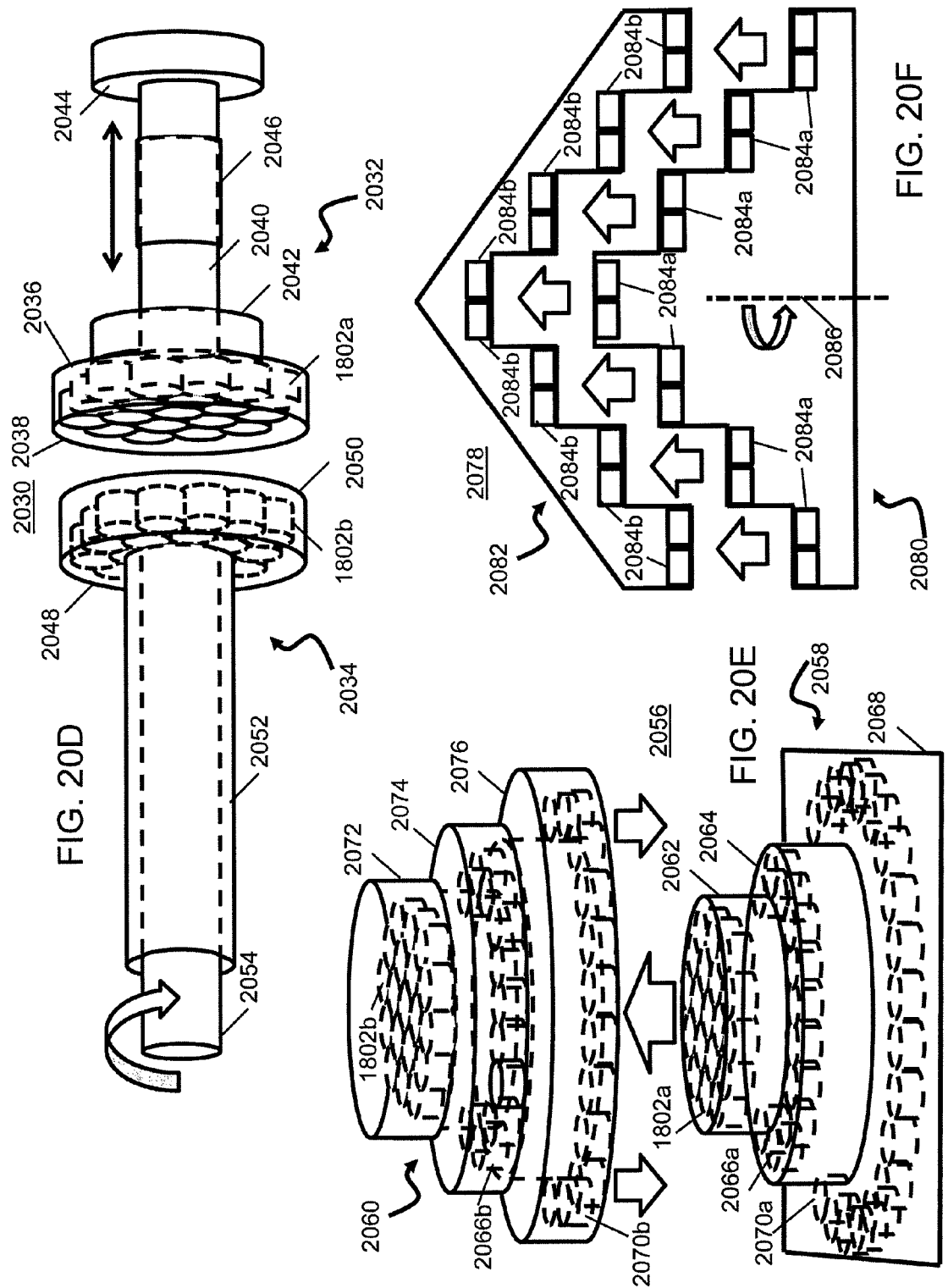

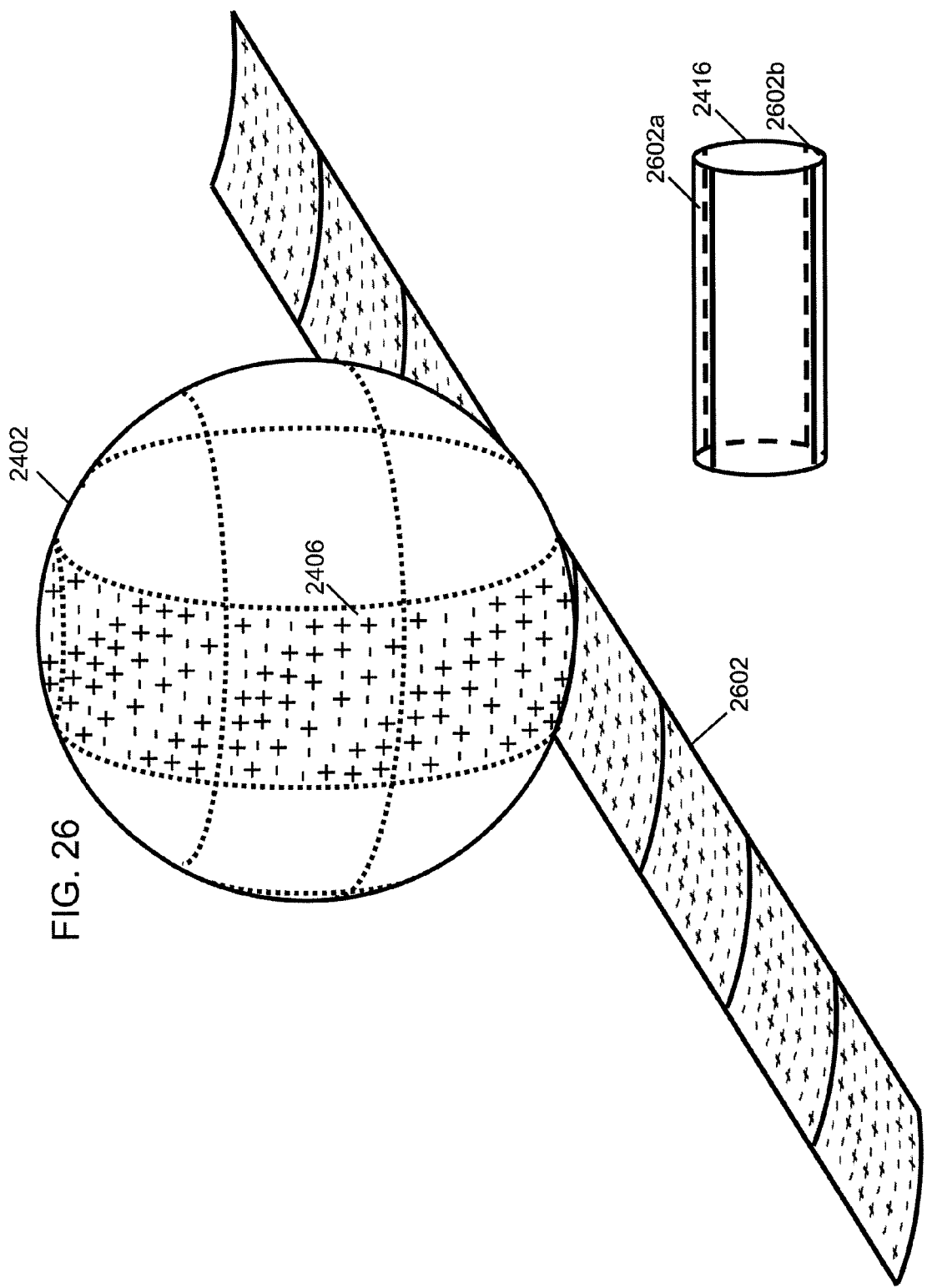

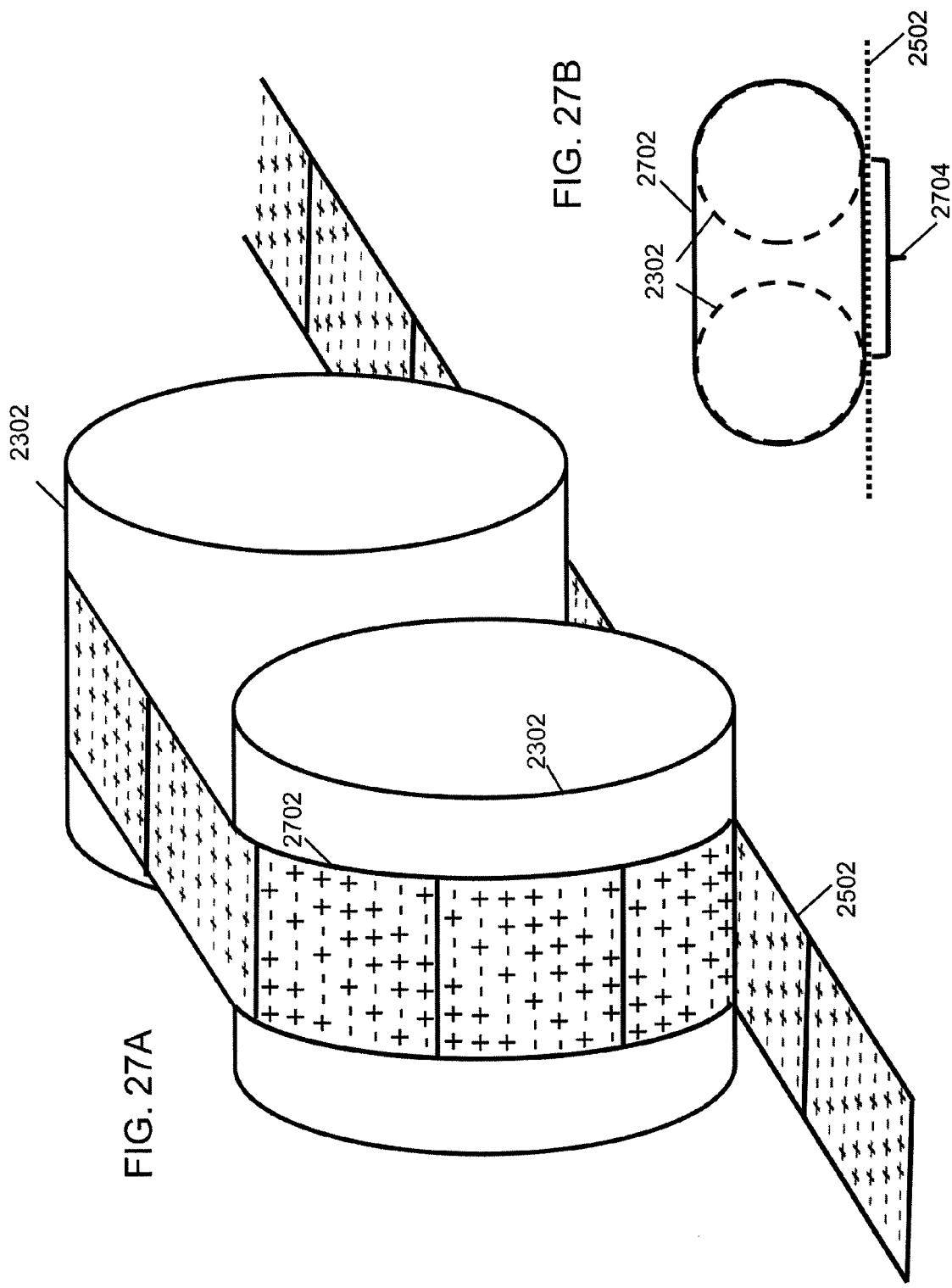

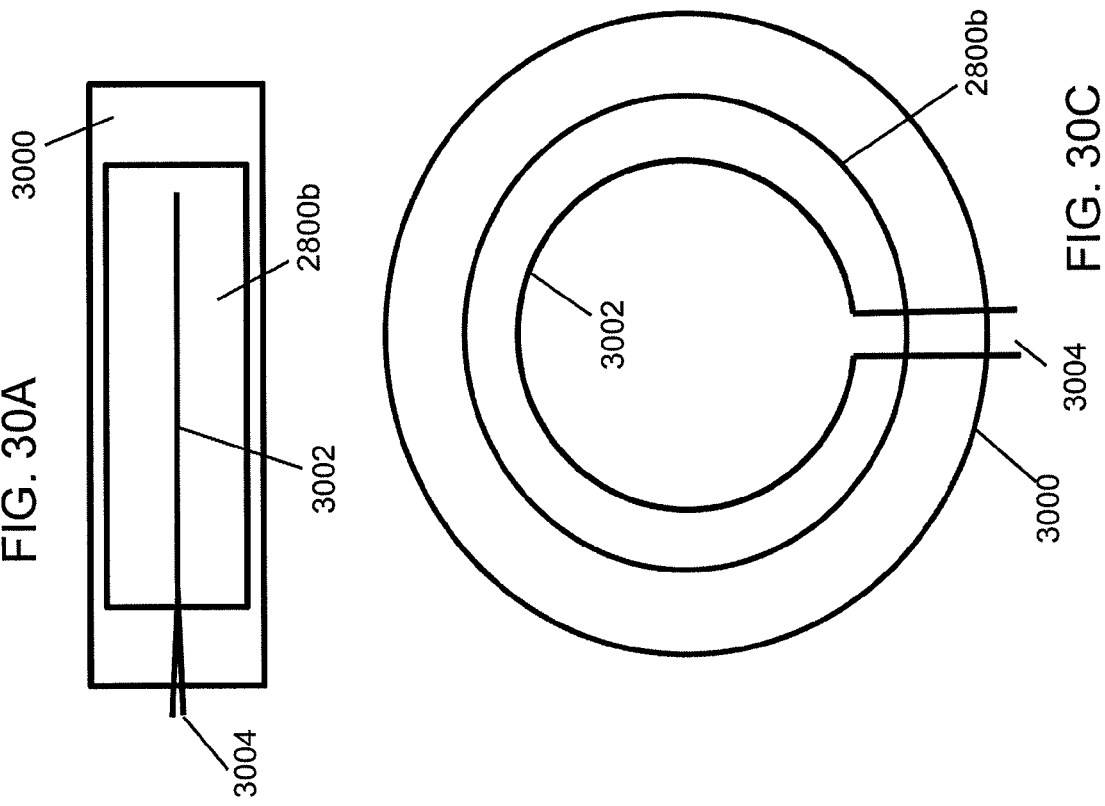
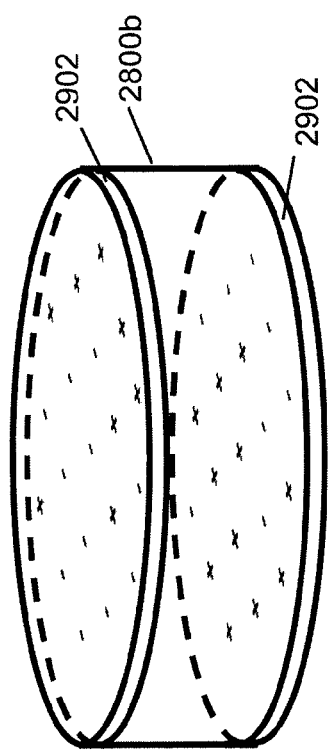
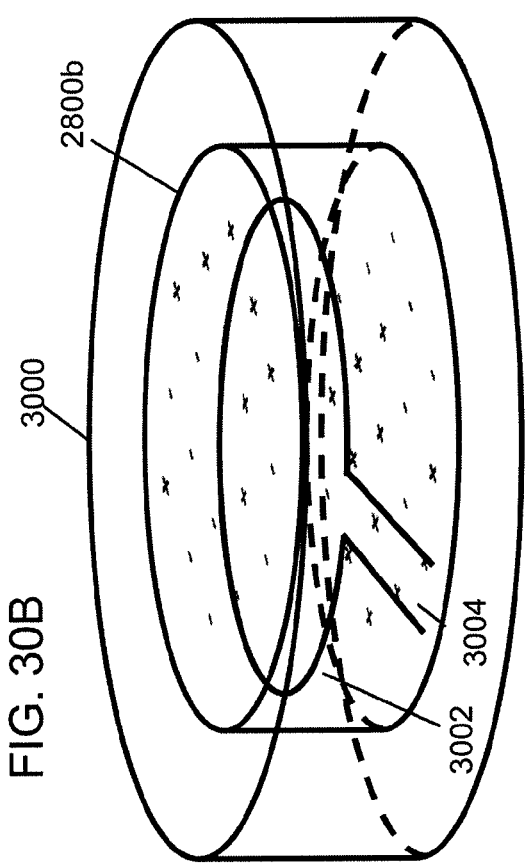

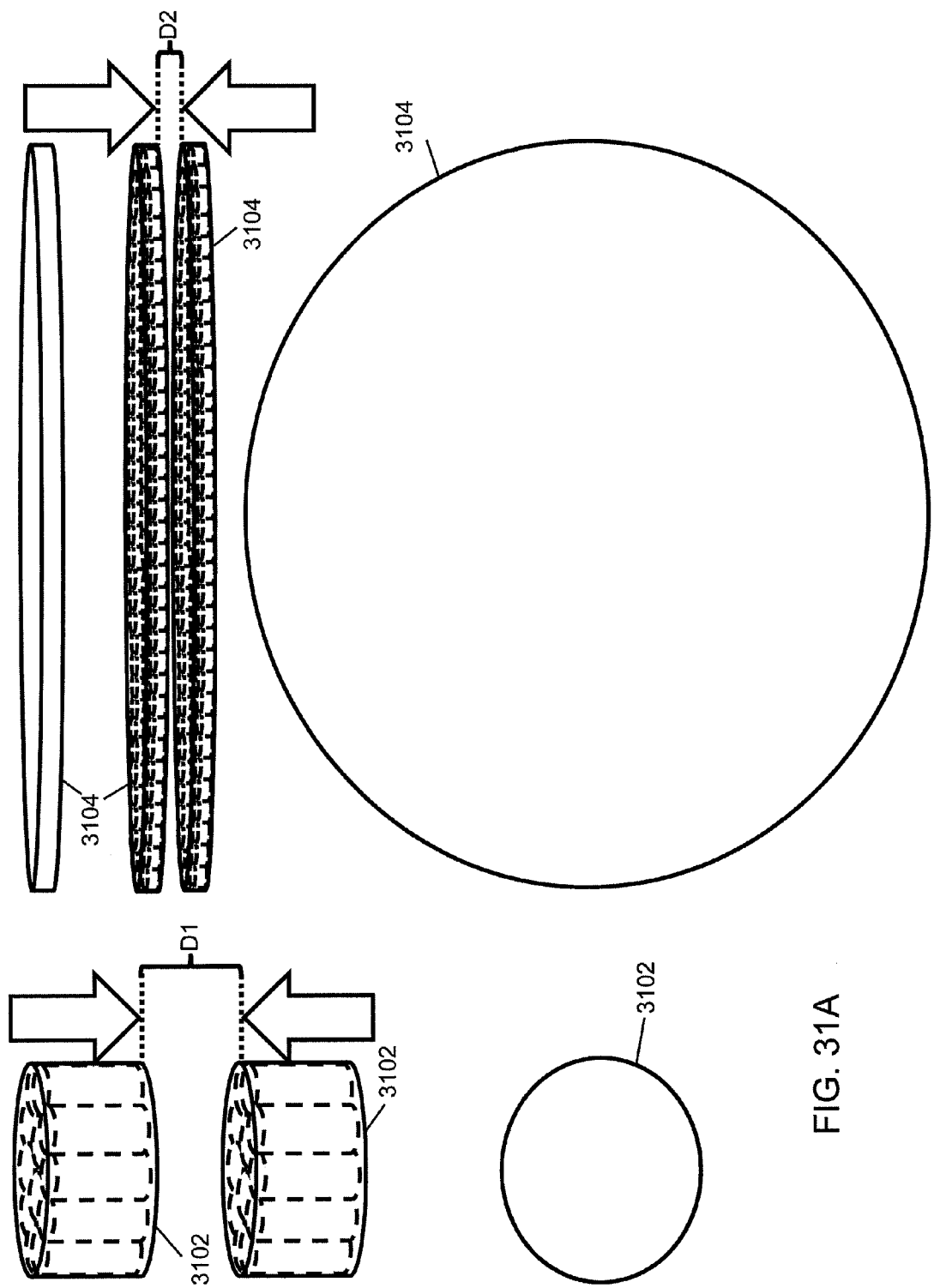

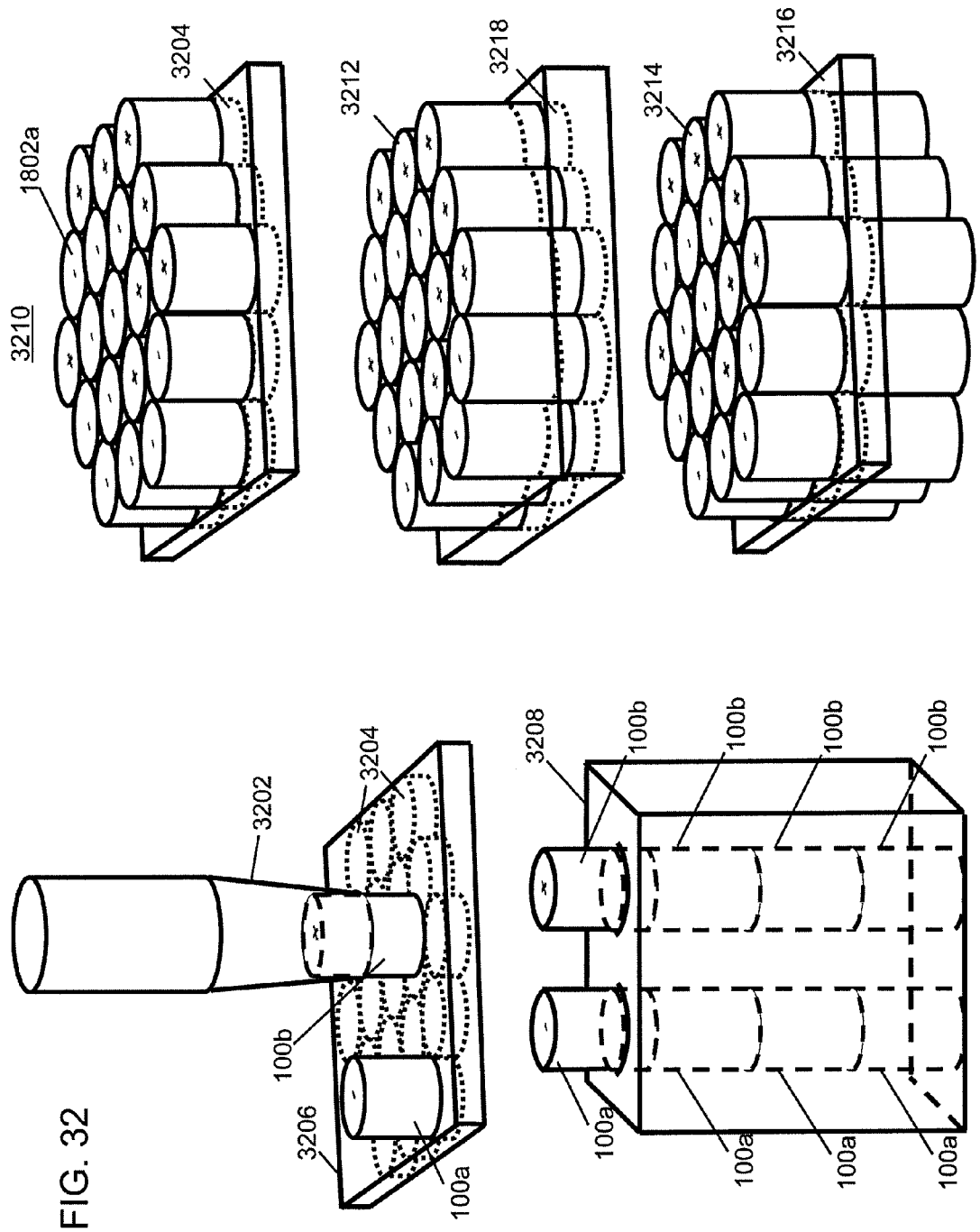

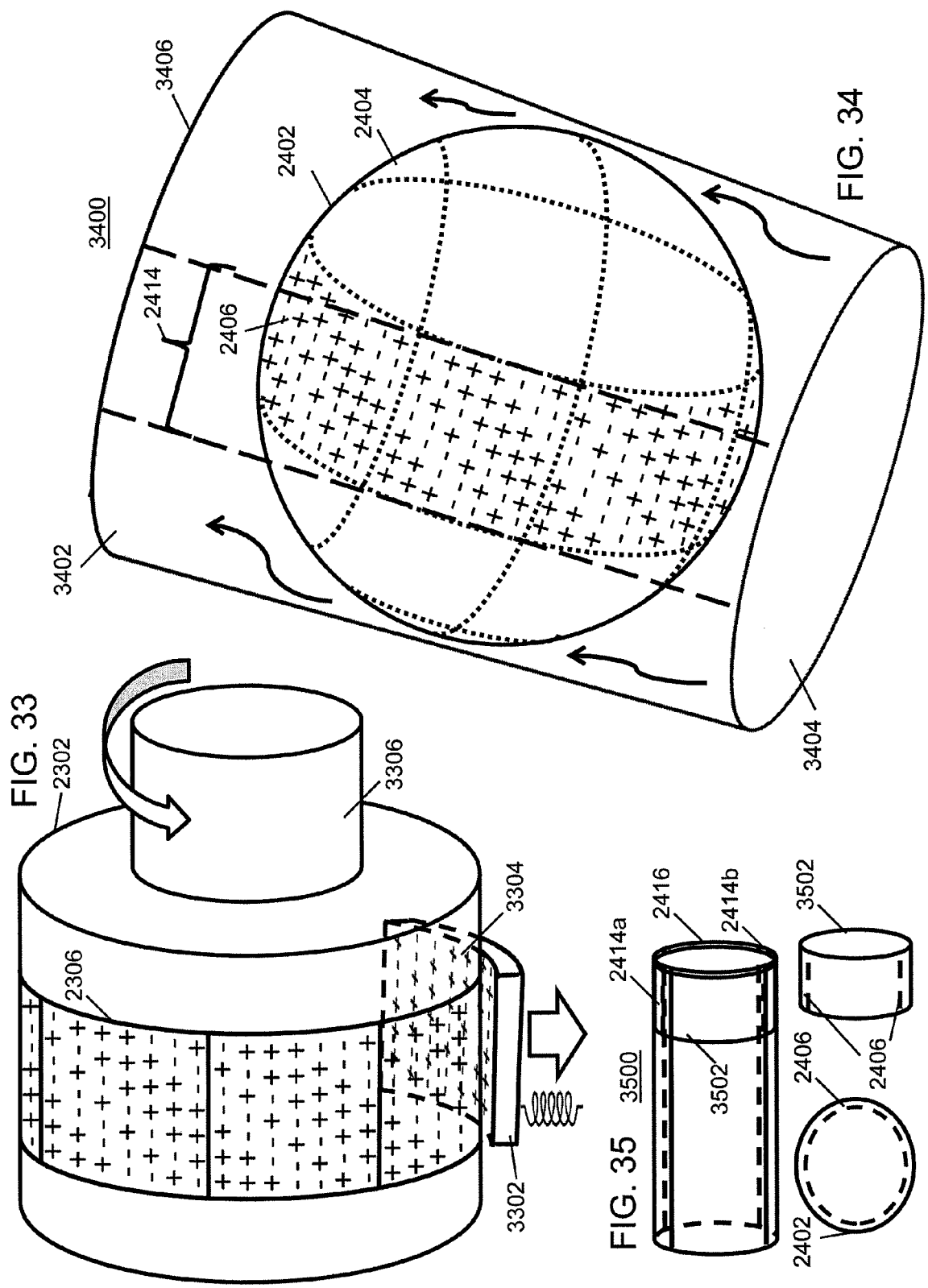

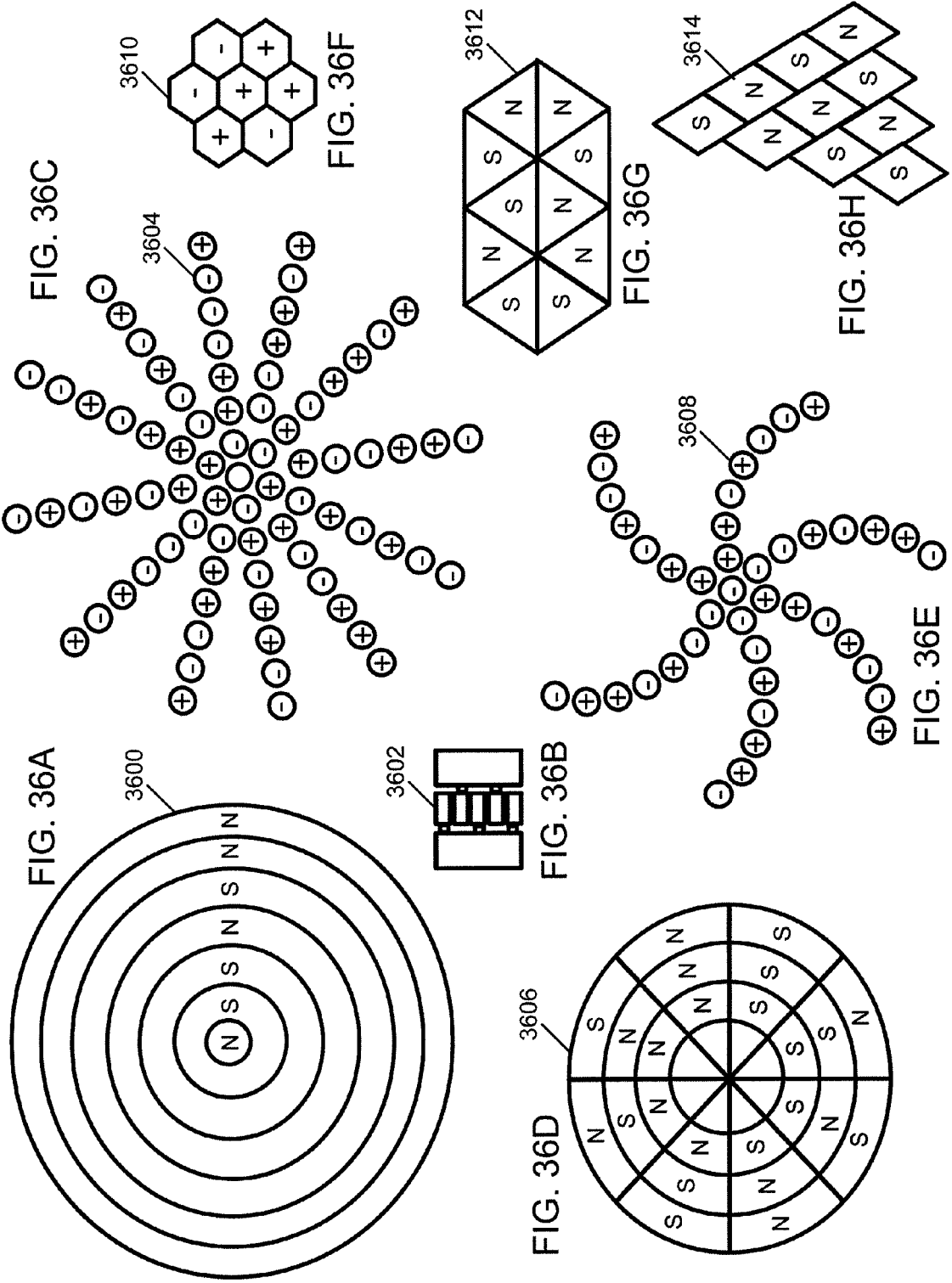

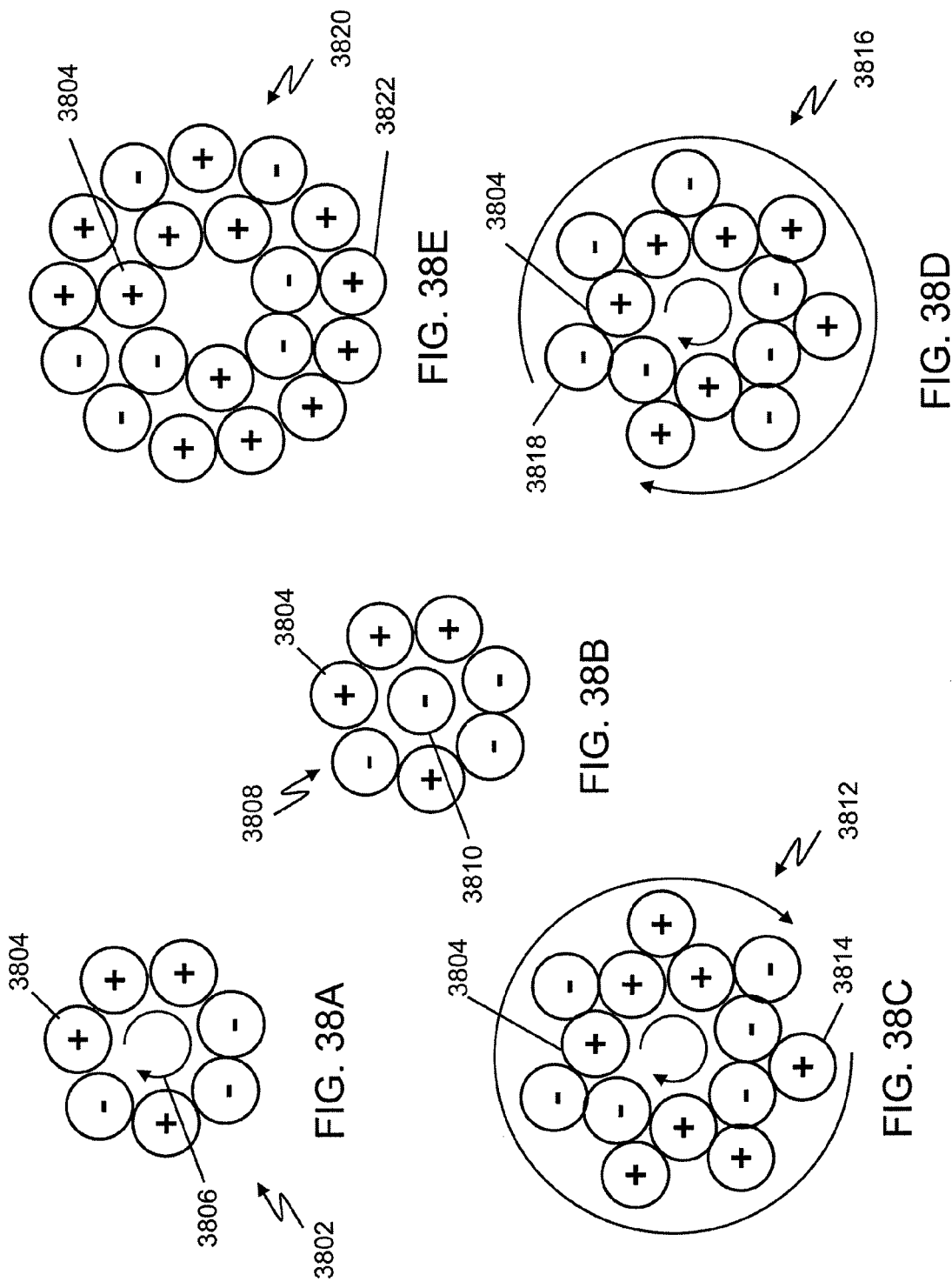

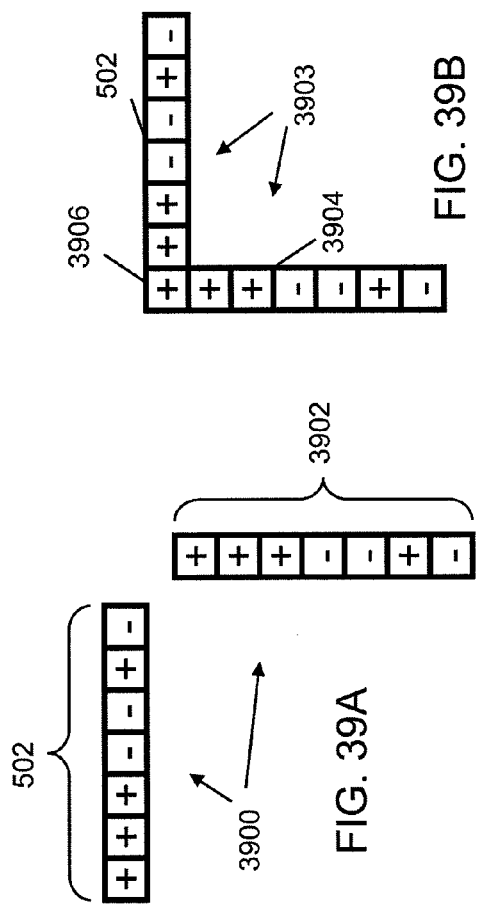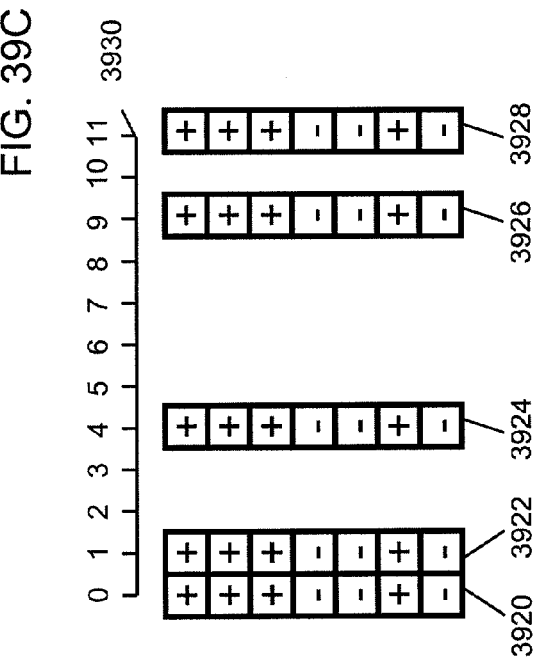
FIG. 39A
FIG. 39B
FIG. 39C
FIG. 39D
FIG. 39E

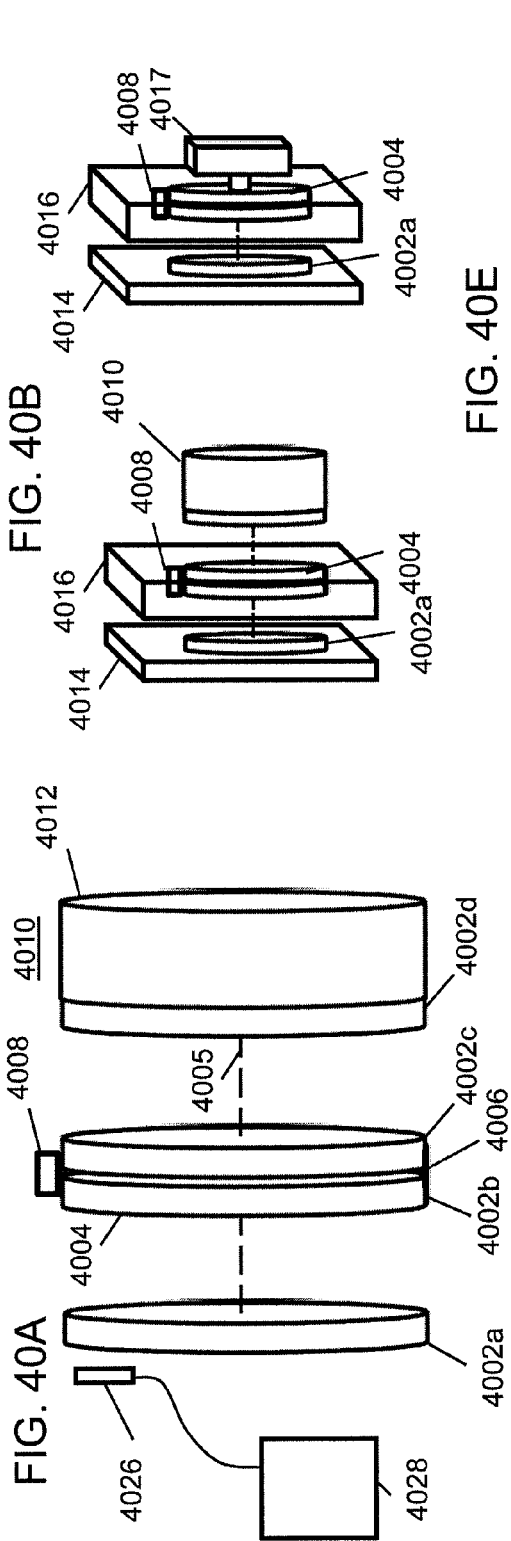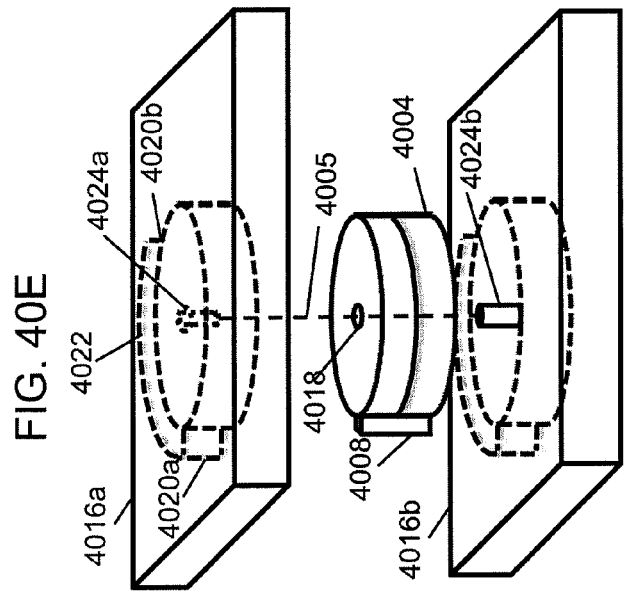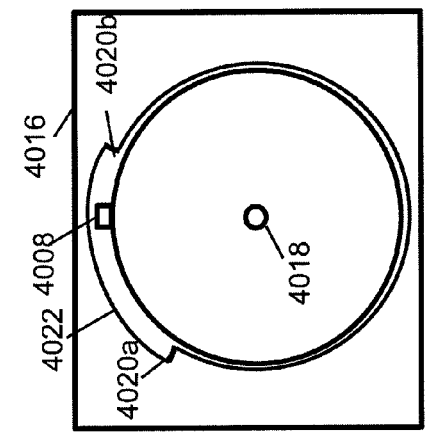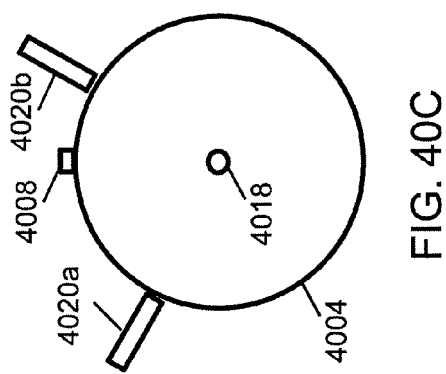

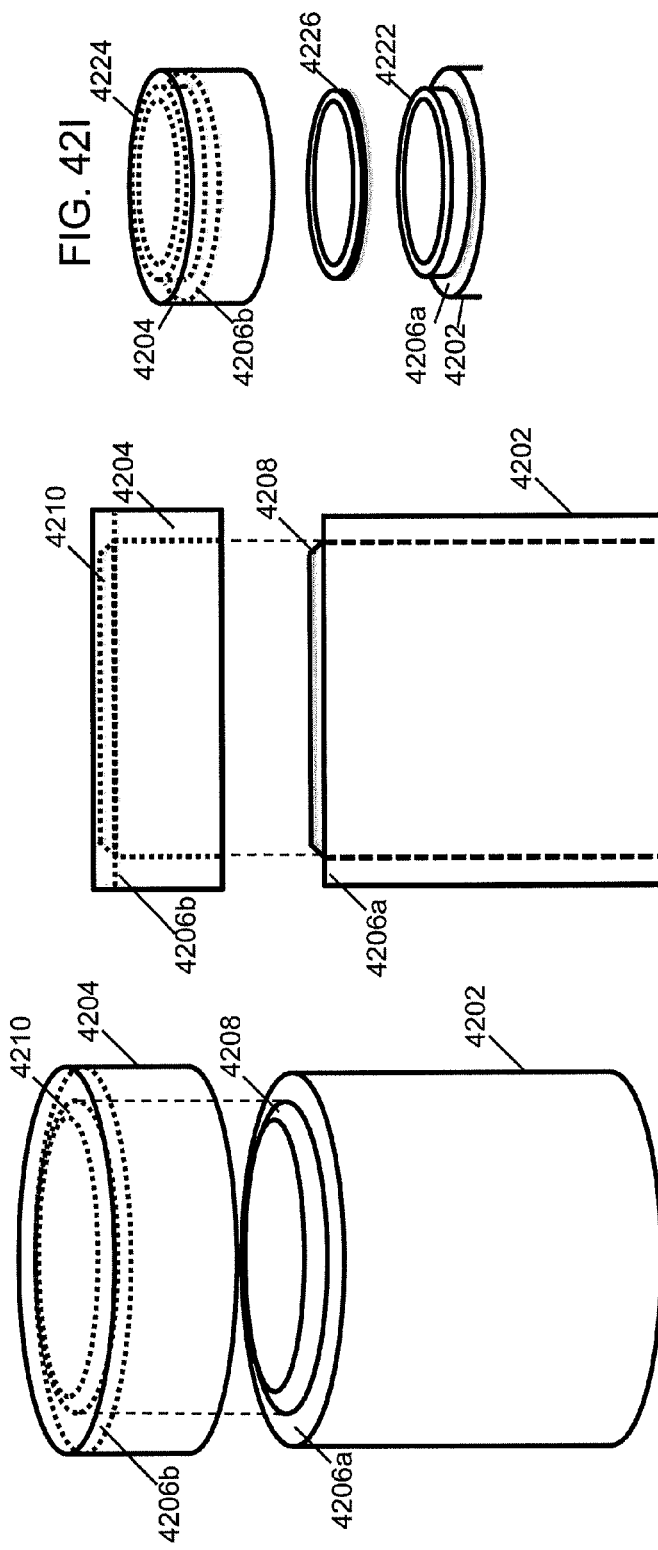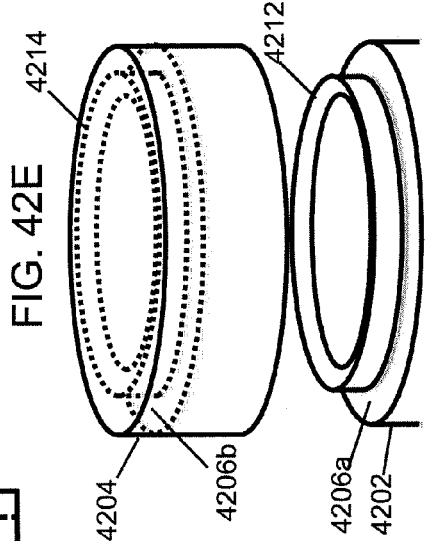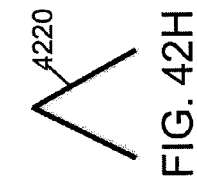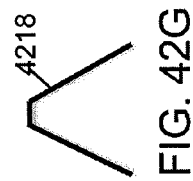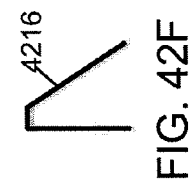

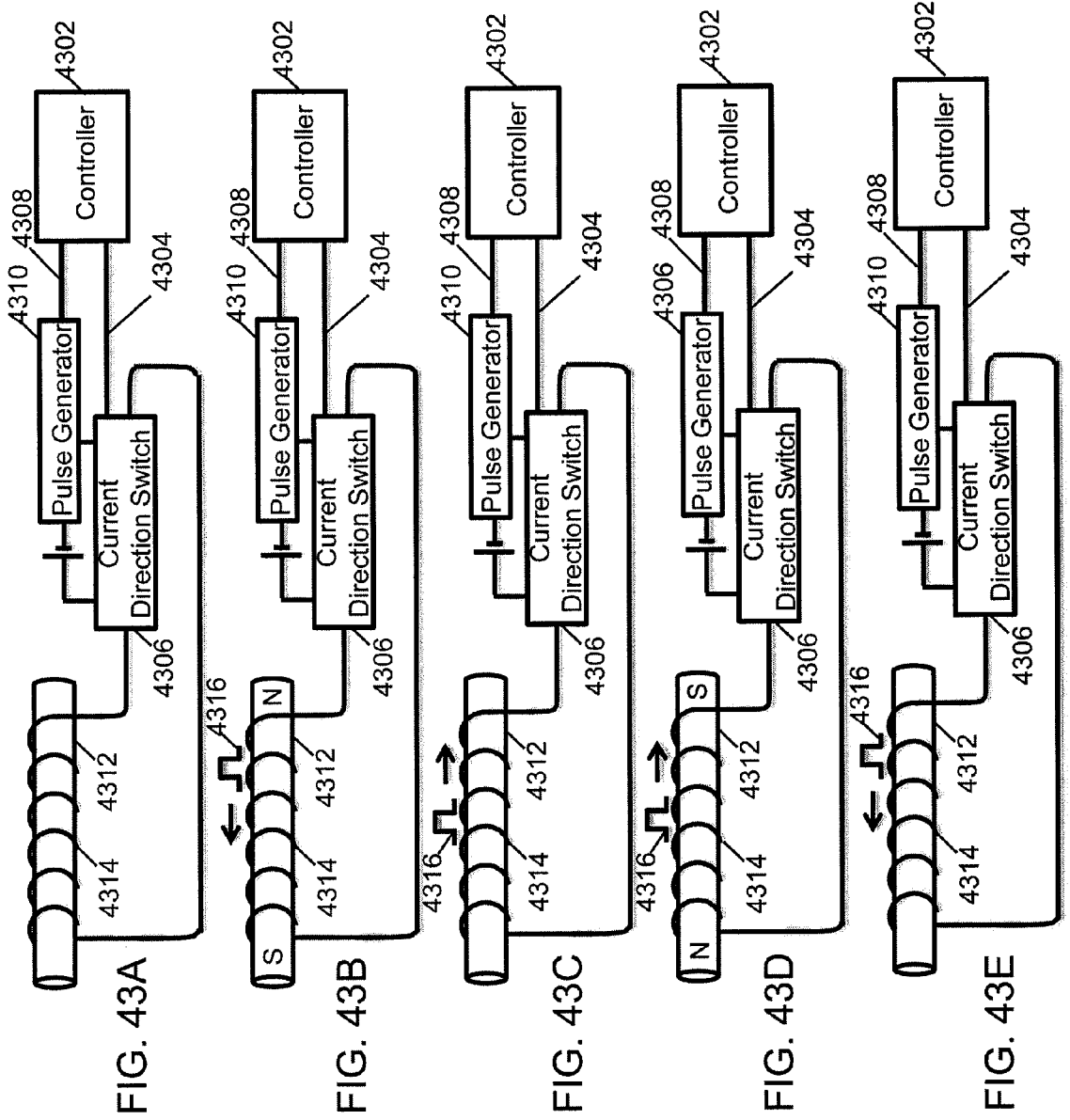

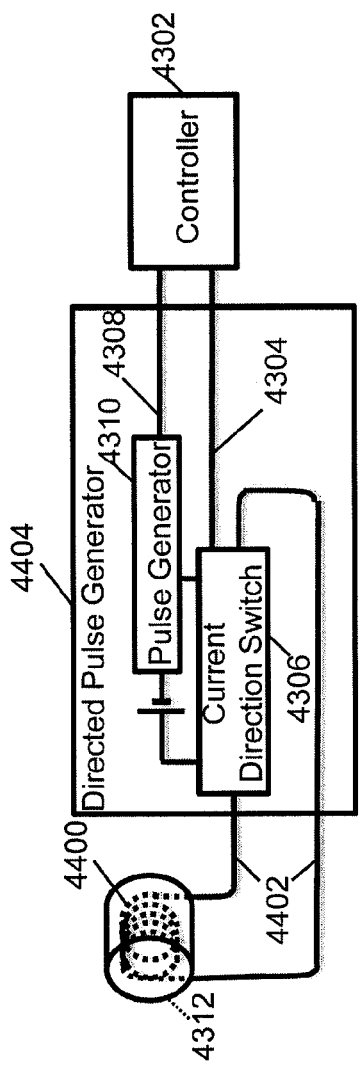
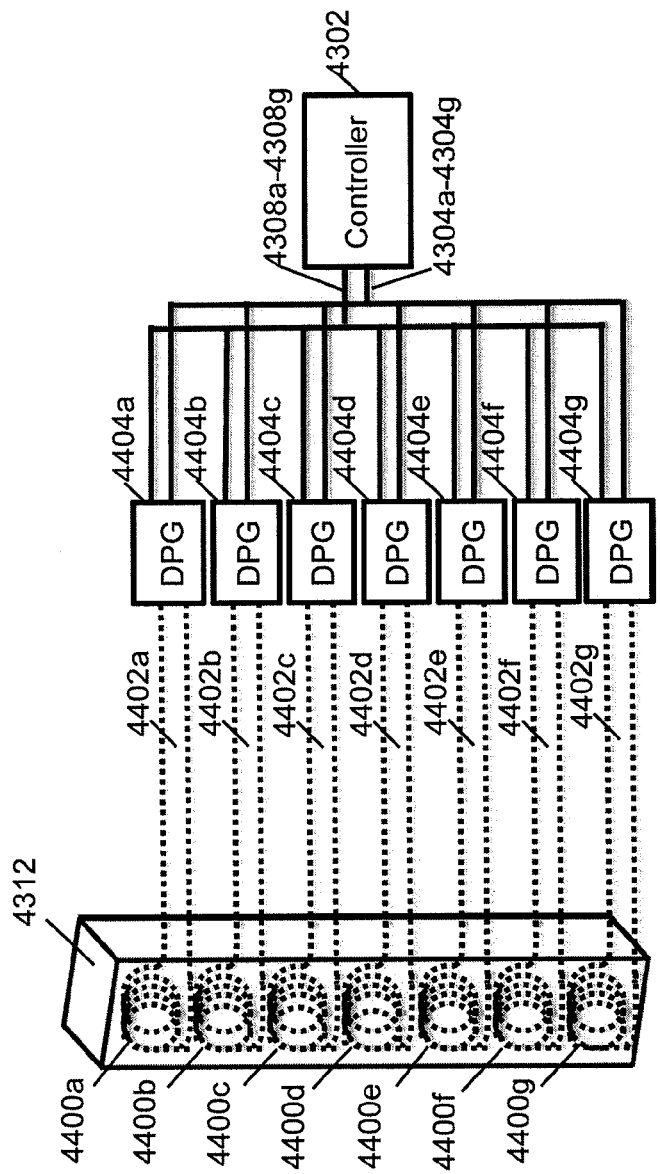
FIG. 44A
FIG. 44B

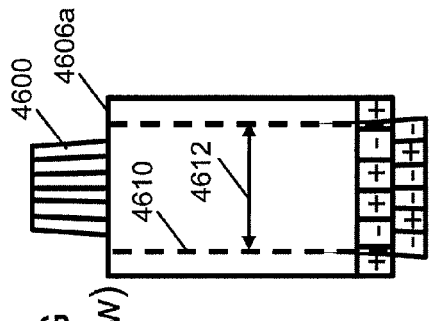
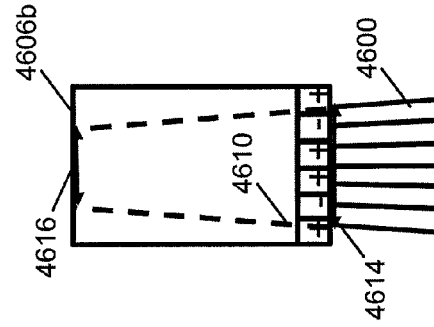
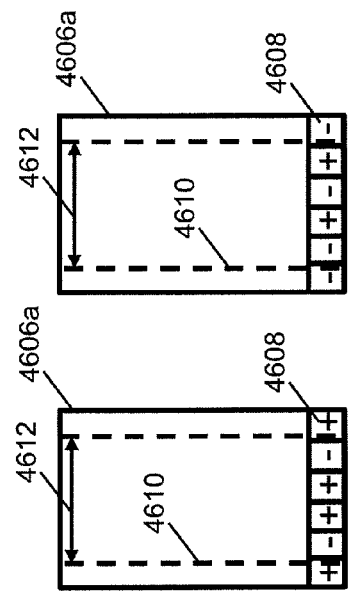
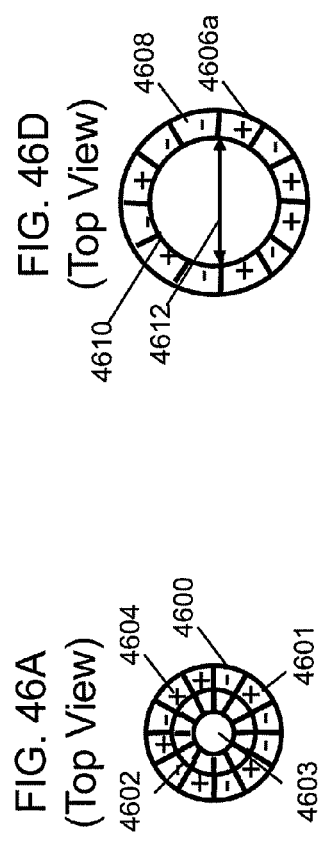
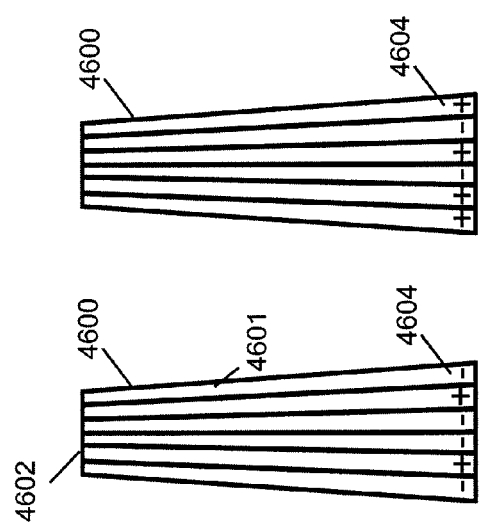

FIG. 47A, FIG. 47B, FIG. 47C

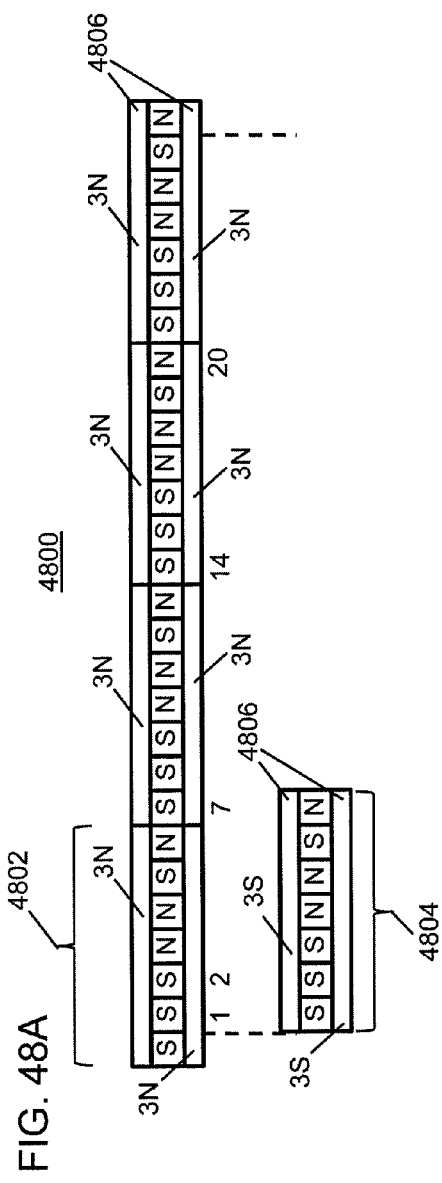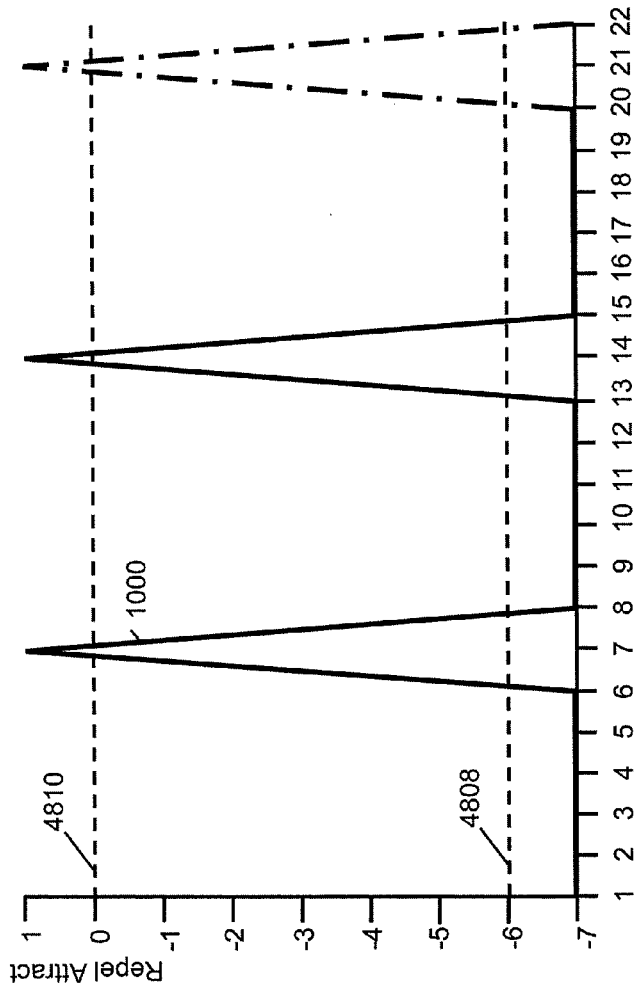
FIG. 48A
FIG. 48B

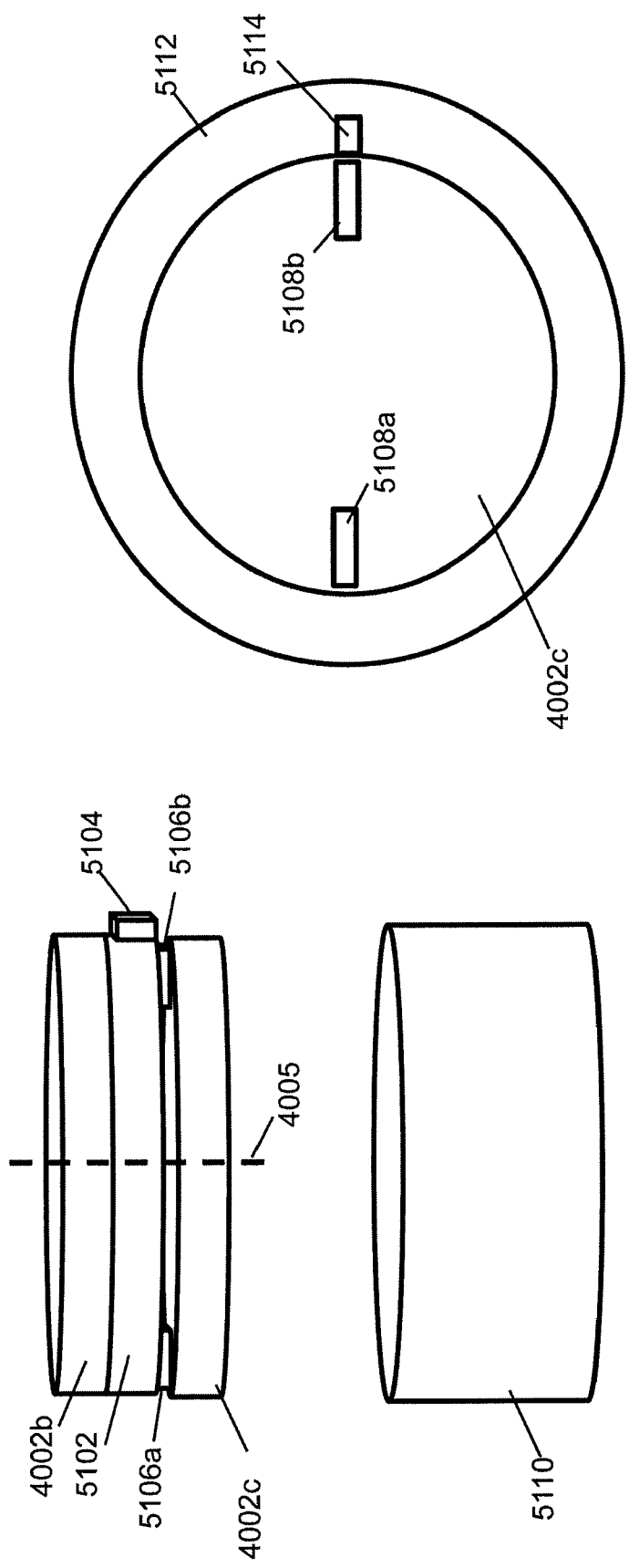

METHOD FOR CODING FIELD EMISSION STRUCTURES USING A CODING COMBINATION

CROSS-REFERENCE TO RELATED APPLICATIONS

This Non-provisional Application is a continuation of Non-provisional application Ser. No. 12/358,423, filed Jan. 23, 2009, titled "A Field Emission System and Method", which is a continuation-in-part of Non-provisional application Ser. No. 12/123,718, filed May 20, 2008, titled "A Field Emission System and Method", which claims the benefit of U.S. Provisional Application Ser. No. 61/123,019, filed Apr. 4, 2008, titled "A Field Emission System and Method", which is incorporated by reference herein in its entirety.

FIELD OF THE INVENTION

The present invention relates generally to a field emission system and method. More particularly, the present invention relates to a system and method where correlated magnetic and/or electric field structures create spatial forces in accordance with the relative alignment of the field emission structures and a spatial force function.

BACKGROUND OF THE INVENTION

Alignment characteristics of magnetic fields have been used to achieve precision movement and positioning of objects. A key principle of operation of an alternating-current (AC) motor is that a permanent magnet will rotate so as to maintain its alignment within an external rotating magnetic field. This effect is the basis for the early AC motors including the "Electro Magnetic Motor" for which Nikola Tesla received U.S. Pat. No. 381,968 on May 1, 1888. On Jan. 19, 1938, Marius Lavet received French Patent 823,395 for the stepper motor which he first used in quartz watches. Stepper motors divide a motor's full rotation into a discrete number of steps. By controlling the times during which electromagnets around the motor are activated and deactivated, a motor's position can be controlled precisely. Computer-controlled stepper motors are one of the most versatile forms of positioning systems. They are typically digitally controlled as part of an open loop system, and are simpler and more rugged than closed loop servo systems. They are used in industrial high speed pick and place equipment and multi-axis computer numerical control (CNC) machines. In the field of lasers and optics they are frequently used in precision positioning equipment such as linear actuators, linear stages, rotation stages, goniometers, and mirror mounts. They are used in packaging machinery, and positioning of valve pilot stages for fluid control systems. They are also used in many commercial products including floppy disk drives, flatbed scanners, printers, plotters and the like.

Although alignment characteristics of magnetic fields are used in certain specialized industrial environments and in a relatively limited number of commercial products, their use for precision alignment purposes is generally limited in scope. For the majority of processes where alignment of objects is important, e.g., residential construction, comparatively primitive alignment techniques and tools such as a carpenter's square and a level are more commonly employed. Moreover, long trusted tools and mechanisms for attaching objects together such as hammers and nails; screw drivers and screws; wrenches and nuts and bolts; and the like, when used with primitive alignment techniques result in far less than precise residential construction, which commonly leads to death and injury when homes collapse, roofs are blown off in storms, etc. Generally, there is considerable amount of waste of time and energy in most of the processes to which the average person has grown accustomed that are a direct result of imprecision of alignment of assembled objects. Machined parts wear out sooner, engines are less efficient resulting in higher pollution, buildings and bridges collapse due to improper construction, and so on.

It has been discovered that various field emission properties can be put in use in a wide range of applications.

SUMMARY OF THE INVENTION

Briefly, the present invention is an improved field emission system and method. The invention pertains to field emission structures comprising electric or magnetic field sources having magnitudes, polarities, and positions corresponding to a desired spatial force function where a spatial force is created based upon the relative alignment of the field emission structures and the spatial force function. The invention herein is sometimes referred to as correlated magnetism, correlated field emissions, correlated magnets, coded magnets, coded magnetism, or coded field emissions. Structures of magnets arranged in accordance with the invention are sometimes referred to as coded magnet structures, coded structures, field emission structures, magnetic field emission structures, and coded magnetic structures. Structures of magnets arranged conventionally (or 'naturally') where their interacting poles alternate are referred to herein as non-correlated magnetism, non-correlated magnets, non-coded magnetism, non-coded magnets, non-coded structures, or non-coded field emissions.

In accordance with one embodiment of the invention, a field emission system comprises a first field emission structure and a second field emission structure. The first and second field emission structures each comprise an array of field emission sources each having positions and polarities relating to a desired spatial force function that corresponds to the relative alignment of the first and second field emission structures within a field domain. The positions and polarities of each field emission source of each array of field emission sources can be determined in accordance with at least one correlation function. The at least one correlation function can be in accordance with at least one code. The at least one code can be at least one of a pseudorandom code, a deterministic code, or a designed code. The at least one code can be a one dimensional code, a two dimensional code, a three dimensional code, or a four dimensional code.

Each field emission source of each array of field emission sources has a corresponding field emission amplitude and vector direction determined in accordance with the desired spatial force function, where a separation distance between the first and second field emission structures and the relative alignment of the first and second field emission structures creates a spatial force in accordance with the desired spatial force function. The spatial force comprises at least one of an attractive spatial force or a repellant spatial force. The spatial force corresponds to a peak spatial force of said desired spatial force function when said first and second field emission structures are substantially aligned such that each field emission source of said first field emission structure substantially aligns with a corresponding field emission source of said second field emission structure. The spatial force can be used to produce energy, transfer energy, move an object, affix an object, automate a function, control a tool, make a sound, heat an environment, cool an environment, affect pressure of an environment, control flow of a fluid, control flow of a gas, and control centrifugal forces.

Under one arrangement, the spatial force is typically about an order of magnitude less than the peak spatial force when the first and second field emission structures are not substantially aligned such that field emission source of the first field emission structure substantially aligns with a corresponding field emission source of said second field emission structure.

A field domain corresponds to field emissions from the array of first field emission sources of the first field emission structure interacting with field emissions from the array of second field emission sources of the second field emission structure.

The relative alignment of the first and second field emission structures can result from a respective movement path function of at least one of the first and second field emission structures where the respective movement path function is one of a one-dimensional movement path function, a two-dimensional movement path function or a three-dimensional movement path function. A respective movement path function can be at least one of a linear movement path function, a non-linear movement path function, a rotational movement path function, a cylindrical movement path function, or a spherical movement path function. A respective movement path function defines movement versus time for at least one of the first and second field emission structures, where the movement can be at least one of forward movement, backward movement, upward movement, downward movement, left movement, right movement, yaw, pitch, and or roll. Under one arrangement, a movement path function would define a movement vector having a direction and amplitude that varies over time.

Each array of field emission sources can be one of a one-dimensional array, a two-dimensional array, or a three-dimensional array. The polarities of the field emission sources can be at least one of North-South polarities or positive-negative polarities. At least one of the field emission sources comprises a magnetic field emission source or an electric field emission source. At least one of the field emission sources can be a permanent magnet, an electromagnet, an electro-permanent magnet, an electret, a magnetized ferromagnetic material, a portion of a magnetized ferromagnetic material, a soft magnetic material, or a superconductive magnetic material. At least one of the first and second field emission structures can be at least one of a back keeper layer, a front saturable layer, an active intermediate element, a passive intermediate element, a lever, a latch, a swivel, a heat source, a heat sink, an inductive loop, a plating nichrome wire, an embedded wire, or a kill mechanism. At least one of the first and second field emission structures can be a planer structure, a conical structure, a cylindrical structure, a curve surface, or a stepped surface.

In accordance with another embodiment of the invention, a method of controlling field emissions comprises defining a desired spatial force function corresponding to the relative alignment of a first field emission structure and a second field emission structure within a field domain and establishing, in accordance with the desired spatial force function, a position and polarity of each field emission source of a first array of field emission sources corresponding to the first field emission structure and of each field emission source of a second array of field emission sources corresponding to the second field emission structure.

In accordance with a further embodiment of the invention, a field emission system comprises a first field emission structure comprising a plurality of first field emission sources having positions and polarities in accordance with a first correlation function and a second field emission structure comprising a plurality of second field emission source having positions and polarities in accordance with a second correlation function, the first and second correlation functions corresponding to a desired spatial force function, the first correlation function complementing the second correlation function such that each field emission source of said plurality of first field emission sources has a corresponding counterpart field emission source of the plurality of second field emission sources and the first and second field emission structures will substantially correlate when each of the field emission source counterparts are substantially aligned.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 5a depicts a Barker length 7 code used to determine polarities and positions of magnets making up a magnetic field emission structure where all of the magnets have the same field strength;

FIGS. 5b-5o depict exemplary alignments of complementary magnetic field structures;

FIG. 5p provides an alternative method of depicting exemplary alignments of the complementary magnetic field structures of FIGS. 5b-5o;

FIG. 6 depicts the binary autocorrelation function of a Barker length 7 code;

FIG. 7a depicts a Barker length 7 code used to determine polarities and positions of magnets making up a first magnetic field emission structure where two of the magnets have different field strengths;

FIGS. 7b-7o depict exemplary alignments of complementary magnetic field structures;

FIG. 7p provides an alternative method of depicting exemplary alignments of the complementary magnetic field structures of FIGS. 7b-7o;

FIG. 8 depicts an exemplary spatial force function of the two magnetic field emission structures of FIGS. 7b-7o and FIG. 7p;

FIG. 9a depicts exemplary code wrapping of a Barker length 7 code that is used to determine polarities and positions of magnets making up a first magnetic field emission structure;

FIGS. 9b-9o depict exemplary alignments of complementary magnetic field structures;

FIGS. 11b through 11ab depict 27 different alignments of two magnetic field emission structures like that of FIG. 11a;

FIG. 11ac provides an alternative method of depicting exemplary alignments of the complementary magnetic field structures of FIGS. 11b-11ab;

FIG. 13a depicts an exemplary spatial force function of magnetic field emission structures produced by repeating a one-dimensional code across a second dimension N times where movement is across the code;

FIG. 13b depicts an exemplary spatial force function of magnetic field emission structures produced by repeating a one-dimensional code across a second dimension N times where movement maintains alignment with up to all N coded rows of the structure and down to one;

FIG. 14a depicts a two dimensional Barker-like code and a corresponding two-dimensional magnetic field emission structure;

FIG. 15 depicts exemplary one-way slide lock codes and two-way slide lock codes;

FIG. 16a depicts an exemplary hover code and corresponding magnetic field emission structures that never achieve substantial alignment;

FIG. 16b depicts another exemplary hover code and corresponding magnetic field emission structures that never achieve substantial alignment;

FIG. 17a depicts an exemplary magnetic field emission structure comprising nine magnets positioned such that they half overlap in one direction;

FIG. 17b depicts the spatial force function of the magnetic field emission structure of FIG. 17a interacting with its mirror image magnetic field emission structure;

FIG. 18a depicts an exemplary code intended to produce a magnetic field emission structure having a first stronger lock when aligned with its mirror image magnetic field emission structure and a second weaker lock when rotated 90° relative to its mirror image magnetic field emission structure;

FIG. 18b depicts an exemplary spatial force function of the exemplary magnetic field emission structure of FIG. 18a interacting with its mirror magnetic field emission structure;

FIG. 18c depicts an exemplary spatial force function of the exemplary magnetic field emission structure of FIG. 18a interacting with its mirror image magnetic field emission structure after being rotated 90°;

FIG. 20d depicts an exemplary hole cutting tool assembly having an outer cutting portion including a magnetic field emission structure and inner cutting portion including a magnetic field emission structure;

FIG. 20e depicts an exemplary machine press tool employing multiple levels of magnetic field emission structures;

FIG. 20f depicts a cross section of an exemplary gripping apparatus employing a magnetic field emission structure involving multiple levels of magnets;

FIG. 26 depicts an exemplary sphere having a magnetic field emission structure and a correlated surface where the magnetic field emission structure and the correlated surface provide traction and a gripping force as the sphere is turned;

FIGS. 27a and 27b depict an arrangement where a magnetic field emission structure wraps around two cylinders such that a much larger portion of the magnetic field emission structure is in contact with a correlated surface to provide additional traction and gripping force;

FIG. 29 depicts exemplary intermediate layers associated with a magnetic field emission structure;

FIGS. 30a through 30c provide a side view, an oblique projection, and a top view of a magnetic field emission structure having surrounding heat sink material and an exemplary embedded kill mechanism;

FIG. 31a depicts exemplary distribution of magnetic forces over a wider area to control the distance apart at which two magnetic field emission structures will engage when substantially aligned;

FIG. 32 depicts an exemplary magnetic field emission structure assembly apparatus;

FIG. 33 depicts a turning cylinder having a repeating magnetic field emission structure used to affect movement of a curved surface having the same magnetic field emission structure coding;

FIG. 34 depicts an exemplary valve mechanism;

FIG. 35 depicts and exemplary cylinder apparatus;

FIG. 36a depicts an exemplary magnetic field emission structure made up of rings about a circle;

FIG. 36b depicts and exemplary hinge produced using alternating magnetic field emission structures made up of rings about a circle such as depicted in FIG. 36a;

FIG. 36c depicts an exemplary magnetic field emission structure having sources resembling spokes of a wheel;

FIG. 36d depicts an exemplary magnetic field emission structure resembling a rotary encoder;

FIG. 36e depicts an exemplary magnetic field emission structure having sources arranged as curved spokes;

FIG. 36f depicts an exemplary magnetic field emission structure made up of hexagon-shaped sources;

FIG. 36g depicts an exemplary magnetic field emission structure made up of triangular sources;

FIG. 36h depicts an exemplary magnetic field emission structure made up of partially overlapped diamond-shaped sources;

FIG. 37b depicts a spatial force function corresponding to the two magnet structures of FIG. 37a;

FIGS. 38a-38e illustrate exemplary ring magnet structures based on linear codes;

FIGS. 39a-39g depict exemplary embodiments of two dimensional coded magnet structures;

FIGS. 40a and 40b depict the use of multiple magnetic structures to enable attachment and detachment of two objects using another object functioning as a key;

FIGS. 40c and 40d depict the general concept of using a tab so as to limit the movement of the dual coded attachment mechanism between two travel limiters;

FIG. 40e depicts exemplary assembly of the dual coded attachment mechanism of FIGS. 40c and 40d;

FIGS. 42c and 42d depict an alternative sealable container in accordance with the present invention;

FIG. 42e is intended to depict an alternative arrangement for complementary sloping faces;

FIGS. 42f-42h depict additional alternative shapes that could marry up with a complementary shape to form a compressive seal;

FIG. 42i depicts an alternative arrangement for a sealable container where a gasket is used;

FIGS. 43a-43e depict five states of an electro-permanent magnet apparatus in accordance with the present invention;

FIG. 44a depicts an alternative electro-permanent magnet apparatus in accordance with the present invention;

FIG. 44b depicts a permanent magnetic material having seven embedded coils arranged linearly;

FIGS. 46a-46h depict exemplary male and female connector components;

FIGS. 47a-47c depict exemplary multi-level coding;

FIG. 48a depicts an exemplary use of biasing magnet sources to affect spatial forces of magnetic field structures;

FIG. 48b depicts an exemplary spatial force function corresponding to magnetic field structures of FIG. 48a;

FIG. 49a depicts exemplary magnetic field structures designed to enable automatically closing drawers;

FIG. 49b depicts an alternative example of magnetic field structures enabling automatically closing drawers;

FIGS. 51a and 51b depict side and top down views of a mono-field defense mechanism.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art. Like numbers refer to like elements throughout.

Figure 1:
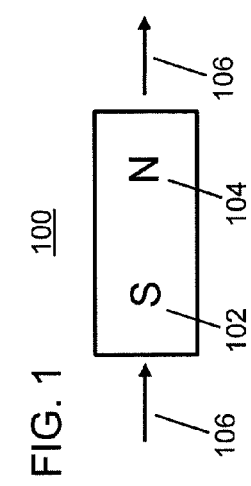
FIG. 1 depicts South and North poles and magnetic field vectors of an exemplary magnet.

FIG. 1 depicts South and North poles and magnetic field vectors of an exemplary magnet. Referring to FIG. 1, a magnet 100 has a South pole 102 and a North pole 104. Also depicted are magnetic field vectors 106 that represent the direction and magnitude of the magnet's moment. North and South poles are also referred to herein as positive (+) and negative (−) poles, respectively. In accordance with the invention, magnets can be permanent magnets, impermanent magnets, electromagnets, electro-permanent magnets, involve hard or soft material, and can be superconductive. In some applications, magnets can be replaced by electrets. Magnets can be most any size from very large to very small to include nanometer scale. In the case of non-superconducting materials there is a smallest size limit of one domain. When a material is made superconductive, however, the magnetic field that is within it can be as complex as desired and there is no practical lower size limit until you get to atomic scale. Magnets may also be created at atomic scale as electric and magnetic fields produced by molecular size structures may be tailored to have correlated properties, e.g. nanomaterials and macromolecules.

At the nanometer scale, one or more single domains can be used for coding where each single domain has a code and the quantization of the magnetic field would be the domain.

Figure 2:
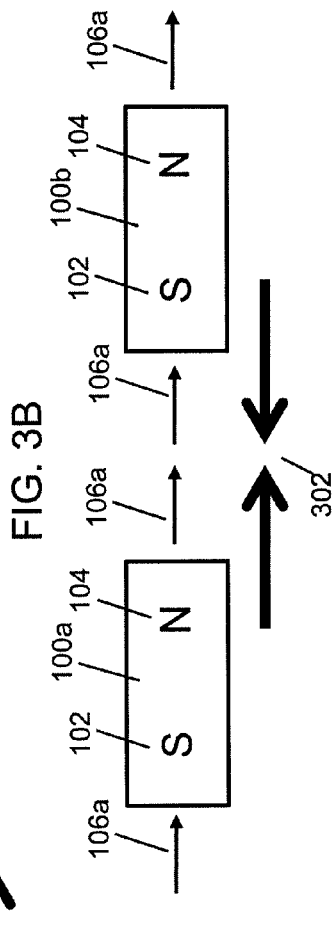
FIG. 2 depicts iron filings oriented in the magnetic field produced by a bar magnet.

FIG. 2 depicts iron filings oriented in the magnetic field 200 (i.e., field domain) produced by a single bar magnet.

Figure 3A:
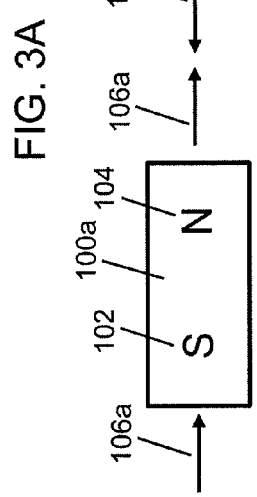
FIG. 3a depicts two magnets aligned such that their polarities are opposite in direction resulting in a repelling spatial force.

FIG. 3a depicts two magnets aligned such that their polarities are opposite in direction resulting in a repelling spatial force. Referring to FIG. 3a, two magnets 100a and 100b are aligned such that their polarities are opposite in direction. Specifically, a first magnet 100a has a South pole 102 on the left and a North pole 104 on the right, whereas a second magnet 100b has a North pole 104 on the left and a South pole 102 on the right such that when aligned the magnetic field vectors 106a of the first magnet 100a are directed against the magnetic field vectors 106b of the second magnet 100b resulting in a repelling spatial force 300 that causes the two magnets to repel each other.

Figure 3B:
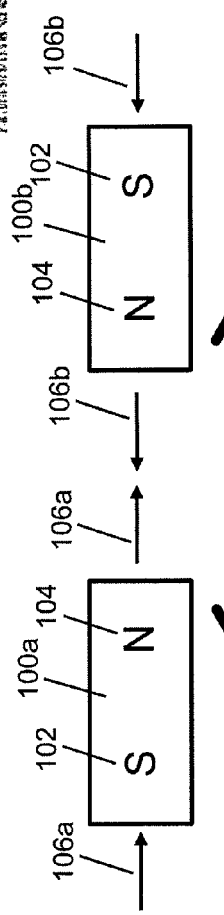
FIG. 3b depicts two magnets aligned such that their polarities are the same in direction resulting in an attracting spatial force.

FIG. 3b depicts two magnets aligned such that their polarities are the same in direction resulting in an attracting spatial force. Referring to FIG. 3b, two magnets 100a and 100b are aligned such that their polarities are in the same direction. Specifically, a first magnet 100a has a South pole 102 on the left and a North pole 104 on the right, and a second magnet 100b also has South pole 102 on the left and a North pole 104 on the right such that when aligned the magnetic field vectors 106a of the first magnet 100a are directed the same as the magnetic field vectors 106a of the second magnet 100b resulting in an attracting spatial force 302 that causes the two magnets to attract each other.

Figure 4A:
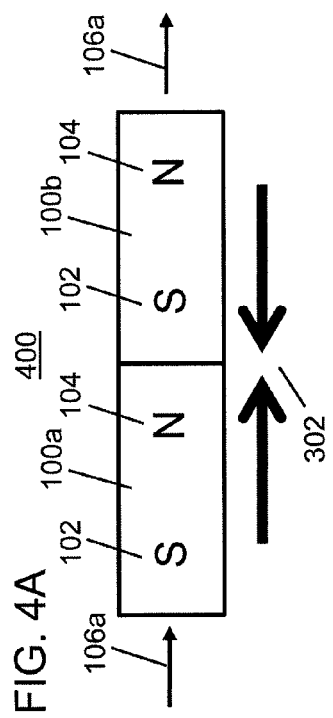
FIG. 4a depicts two magnets having substantial alignment.

FIG. 4a depicts two magnets 100a 100b having substantial alignment 400 such that the North pole 104 of the first magnet 100a has substantially full contact across its surface with the surface of the South pole 102 of the second magnet 100b.

Figure 4B:
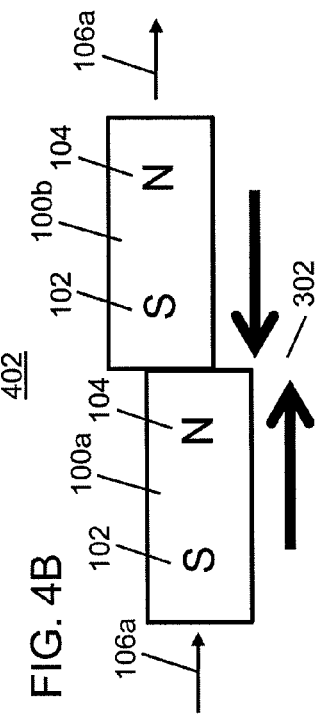
FIG. 4b depicts two magnets having partial alignment.

FIG. 4b depicts two magnets 100a, 100b having partial alignment 402 such that the North pole 104 of the first magnet 100a is in contact across its surface with approximately two-thirds of the surface of the South pole 102 of the second magnet 100b.

Figure 4C:
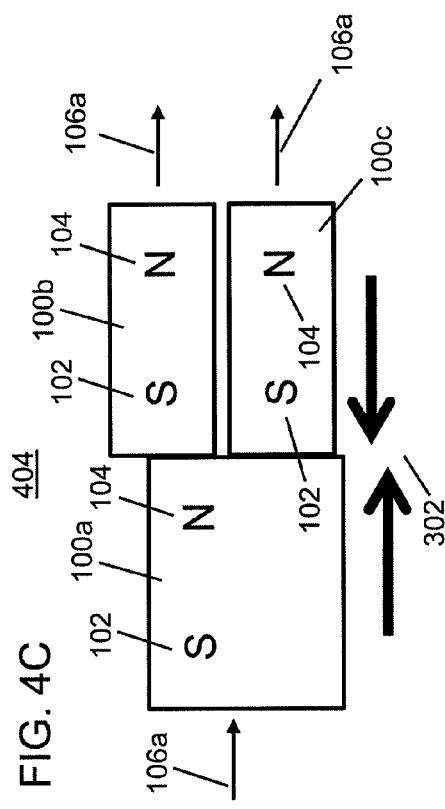
FIG. 4c depicts different sized magnets having partial alignment.

FIG. 4c depicts a first sized magnet 100a and smaller different sized magnets 100b 100c having partial alignment 404. As seen in FIG. 4c, the two smaller magnets 100b and 100c are aligned differently with the larger magnet 100a.

Generally, one skilled in the art will recognize in relation to FIGS. 4a through 4c that the direction of the vectors 106a of the attracting magnets will cause them to align in the same direction as the vectors 106a. However, the magnets can be moved relative to each other such that they have partial alignment yet they will still 'stick' to each other and maintain their positions relative to each other.

In accordance with the present invention, combinations of magnet (or electric) field emission sources, referred to herein as magnetic field emission structures, can be created in accordance with codes having desirable correlation properties. When a magnetic field emission structure is brought into alignment with a complementary, or mirror image, magnetic field emission structure the various magnetic field emission sources all align causing a peak spatial attraction force to be produced whereby misalignment of the magnetic field emission structures causes the various magnetic field emission sources to substantially cancel each other out as function of the code used to design the structures. Similarly, when a magnetic field emission structure is brought into alignment with a duplicate magnetic field emission structure the various magnetic field emission sources all align causing a peak spatial repelling force to be produced whereby misalignment of the magnetic field emission structures causes the various magnetic field emission sources to substantially cancel each other out. As such, spatial forces are produced in accordance with the relative alignment of the field emission structures and a spatial force function. As described herein, these spatial force functions can be used to achieve precision alignment and precision positioning. Moreover, these spatial force functions enable the precise control of magnetic fields and associated spatial forces thereby enabling new forms of attachment devices for attaching objects with precise alignment and new systems and methods for controlling precision movement of objects. Generally, a spatial force has a magnitude that is a function of the relative alignment of two magnetic field emission structures and their corresponding spatial force (or correlation) function, the spacing (or distance) between the two magnetic field emission structures, and the magnetic field strengths and polarities of the sources making up the two magnetic field emission structures.

The characteristic of the present invention whereby the various magnetic field sources making up two magnetic field emission structures can effectively cancel out each other when they are brought out of alignment can be described as a release force (or a release mechanism). This release force or release mechanism is a direct result of the correlation coding used to produce the magnetic field emission structures and, depending on the code employed, can be present regardless of whether the alignment of the magnetic field emission structures corresponds to a repelling force or an attraction force.

One skilled in the art of coding theory will recognize that there are many different types of codes having different correlation properties that have been used in communications for channelization purposes, energy spreading, modulation, and other purposes. Many of the basic characteristics of such codes make them applicable for use in producing the magnetic field emission structures described herein. For example, Barker codes are known for their autocorrelation properties. Although, Barker codes are used herein for exemplary purposes, other forms of codes well known in the art because of their autocorrelation, cross-correlation, or other properties are also applicable to the present invention including, for example, Gold codes, Kasami sequences, hyperbolic congruential codes, quadratic congruential codes, linear congruential codes, Welch-Costas array codes, Golomb-Costas array codes, pseudorandom codes, chaotic codes, and Optimal Golomb Ruler codes. Generally, any code can be employed.

The correlation principles of the present invention may or may not require overcoming normal 'magnet orientation' behavior using a holding mechanism. For example, magnets of the same magnetic field emission structure can be sparsely separated from other magnets (e.g., in a sparse array) such that the magnetic forces of the individual magnets do not substantially interact, in which case the polarity of individual magnets can be varied in accordance with a code without requiring a substantial holding force to prevent magnetic forces from 'flipping' a magnet. Magnets that are close enough such that their magnetic forces substantially interact such that their magnetic forces would normally cause one of them to 'flip' so that their moment vectors align can be made to remain in a desired orientation by use of a holding mechanism such as an adhesive, a screw, a bolt & nut, etc.

FIG. 5a depicts a Barker length 7 code used to determine polarities and positions of magnets making up a magnetic field emission structure. Referring to FIG. 5a, a Barker length 7 code 500 is used to determine the polarities and the positions of magnets making up a magnetic field emission structure 502. Each magnet has the same or substantially the same magnetic field strength (or amplitude), which for the sake of this example is provided a unit of 1 (where A=Attract, R=Repel, A=−R, A=1, R=−1).

FIGS. 5b through 5o depict different alignments of two complementary magnetic field structures like that of FIG. 5a. Referring to FIGS. 5b through 5o, a first magnetic field structure 502a is held stationary. A second magnetic field emission structure 502b that is identical to the first magnetic field emission structure 502a is shown sliding from left to right in 13 different alignments relative to the first magnetic field emission structure 502a in FIGS. 5b through 5o. The boundary where individual magnets of the two structures interact is referred to herein as an interface boundary. (Note that although the first magnetic field emission structure 502a is identical to the second magnetic field structure in terms of magnet field directions, the interfacing poles are of opposite or complementary polarity).

The total magnetic force between the first and second magnetic field emission structures 502a 502b is determined as the sum from left to right along the structure of the individual forces, at each magnet position, of each magnet or magnet pair interacting with its directly opposite corresponding magnet in the opposite magnetic field emission structure. Where only one magnet exists, the corresponding magnet is 0, and the force is 0. Where two magnets exist, the force is R for equal poles or A for opposite poles. Thus, for FIG. 5b, the first six positions to the left have no interaction. The one position in the center shows two "S" poles in contact for a repelling force of 1. The next six positions to the right have no interaction, for a total force of 1R=−1, a repelling force of magnitude 1. The spatial correlation of the magnets for the various alignments is similar to radio frequency (RF) signal correlation in time, since the force is the sum of the products of the magnet strengths of the opposing magnet pairs over the lateral width of the structure. Thus, $$f = \sum_{n=1,N} p_n q_n$$

where, f is the total magnetic force between the two structures, n is the position along the structure up to maximum position N, and $p_n$ are the strengths and polarities of the lower magnets at each position n.

$q_n$ are the strengths and polarities of the upper magnets at each position n.

An alternative equation separates strength and polarity variables, as follows:

$$f = \sum_{n=1,N} l_n p_n u_n q_n$$

where, f is the total magnetic force between the two structures, n is the position along the structure up to maximum position N, $l_n$ are the strengths of the lower magnets at each position n, $p_n$ are the polarities (1 or −1) of the lower magnets at each position n, $u_n$ are the strengths of the upper magnets at each position n, and $q_n$ are the polarities (1 or −1) of the upper magnets at each position n, The above force calculations can be performed for each shift of the two structures to plot a force vs. position function for the two structures. A force vs. position function may alternatively be called a spatial force function. In other words, for each relative alignment, the number of magnet pairs that repel plus the number of magnet pairs that attract is calculated, where each alignment has a spatial force in accordance with a spatial force function based upon the correlation function and magnetic field strengths of the magnets. With the specific Barker code used, it can be observed from the figures that the spatial force varies from −1 to 7, where the peak occurs when the two magnetic field emission structures are aligned such that their respective codes are aligned as shown in FIG. 5h and FIG. 5i. (FIG. 5h and FIG. 5i show the same alignment, which is repeated for continuity between the two columns of figures). The off peak spatial force, referred to as a side lobe force, varies from 0 to −1. As such, the spatial force function causes the magnetic field emission structures to generally repel each other unless they are aligned such that each of their magnets is correlated with a complementary magnet (i.e., a magnet's South pole aligns with another magnet's North pole, or vice versa). In other words, the two magnetic field emission structures substantially correlate when they are aligned such that they substantially mirror each other.

FIG. 5p depicts the sliding action shown in FIGS. 5b through 5o in a single diagram. In FIG. 5p, a first magnet structure 502a is stationary while a second magnet structure 502b is moved across the top of the first magnet structure 502a in one direction 508 according to a scale 504. The second magnet structure 502b is shown at position 1 according to an indicating pointer 506, which moves with the left magnet of the second structure 502b. As the second magnet structure 502b is moved from left to right, the total attraction and repelling forces are determined and plotted in the graph of FIG. 6.

FIG. 6 depicts the binary autocorrelation function 600 of the Barker length 7 code, where the values at each alignment position 1 through 13 correspond to the spatial force values calculated for the thirteen alignment positions shown in FIGS. 5b through 5o (and in FIG. 5p). As such, since the magnets making up the magnetic field emission structures 502a, 502b have the same magnetic field strengths, FIG. 6 also depicts the spatial force function of the two magnetic field emission structures of FIGS. 5b-5o and 5p. As the true autocorrelation function for correlated magnet field structures is repulsive, and most of the uses envisioned will have attractive correlation peaks, the usage of the term 'autocorrelation' herein will refer to complementary correlation unless otherwise stated. That is, the interacting faces of two such correlated magnetic field emission structures will be complementary to (i.e., mirror images of) each other. This complementary autocorrelation relationship can be seen in FIG. 5b where the bottom face of the first magnetic field emission structure 502b having the pattern 'S S S N N S N' is shown interacting with the top face of the second magnetic field emission structure 502a having the pattern 'N N N S S N S', which is the mirror image (pattern) of the bottom face of the first magnetic field emission structure 502b.

The attraction functions of FIG. 6 and others in this disclosure are idealized, but illustrate the main principle and primary performance. The curves show the performance assuming equal magnet size, shape, and strength and equal distance between corresponding magnets. For simplicity, the plots only show discrete integer positions and interpolate linearly. Actual force values may vary from the graph due to various factors such as diagonal coupling of adjacent magnets, magnet shape, spacing between magnets, properties of magnetic materials, etc. The curves also assume equal attract and repel forces for equal distances. Such forces may vary considerably and may not be equal depending on magnet material and field strengths. High coercive force materials typically perform well in this regard.

FIG. 7a depicts a Barker length 7 code 500 used to determine polarities and positions of magnets making up a magnetic field emission structure 702. Each magnet has the same or substantially the same magnetic field strength (or amplitude), which for the sake of this example is provided a unit of 1 (A=−R, A=1, R=−1), with the exception of two magnets indicated with bolded N and S that have twice the magnetic strength as the other magnets. As such, a bolded magnet and non-bolded magnet represent 1.5 times the strength as two non-bolded magnets and two bolded magnets represent twice the strength of two non-bolded magnets.

FIGS. 7b through 7o depict different alignments of two complementary magnetic field structures like that of FIG. 7a. Referring to FIGS. 7b through 7o, a first magnetic field structure 702a is held stationary. A second magnetic field emission structure 702b that is identical to the first magnetic field emission structure 702a is shown in 13 different alignments relative to the first magnetic field emission structure 702a in FIGS. 7b through 7o. For each relative alignment, the number of magnet pairs that repel plus the number of magnet pairs that attract is calculated, where each alignment has a spatial force in accordance with a spatial force function based upon the correlation function and the magnetic field strengths of the magnets. With the specific Barker code used, the spatial force varies from −2.5 to 9, where the peak occurs when the two magnetic field emission structures are aligned such that their respective codes are aligned. The off peak spatial force, referred to as the side lobe force, varies from 0.5 to −2.5. As such, the spatial force function causes the structures to have minor repel and attract forces until about two-thirds aligned when there is a fairly strong repel force that weakens just before they are aligned. When the structures are substantially aligned their codes align and they strongly attract as if the magnets in the structures were not coded.

FIG. 7p depicts the sliding action shown in FIGS. 7b through 7o in a single diagram. In FIG. 7p, a first magnet structure 702a is stationary while a second magnet structure 702b is moved across the top of the first magnet structure 702a in a direction 708 according to a scale 704. The second magnet structure 702b is shown at position 1 according to an indicating pointer 706, which moves with the left magnet of the second structure 702b. As the second magnet structure 702b is moved from left to right, the total attraction and repelling forces are determined and plotted in the graph of FIG. 8.

FIG. 8 depicts an exemplary spatial force function 800 of the two magnetic field emission structures of FIGS. 7b through 7o (and FIG. 7p).

The examples provided thus far have used the Barker 7 code to illustrate the principles of the invention. Barker codes have been found to exist in lengths up to 13. Table 1 shows Barker codes up to length 13. Additional Barker codes may be generated by cyclic shifts (register rotations) or negative polarity (multiply by −1) transformations of the codes of Table 1. The technical literature includes Barker-like codes of even greater length. Barker codes offer a peak force equal to the length and a maximum misaligned force of 1 or −1. Thus, the ratio of peak to maximum misaligned force is length/1 or −length/1.

TABLE 1

Barker Codes

| Length | Codes | |
|---|---|---|
| 2 | +1 −1 | +1 +1 |
| 3 | +1 +1 −1 | |
| 4 | +1 −1 +1 +1 | +1 −1 −1 −1 |
| 5 | +1 +1 +1 −1 +1 | |
| 7 | +1 +1 +1 −1 −1 +1 −1 | |
| 11 | +1 +1 +1 −1 −1 −1 +1 −1 −1 +1 −1 | |
| 13 | +1 +1 +1 +1 +1 −1 −1 +1 +1 −1 +1 −1 +1 | |

Numerous other codes are known in the literature for low autocorrelation when misaligned and may be used for magnet structure definition as illustrated with the Barker 7 code. Such codes include, but are not limited to maximal length PN sequences, Kasami codes, Golomb ruler codes and others. Codes with low non-aligned autocorrelation offer the precision lock at the alignment point as shown in FIG. 6.

Pseudo Noise (PN) and noise sequences also offer codes with low non-aligned autocorrelation. Most generally a noise sequence or pseudo-noise sequence is a sequence of 1 and −1 values that is generated by a true random process, such as a noise diode or other natural source, or is numerically generated in a deterministic (non random) process that has statistical properties much like natural random processes. Thus, many true random and pseudo random processes may generate suitable codes for use with the present invention. Random processes however will likely have random variations in the sidelobe amplitude, i.e., non-aligned force as a function of distance from alignment; whereas, Barker codes and others may have a constant amplitude when used as cyclic codes (FIG. 9a). One such family is maximal length PN codes generated by linear feedback shift registers (LFSR). LFSR codes offer a family of very long codes with a constant low level non-aligned cyclic autocorrelation. The codes come in lengths of powers of two minus one and several different codes of the same length are generally available for the longer lengths. LFSR codes offer codes in much longer lengths than are available with Barker codes. Table 2 summarizes the properties for a few of the shorter lengths. Extensive data on LFSR codes is available in the literature.

TABLE 2

LFSR Sequences

| Number of Stages | Length of sequences | Number of Sequences | Example feedback |
|---|---|---|---|
| 2 | 3 | 1 | 1, 2 |
| 3 | 7 | 2 | 2, 3 |
| 4 | 15 | 2 | 3, 4 |
| 5 | 31 | 6 | 3, 5 |
| 6 | 63 | 6 | 5, 6 |
| 7 | 127 | 18 | 6, 7 |
| 8 | 255 | 16 | 4, 5, 6, 8 |
| 9 | 511 | 48 | 5, 9 |
| 10 | 1023 | 60 | 7, 10 |

The literature for LFSR sequences and related sequences such as Gold and Kasami often uses a 0, 1 notation and related mathematics. The two states 0, 1 may be mapped to the two states −1, +1 for use with magnet polarities. An exemplary LFSR sequence for a length 4 shift register starting at 1,1,1,1 results in the feedback sequence: 000100110101111, which maybe mapped to: −1, −1, −1, +1, −1, −1, +1, +1, −1, +1, −1, +1, +1, +1, +1. Alternatively, the opposite polarities may be used or a cyclic shift may be used.

Code families also exist that offer a set of codes that may act as a unique identifier or key, requiring a matching part to operate the device. Kasami codes and other codes can achieve keyed operation by offering a set of codes with low cross correlation in addition to low autocorrelation. Low cross correlation for any non-aligned offset means that one code of the set will not match and thus not lock with a structure built according to the another code in the set. For example, two structures A and A*, based on code A and the complementary code A*, will slide and lock at the precision lock point. Two structures B and B* from the set of low cross correlation codes will also slide and lock together at the precision alignment point. However, code A will slide with low attraction at any point but will not lock with code B* because of the low cross correlation properties of the code. Thus, the code can act like a key that will only achieve lock when matched with a like (complementary) pattern.

Kasami sequences are binary sequences of length $2^N$ where N is an even integer. Kasami sequences have low cross-correlation values approaching the Welch lower bound for all time shifts and may be used as cyclic codes. There are two classes of Kasami sequences—the small set and the large set.

The process of generating a Kasami sequence starts by generating a maximum length sequence $a_n$, where n=1 . . . $2^N-1$. Maximum length sequences are cyclic sequences so $a_n$ is repeated periodically for n larger than $2^N-1$. Next, we generate another sequence $b_n$ by generating a decimated sequence of $a_n$ at a period of $q=2^{N/2}+1$, i.e., by taking every $q^{th}$ bit of $a_n$. We generate $b_n$ by repeating the decimated sequence q times to form a sequence of length $2^N-1$. We then cyclically shift $b_n$ and add to $a_n$ for the remaining $2^N-2$ non repeatable shifts. The Kasami set of codes comprises $a_n$, $a_n+b_n$, and the cyclically shifted $a_n+$(shift $b_n$) sequences. This set has $2^{N/2}$ different sequences. A first coded structure may be based on any one of the different sequences and a complementary structure may be the equal polarity or negative polarity of the first coded structure, depending on whether repelling or attracting force is desired. Neither the first coded structure nor the complementary structure will find strong attraction with any of the other codes in the $2^{N/2}$ different sequences. An exemplary 15 length Kasami small set of four sequences is given in Table 3 below. The 0, 1 notation may be transformed to −1, +1 as described above. Cyclic shifts and opposite polarity codes may be used as well.

TABLE 3

Exemplary Kasami small set sequences.

Sequence

| K1 | 0 | 0 | 0 | 1 | 0 | 0 | 1 | 1 | 0 | 1 | 0 | 1 | 1 | 1 | 1 |
|----|---|---|---|---|---|---|---|---|---|---|---|---|---|---|---|
| K2 | 0 | 1 | 1 | 1 | 1 | 1 | 1 | 0 | 1 | 1 | 1 | 0 | 1 | 0 | 0 |
| K3 | 1 | 1 | 0 | 0 | 1 | 0 | 0 | 0 | 0 | 0 | 1 | 1 | 0 | 0 | 1 |
| K4 | 1 | 0 | 1 | 0 | 0 | 1 | 0 | 1 | 1 | 0 | 0 | 0 | 0 | 0 | 0 |

Other codes, such as Walsh codes and Hadamard codes, offer sets of codes with perfectly zero cross correlation across the set of codes when aligned, but possibly high correlation performance when misaligned. Such codes can provide the unique key function when combined with mechanical constraints that insure alignment. Exemplary Walsh codes are as follows:

Denote W(k, n) as Walsh code k in n-length Walsh matrix. It means the k-th row of Hadamard matrix H(m), where n=2m, m an integer. Here k could be 0,1, . . . , n−1. A few Walsh codes are shown in Table 4.

TABLE 4

Walsh Codes

| Walsh Code | Code |
|---|---|
| W(0, 1) | 1 |
| W(0, 2) | 1, 1 |
| W(1, 2) | 1, −1 |
| W(0, 4) | 1, 1, 1, 1 |
| W(1, 4) | 1, −1, 1, −1 |
| W(2, 4) | 1, 1, −1, −1 |

TABLE 4-continued

Walsh Codes

| Walsh Code | Code |
|---|---|
| W(3, 4) | 1, −1, −1, 1 |
| W(0, 8) | 1, 1, 1, 1, 1, 1, 1, 1 |
| W(1, 8) | 1, −1, 1, −1, 1, −1, 1, −1 |
| W(2, 8) | 1, 1, −1, −1, 1, 1, −1, −1 |
| W(3, 8) | 1, −1, −1, 1, 1, −1, −1, 1 |
| W(4, 8) | 1, 1, 1, 1, −1, −1, −1, −1 |
| W(5, 8) | 1, −1, 1, −1, −1, 1, −1, 1 |
| W(6, 8) | 1, 1, −1, −1, −1, −1, 1, 1 |
| W(7, 8) | 1, −1, −1, 1, −1, 1, 1, −1 |

In use, Walsh codes of the same length would be used as a set of codes that have zero interaction with one another, i.e., Walsh code W(0,8) will not attract or repel any of the other codes of length 8 when aligned. Alignment should be assured by mechanical constraints because off alignment attraction can be great.

Codes may be employed as cyclic codes or non-cyclic codes. Cyclic codes are codes that may repetitively follow another code, typically immediately following with the next step after the end of the last code. Such codes may also be referred to as wrapping or wraparound codes. Non-cyclic codes are typically used singly or possibly used repetitively but in isolation from adjacent codes. The Barker 7 code example of FIG. 5a is a non-cyclic use of the code; whereas the example of FIG. 9a is a cyclic use of the same code.

FIG. 9a depicts an exemplary cyclic code comprising three modulos of a Barker length 7 code. Referring to FIG. 9a, a Barker length 7 code 500 is repeated three times to produce a magnetic field emission structure 902.

FIGS. 9b through 9o depict relative alignments of a first magnetic field emission structure 502 having polarities and magnet positions defined by a Barker length 7 code 500 and a second magnetic field emission structure 902 that corresponds to three repeating code modulos of the code 500 used to define the first magnetic field emission structure 500. Each magnet has the same or substantially the same magnetic field strength (or amplitude), which for the sake of this example will be provided a unit of 1 (A=−R, A=1, R=−1). Shown in FIGS. 9a through 9o are 13 different alignments of the first magnetic field emission structure 502 to the second magnetic field emission structure 902 where all the magnets of the first magnetic structure 502 are always in contact with the repeating second magnetic field emission structure 902. For each relative alignment, the number of magnet pairs that repel plus the number of magnet pairs that attract is calculated, where each alignment has a spatial force in accordance with a spatial force function based upon the correlation function and the magnetic field strengths of the magnets. With the specific Barker code used, the spatial force varies from −1 to 7, where the peak occurs when the two magnetic field emission structures are aligned such that their respective codes are aligned. The off peak spatial force, referred to as side lobe force, is −1. As such, the spatial force function causes the structures to generally repel each other unless they are substantially aligned when they will attract as if the magnets in the structures were not coded.

Figure 9P:
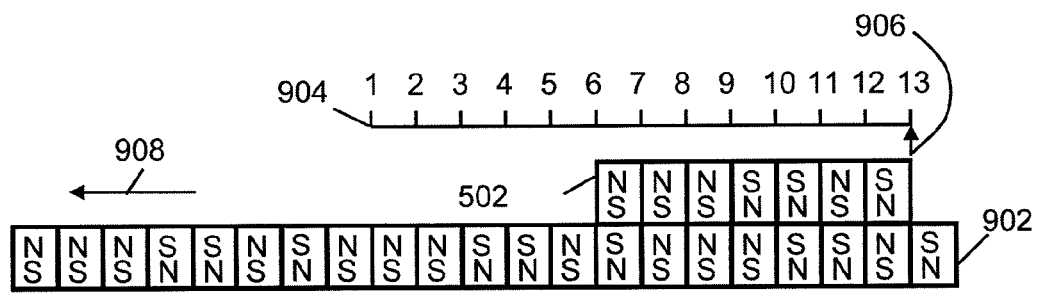
FIG. 9p provides an alternative method of depicting exemplary alignments of the complementary magnetic field structures of FIGS. 9b-9o.

FIG. 9p depicts the sliding action shown in FIGS. 9b through 9o in a single diagram. In FIG. 9p, a first magnet structure 902 is stationary while a second magnet structure 502 is moved across the top of the first magnet structure 902 in a direction 908 according to a scale 904. The second magnet structure 502 is shown at a position 13 according to an indicating pointer 906, which moves with the right magnet of the second structure 502. As the second magnet structure 502 is moved from right to left, the total attraction and repelling forces are determined and plotted in the graph of FIG. 10.

Figure 10:
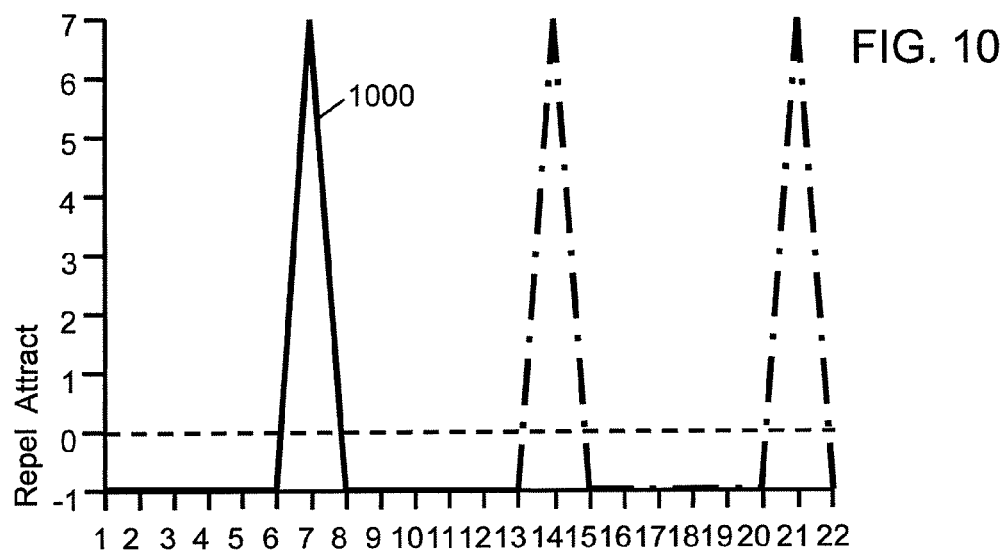
FIG. 10 depicts an exemplary spatial force function of the two magnetic field emission structures of FIGS. 9b-9o and FIG. 9p.

FIG. 10 depicts an exemplary spatial force function 1000 of the two magnetic field emission structures of FIGS. 9b through 9o (and FIG. 9p) where the code that defines the second magnetic field emission structure 902 repeats. As such, as the code modulo repeats there is a peak spatial force that repeats every seven alignment shifts. The dash-dot lines of FIG. 10 depict additional peak spatial forces that occur when the first magnetic field structure 502 is moved relative to additional code modulos, for example, two additional code modulos. Note that the total force shows a peak of 7 each time the sliding magnet structure 502 aligns with the underlying Barker 7 pattern in a similar manner as previously described for FIG. 6 except the misaligned positions (positions 1-6 for example) show a constant −1 indicating a repelling force of one magnet pair. In contrast, the force in FIG. 6 alternates between 0 and −1 in the misaligned region, where the alternating values are the result of their being relative positions of non-cyclic structures where magnets do not have a corresponding magnet with which to pair up. In magnet structures, cyclic codes may be placed in repeating patterns to form longer patterns or may cycle back to the beginning of the code as in a circle or racetrack pattern. As such, cyclic codes are useful on cylindrically or spherically shaped objects.

Figure 11I:
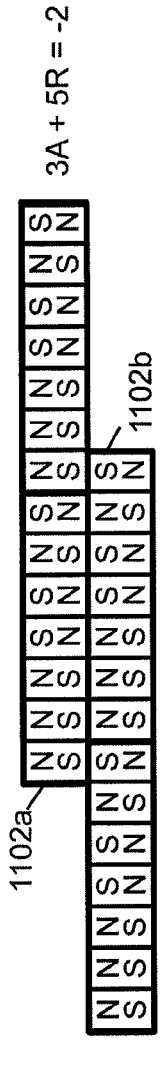
Figure 11J:
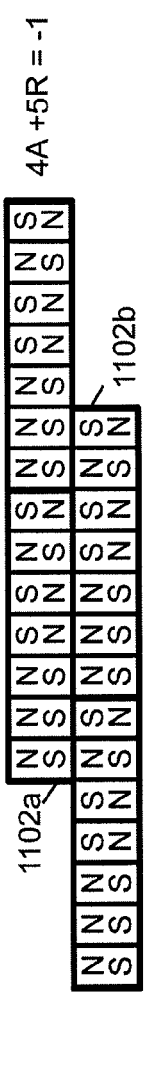
Figure 11K:
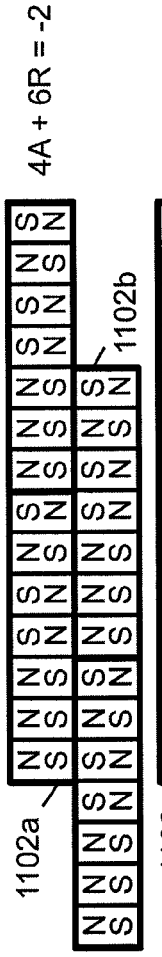
Figure 11L:
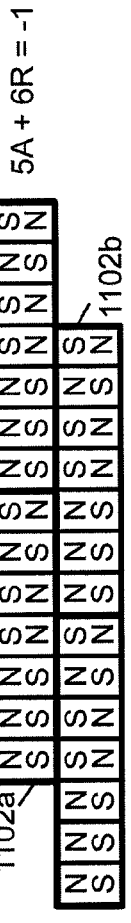
Figure 11M:
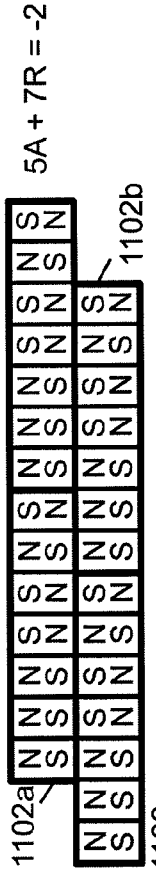
Figure 11N:
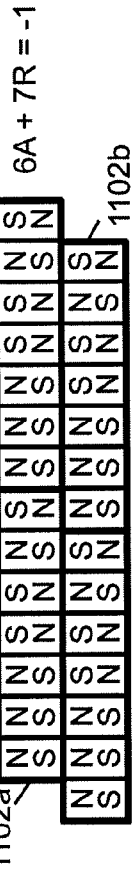
Figure 11O:
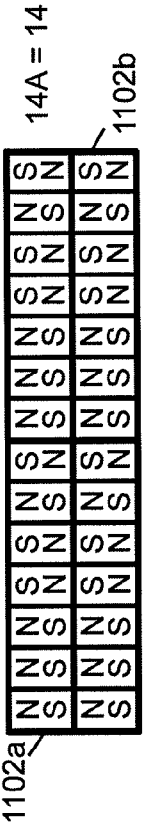
Figure 11P:
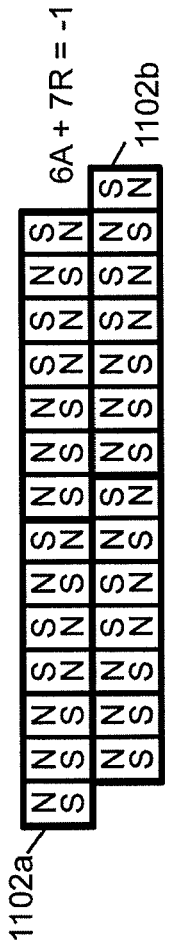
Figure 11Q:
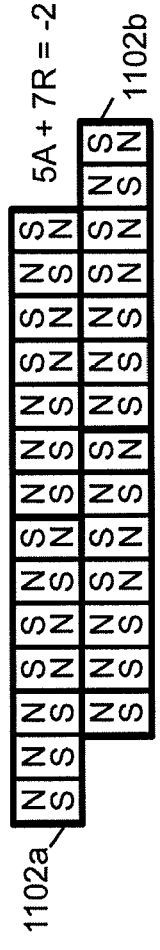
Figure 11R:
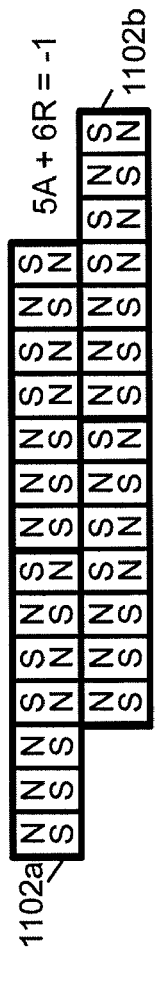
Figure 11S:
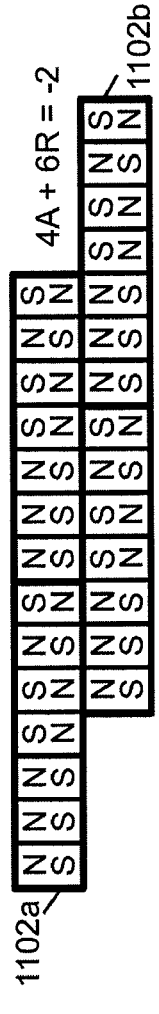
Figure 11T:
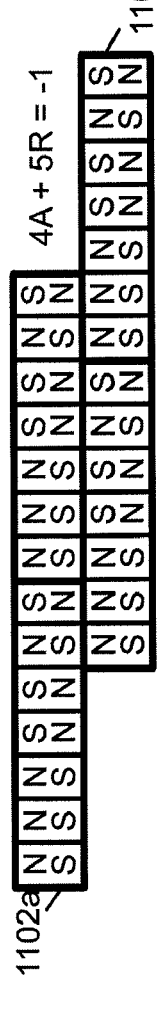
Figure 11U:
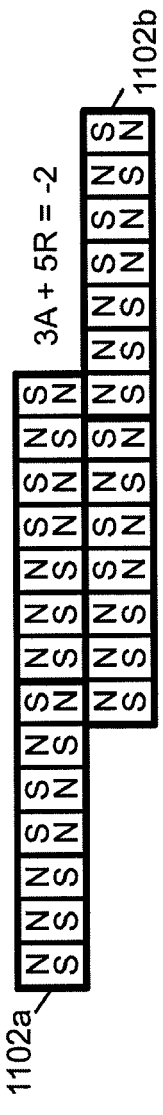
Figure 11V:
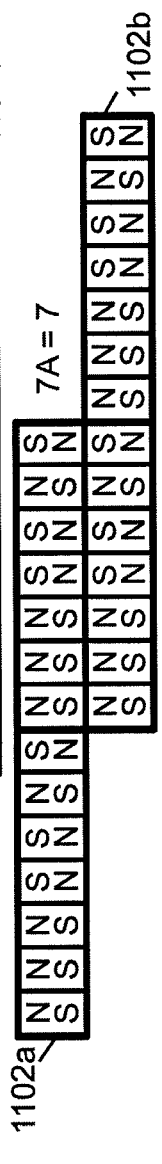
Figure 11A:
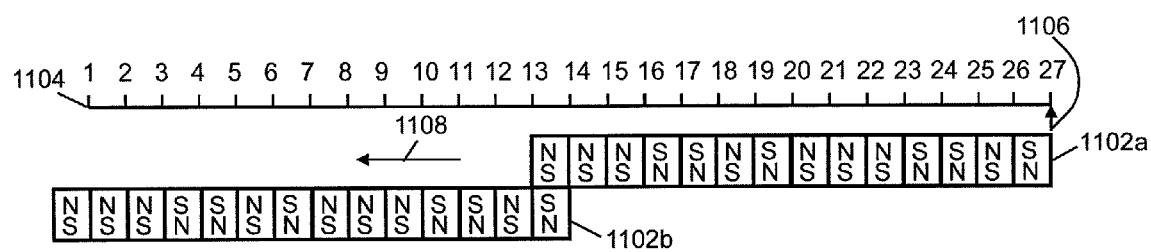
FIG. 11a depict a magnetic field structure that corresponds to two modulos of the Barker length 7 code end-to-end.

FIG. 11a depicts an exemplary cyclic code comprising two repeating code modulos of a Barker length 7 code. Referring to FIG. 11a, a Barker length 7 code is repeated two times to produce a magnetic field emission structure 1102.

FIGS. 11b through 11ab depict 27 different alignments of two magnetic field emission structures where a Barker code of length 7 is used to determine the polarities and the positions of magnets making up a first magnetic field emission structure 1102a, which corresponds to two modulos of the Barker length 7 code 500 end-to-end. Each magnet has the same or substantially the same magnetic field strength (or amplitude), which for the sake of this example is provided a unit of 1 (A=−R, A=1, R=−1). A second magnetic field emission structure 1102b that is identical to the first magnetic field emission structure 1102a is shown in 27 different alignments relative to the first magnetic field emission structure 1102a. For each relative alignment, the number of magnet pairs that repel plus the number of magnet pairs that attract is calculated, where each alignment has a spatial force in accordance with a spatial force function based upon the correlation function and magnetic field strengths of the magnets. With the specific Barker code used, the spatial force varies from −2 to 14, where the peak occurs when the two magnetic field emission structures are aligned such that their respective codes are aligned. Two secondary peaks occur when the structures are half aligned such that one of the successive codes of one structure aligns with one of the codes of the second structure. The off peak spatial force, referred to as the side lobe force, varies from −1 to −2 between the peak and secondary peaks and between 0 and −1 outside the secondary peaks.

FIG. 11ac depicts the sliding action shown in FIGS. 11b through 11ab in a single diagram. In FIG. 11ac, a first magnet structure 1102a is moved across the top of a second magnet structure 1102b in a direction 1108 according to a scale 1104. The first magnet structure 1102a is shown at position 27 according to an indicating pointer 1106, which moves with the right magnet of the first magnet structure 1102a. As the first magnet structure 1102a is moved from right to left, the total attraction and repelling forces are determined and plotted in the graph of FIG. 12.

Figure 12:
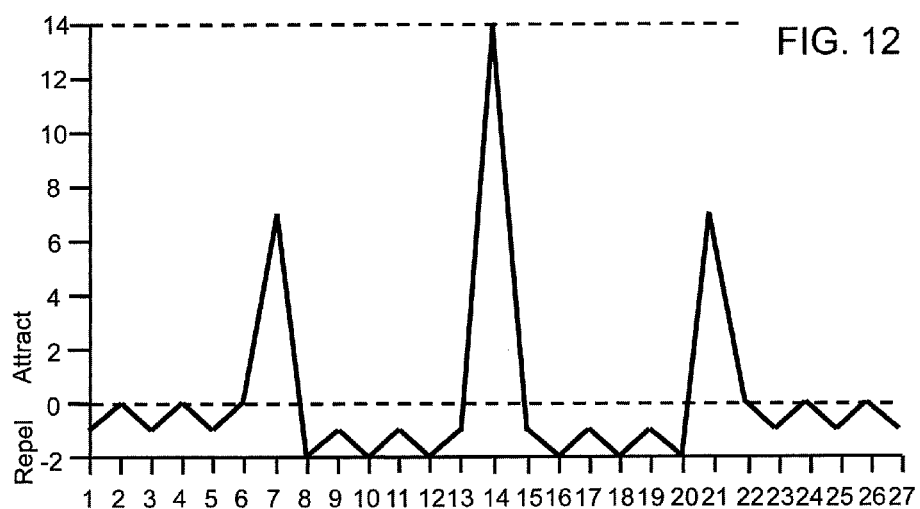
FIG. 12 depicts an exemplary spatial force function of the two magnetic field emission structures of FIGS. 11b-11ab and FIG. 11ac.

FIG. 12 depicts an exemplary spatial force function of the two magnetic field emission structures of FIGS. 11b through 11ab. Based on FIG. 6 and FIG. 10, FIG. 12 corresponds to the spatial functions in FIG. 6 and FIG. 10 added together.

The magnetic field emission structures disclosed so far are shown and described with respect to relative movement in a single dimension, i.e., along the interface boundary in the direction of the code. Some applications utilize such magnet structures by mechanically constraining the relative motion to the single degree of freedom being along the interface boundary in the direction of the code. Other applications allow movement perpendicular to the direction of the code along the interface boundary, or both along and perpendicular to the direction of the code, offering two degrees of freedom. Still other applications may allow rotation and may be mechanically constrained to only rotate around a specified axis, thus having a single degree of freedom (with respect to movement along the interface boundary.) Other applications may allow two lateral degrees of freedom with rotation adding a third degree of freedom. Most applications also operate in the spacing dimension to attract or repel, hold or release. The spacing dimension is usually not a dimension of interest with respect to the code; however, some applications may pay particular attention to the spacing dimension as another degree of freedom, potentially adding tilt rotations for six degrees of freedom. For applications allowing two lateral degrees of freedom, special codes may be used that place multiple magnets in two dimensions along the interface boundary.

FIG. 13a and FIG. 13b illustrate the spatial force functions of magnetic field emission structures produced by repeating a one-dimensional code across a second dimension N times (i.e., in rows each having same coding) where in FIG. 13a the movement is across the code (i.e., as in FIGS. 5b through 5o) or in FIG. 13b the movement maintains alignment with up to all N coded rows of the structure and down to one.

FIG. 14a depicts a two dimensional Barker-like code 1400 and a corresponding two-dimensional magnetic field emission structure 1402a. Referring to FIG. 14a, a two dimensional Barker-like code 1400 is created by copying each row to a new row below, shifting the code in the new row to the left by one, and then wrapping the remainder to the right side. When applied to a two-dimensional field emission structure 1402a interesting rotation-dependent correlation characteristics are produced. Shown in FIG. 14a is a two-dimensional mirror image field emission structure 1402b, which is also shown rotated −90°, −180°, and −270° as 1402c-1402e, respectively. Note that with the two-dimensional field emission structure 1402a, a top down view of the top of the structure is depicted such that the poles of each magnet facing up are shown, whereas with the two-dimensional mirror image field emission structure 1402b, 1402c, 1402d, 1402e a top down view of the bottom of the structure is depicted such that the poles of each magnet facing down are shown. As such, each magnet of the two-dimensional structure 1402a would be opposite a corresponding magnet of the mirror image structure 1402b, 1402c, 1402d, 1402e having opposite polarity. Also shown is a bottom view of the two-dimensional magnetic field structure 1402a'. One skilled in the art will recognize that the bottom view of the first structure 1402a' is also the mirror image of the top view of the first structure 1402a, where 1402a and 1402a' could be interpreted much like opposing pages of a book such that when the book closes the all the magnetic source pairs would align to produce a peak attraction force.

Autocorrelation cross-sections were calculated for the four rotations of the mirror image field emission structure 1402b-1402e moving across the magnetic field emission structure 1402a in the same direction 1404. Four corresponding numeric autocorrelation cross-sections 1406, 1408, 1410, and 1412, respectively, are shown. As indicated, when the mirror image is passed across the magnetic field emission structure 1402a each column has a net 1R (or −1) spatial force and as additional columns overlap, the net spatial forces add up until the entire structure aligns (+49) and then the repel force decreases as less and less columns overlap. With −90° and −270° degree rotations, there is symmetry but erratic correlation behavior. With −180° degrees rotation, symmetry is lost and correlation fluctuations are dramatic. The fluctuations can be attributed to directionality characteristics of the shift left and wrap approach used to generate the structure 1402a, which caused upper right to lower left diagonals to be produced which when the mirror image was rotated −180°, these diagonals lined up with the rotated mirror image diagonals.

Figure 14B:
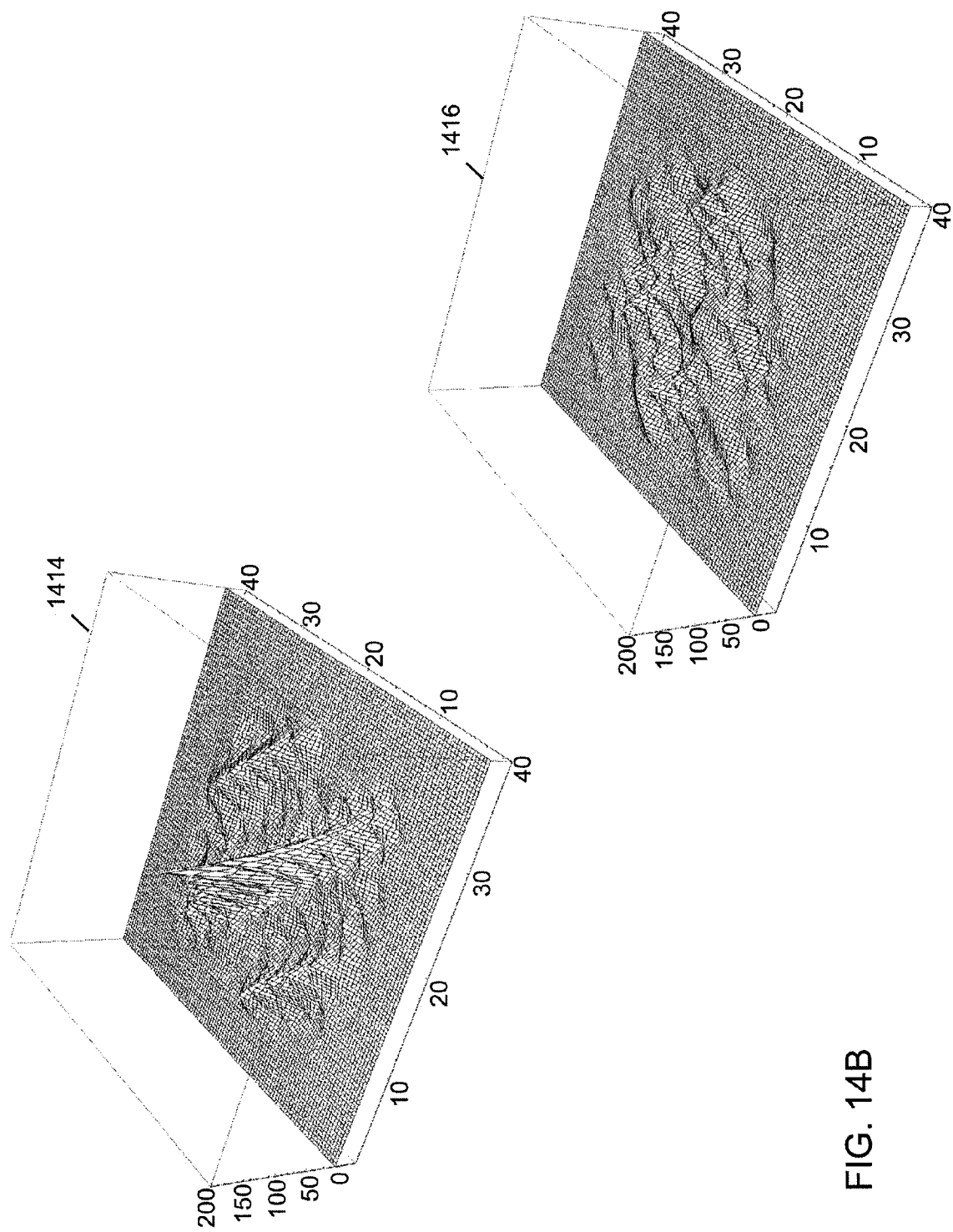
FIG. 14b depicts exemplary spatial force functions resulting from mirror image magnetic field emission structure and −90° rotated mirror image magnetic field emission structure moving across a magnetic field emission structure.

FIG. 14b depicts exemplary spatial force functions resulting from a mirror image magnetic field emission structure and a mirror image magnetic field emission structure rotated −90° moving across the magnetic field emission structure. Referring to FIG. 14b, spatial force function 1414 results from the mirror image magnetic field emission structure 1402b moving across the magnetic field emission structure 1402a in a direction 1404 and spatial force function 1416 results from the mirror image magnetic field emission structure rotated −90° 1402c moving across magnetic field emission structure 1402a in the same direction 1404. Characteristics of the spatial force function depicted in FIG. 12 may be consistent with a diagonal cross-section from 0,0 to 40,40 of spatial force function 1414 and at offsets parallel to that diagonal. Additionally, characteristics of the spatial force function depicted in FIG. 13b may be consistent with a diagonal from 40,0 to 0,40 of spatial force function 1414.

Figure 14C:
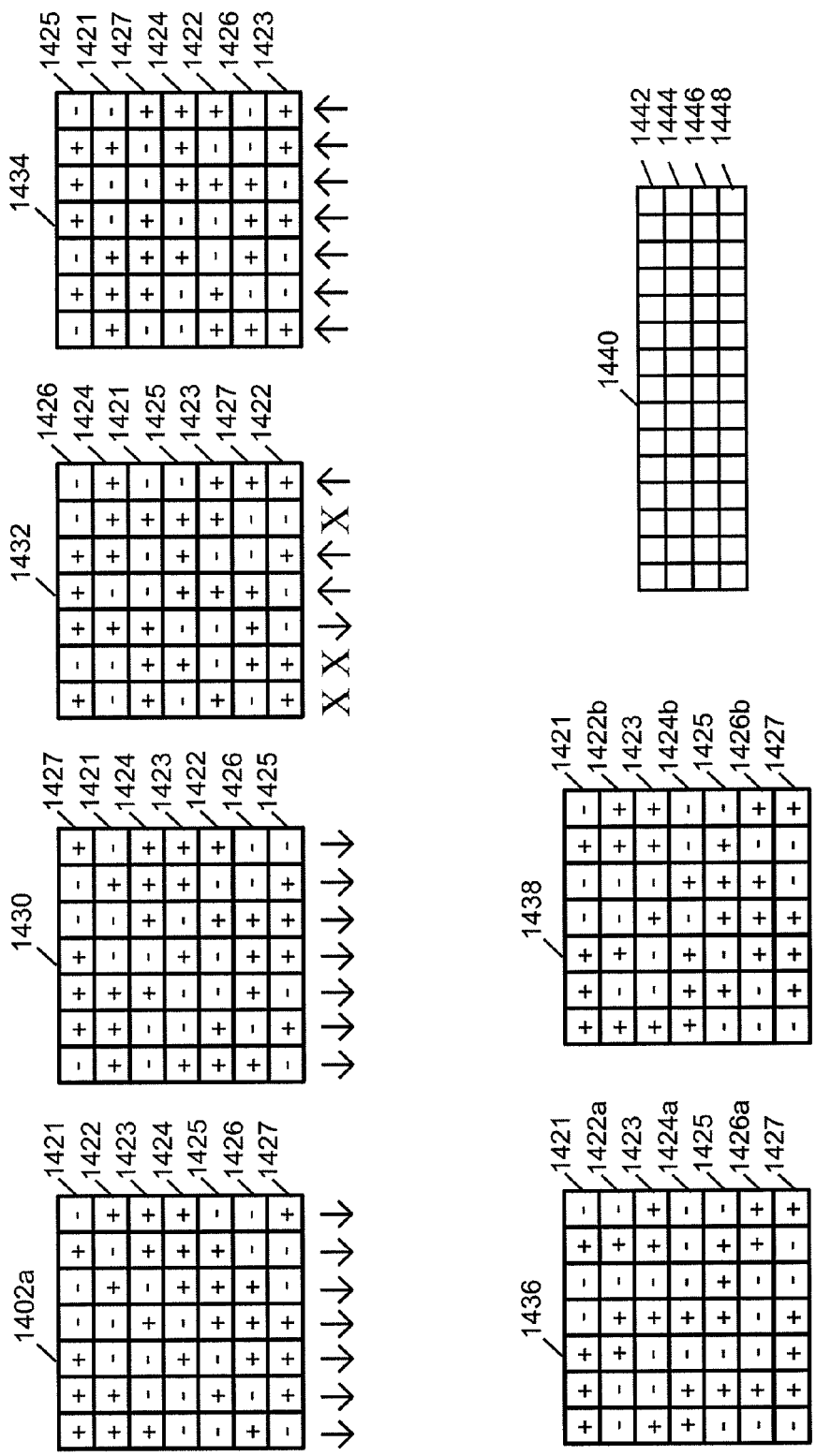
FIG. 14c depicts variations of a magnetic field emission structure where rows are reordered randomly in an attempt to affect its directionality characteristics.

FIG. 14c depicts variations of magnetic field emission structure 1402a where rows are reordered randomly in an attempt to affect its directionality characteristics. As shown, the rows of 1402a are numbered from top to bottom 1421 through 1427. A second magnetic field emission structure 1430 is produced by reordering the rows to 1427, 1421, 1424, 1423, 1422, 1426, and 1425. When viewing the seven columns produced, each follows the Barker 7 code pattern wrapping downward. A third magnetic field emission structure 1432 is produced by reordering the rows to 1426, 1424, 1421, 1425, 1423, 1427, and 1422. When viewing the seven columns produced, the first, second, and sixth columns do not follow the Barker 7 code pattern while the third column follows the Barker 7 code pattern wrapping downward while the fourth, fifth and seven columns follow the Barker 7 code pattern wrapping upward. A fourth magnetic field emission structure 1434 is produced by reordering the rows 1425, 1421, 1427, 1424, 1422, 1426, and 1423. When viewing the seven columns produced, each follows the Barker 7 code pattern wrapping upward. A fifth magnetic field emission structure 1436 is produced by reversing the polarity of three of the rows of the first magnetic field emission structure 1402a. Specifically, the magnets of rows 1422a, 1424a and 1426a are reversed in polarity from the magnets of rows 1422, 1424, and 1426, respectively. Note that the code of 1402a has 28 "+" magnets and 21 "−" magnets; whereas, alternative fifth magnetic field emission structure 1436 has 25 "+" magnets and 24 "−" magnets—a nearly equal number. Thus, the far field of fifth magnetic field from structure 1436 will nearly cancel to zero, which can be valuable in some applications. A sixth magnetic field emission structure 1438 is produced by reversing the direction of three of the rows. Specifically, the direction of rows 1422b, 1424b and 1426b are reversed from 1422, 1424, and 1426, respectively. A seventh magnetic field emission structure 1440 is produced using four codes of low mutual cross correlation, for example four rows 1442, 1444, 1446, and 1448 each having a different 15 length Kasami code. Because the rows have low cross correlation and low autocorrelation, shifts either laterally or up and down (as viewed on the page) or both will result in low magnetic force. Generally, two dimensional codes may be generated by combining multiple single dimensional codes. In particular, the single dimensional codes may be selected from sets of codes with known low mutual cross correlation. Gold codes and Kasami codes are two examples of such codes, however other code sets may also be used.

More generally, FIG. 14c illustrates that two dimensional codes may be generated from one dimensional codes by assembling successive rows of one dimensional codes and that different two dimensional codes may be generated by varying each successive row by operations including but not limited to changing the order, shifting the position, reversing the direction, and/or reversing the polarity.

Additional magnet structures having low magnetic force with a first magnet structure generated from a set of low cross correlation codes may be generated by reversing the polarity of the magnets or by using different subsets of the set of available codes. For example, rows 1442 and 1444 may form a first magnet structure and rows 1446 and 1448 may form a second magnet structure. The complementary magnet structure of the first magnet structure will have low force reaction to the second magnet structure, and conversely, the complementary magnet structure of the second magnet structure will have a low force reaction to the first magnet structure. Alternatively, if lateral or up and down movement is restricted, an additional low interaction magnet structure may be generated by shifting (rotating) the codes or changing the order of the rows. Movement may be restricted by such mechanical features as alignment pins, channels, stops, container walls or other mechanical limits.

Figure 14D:
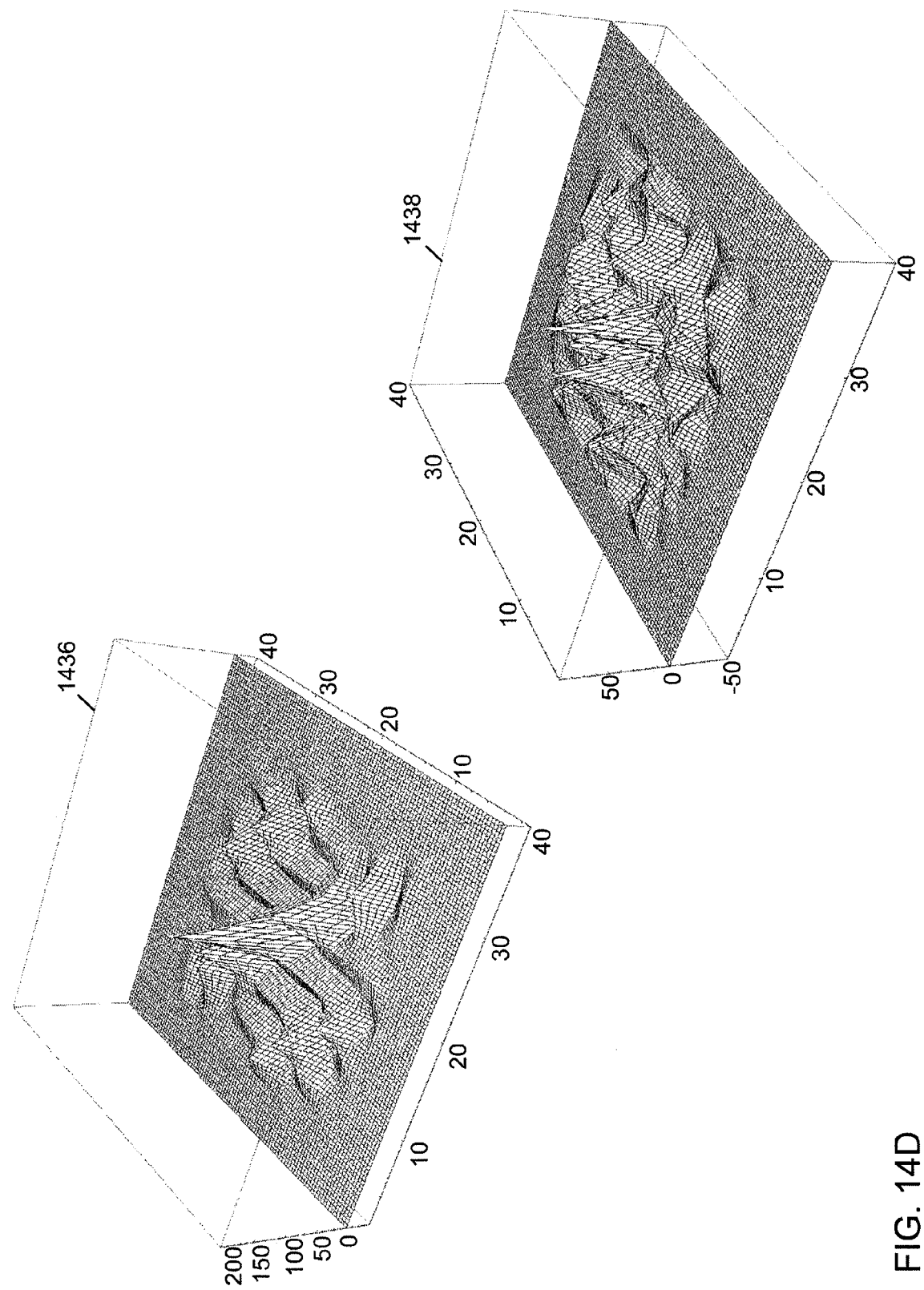
FIGS. 14d and 14e depict exemplary spatial force functions of selected magnetic field emission structures having randomly reordered rows moving across mirror image magnetic field emission structures both without rotation and as rotated −90, respectively.

FIG. 14d depicts a spatial force function 1450 resulting from the second magnetic field emission structure 1430 moving across its mirror image structure in one direction 1404 and a spatial force function 1452 resulting from the second magnetic field emission structure 1430 after being rotated −90° moving in the same direction 1404 across the mirror image of the second magnetic field emission structure 1430.

Figure 14E:
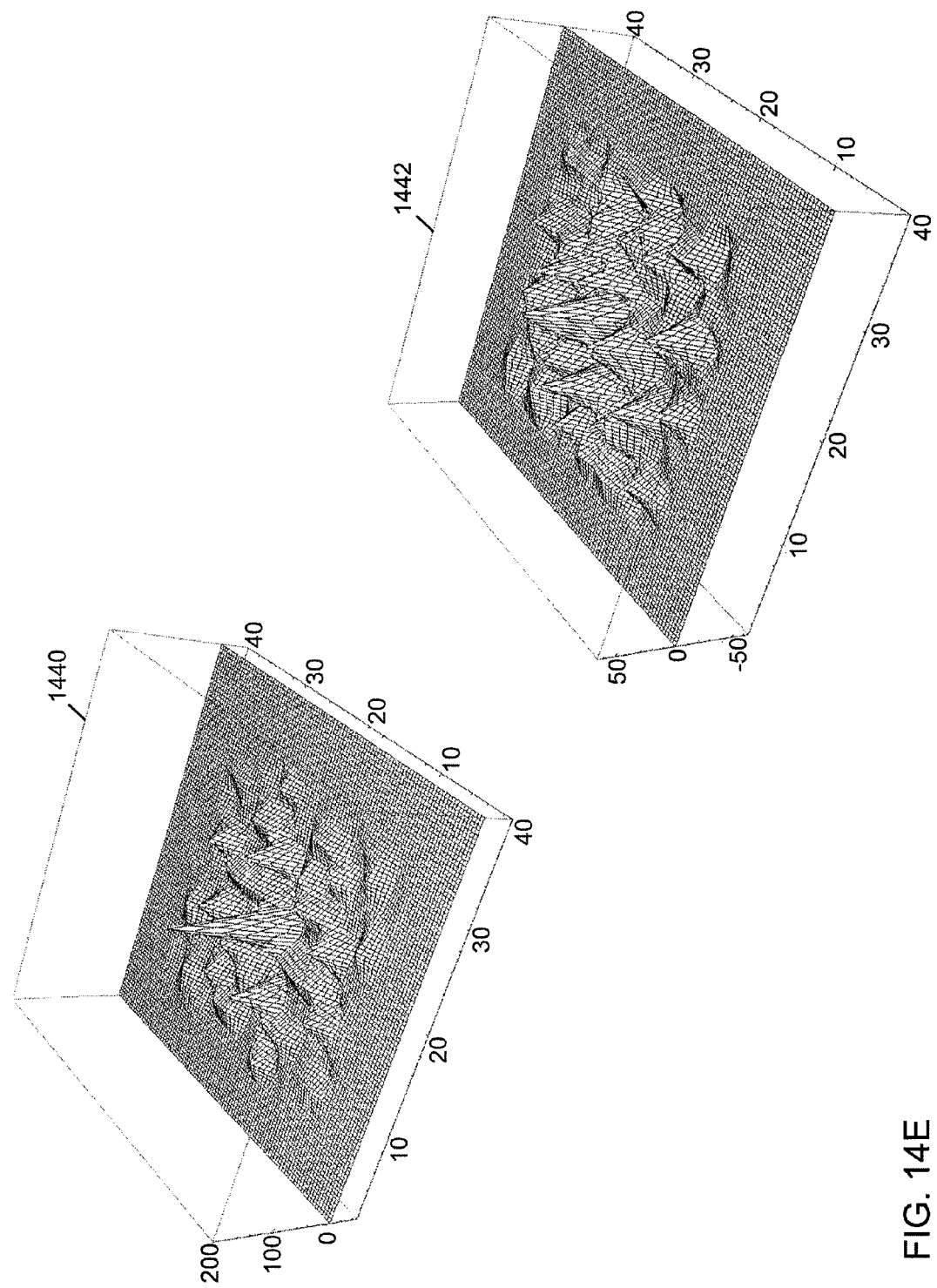

FIG. 14e depicts a spatial force function 1454 resulting from fourth magnetic field emission structure 1434 moving across its mirror image magnetic field emission structure in a direction 1404 and a spatial force function 1456 resulting from the fourth magnetic field emission structure 1434 being rotated −90° and moving in the same direction 1404 across its mirror image magnetic field emission structure.

Figure 15:
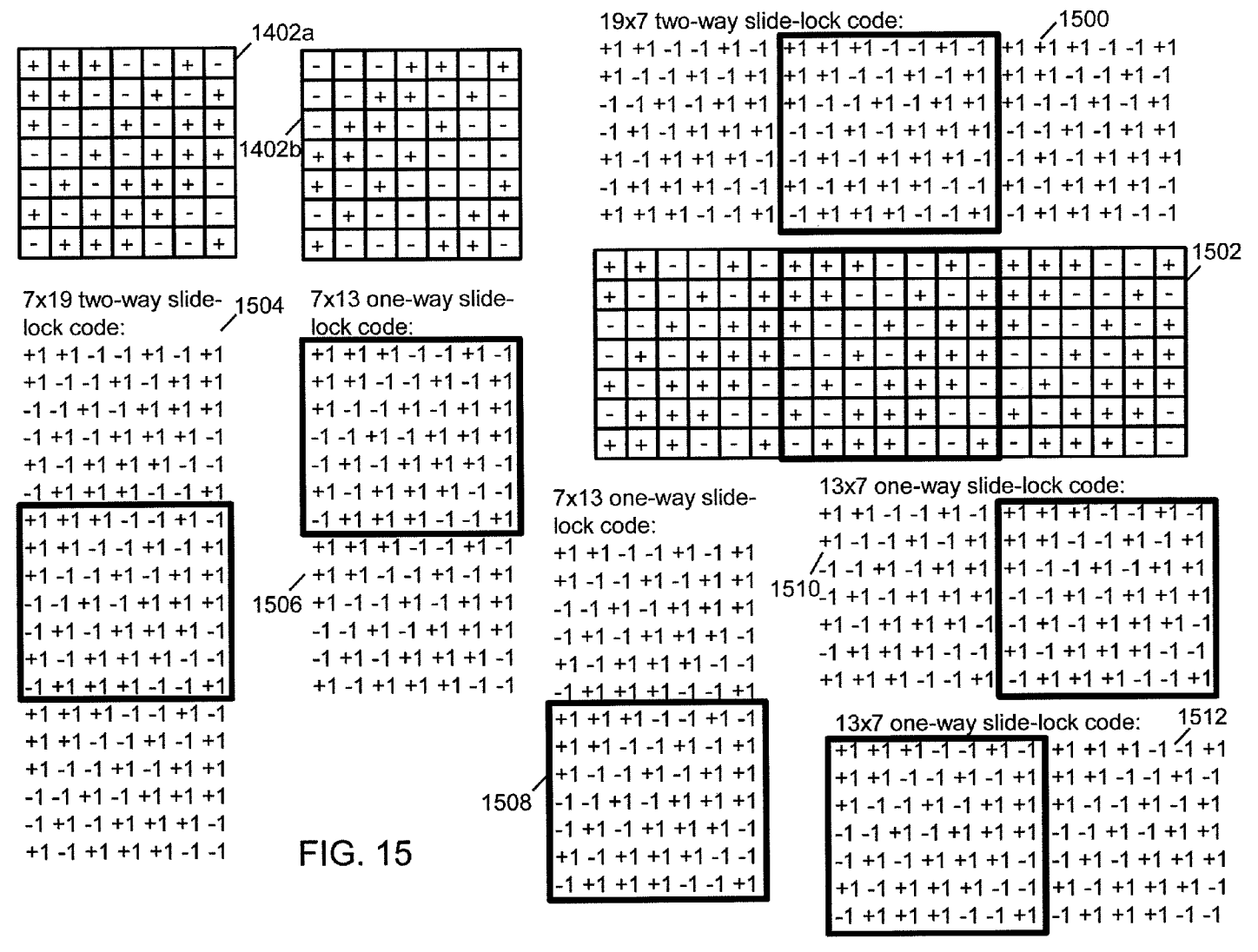

FIG. 15 depicts exemplary one-way slide lock codes and two-way slide lock codes. Referring to FIG. 15, a 19×7 two-way slide lock code 1500 is produced by starting with a copy of the 7×7 code 1402 and then by adding the leftmost 6 columns of the 7×7 code 1402a to the right of the code 1500 and the rightmost 6 columns of the 7×7 code to the left of the code 1550. As such, as the mirror image 1402b slides from side-to-side, all 49 magnets are in contact with the structure producing the autocorrelation curve of FIG. 10 from positions 1 to 13. Similarly, a 7×19 two-way slide lock code 1504 is produced by adding the bottommost 6 rows of the 7×7 code 1402a to the top of the code 1504 and the topmost 6 rows of the 7×7 code 1402a to the bottom of the code 1504. The two structures 1500 and 1504 behave the same where as a magnetic field emission structure 1402a is slid from side to side it will lock in the center with +49 while at any other point off center it will be repelled with a force of −7. Similarly, one-way slide lock codes 1506, 1508, 1510, and 1512 are produced by adding six of seven rows or columns such that the code only partially repeats. Generally, various configurations (i.e., plus shapes, L shapes, Z shapes, donuts, crazy eight, etc.) can be created by continuing to add partial code modulos onto the structures provided in FIG. 15. As such, various types of locking mechanisms can be designed. Note that with the two-dimensional field emission structure 1402a a top down view of the top of the structure is depicted such that the poles of each magnet facing up are shown, whereas with the two-dimensional mirror image field emission structure 1402b, a top down view of the bottom of the structure is depicted such that the poles of each magnet facing down are shown.

FIG. 16a depicts a hover code 1600 produced by placing two code modulos 1402a side-by-side and then removing the first and last columns of the resulting structure. As such, a mirror image 1402b can be moved across a resulting magnetic field emission structure from one side 1602a to the other side 1602f and at all times achieve a spatial force function of −7. Hover channel (or box) 1604 is shown where mirror image 1402b is hovering over a magnetic field emission structure produced in accordance with hover code 1600. With this approach, a mirror image 1402b can be raised or lowered by increasing or decreasing the magnetic field strength of the magnetic field emission structure below. Similarly, a hover channel 1606 is shown where a mirror image 1402 is hovering between two magnetic field emission structures produced in accordance with the hover code 1600. With this approach, the mirror image 1402b can be raised or lowered by increasing and decreasing the magnetic field strengths of the magnetic field emission structure below and the magnetic field emission structure above. As with the slide lock codes, various configurations can be created where partial code modulos are added to the structure shown to produce various movement areas above which the movement of a hovering object employing magnetic field emission structure 1402b can be controlled via control of the strength of the magnetic in the structure and/or using other forces.

Figure 16B:
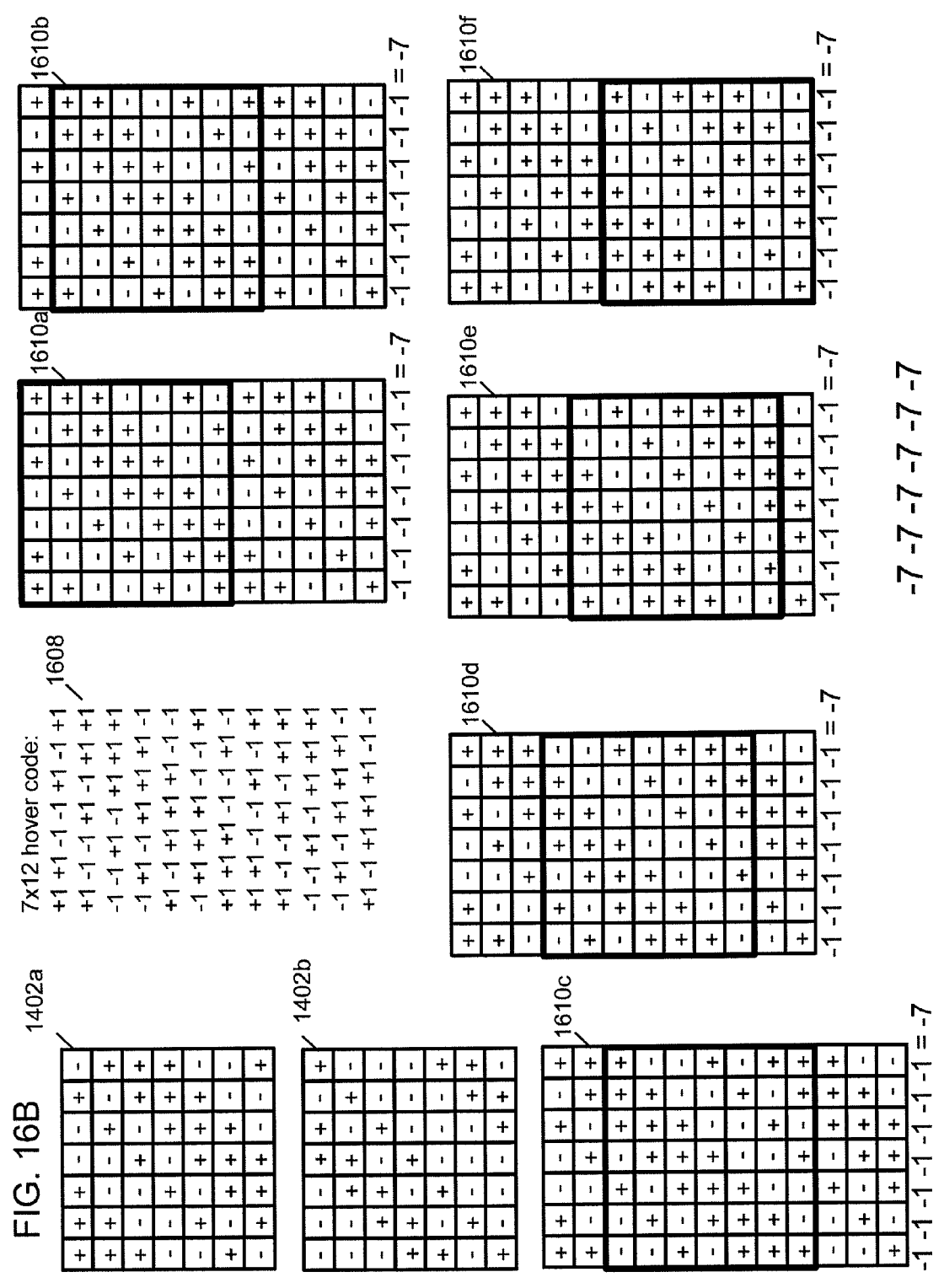

FIG. 16b depicts a hover code 1608 produced by placing two code modulos 1402a one on top of the other and then removing the first and last rows. As such, mirror image 1402b can be moved across a resulting magnetic field emission structure from upper side 1610a to the bottom side 1610f and at all time achieve a spatial force function of −7.

Figure 16C:
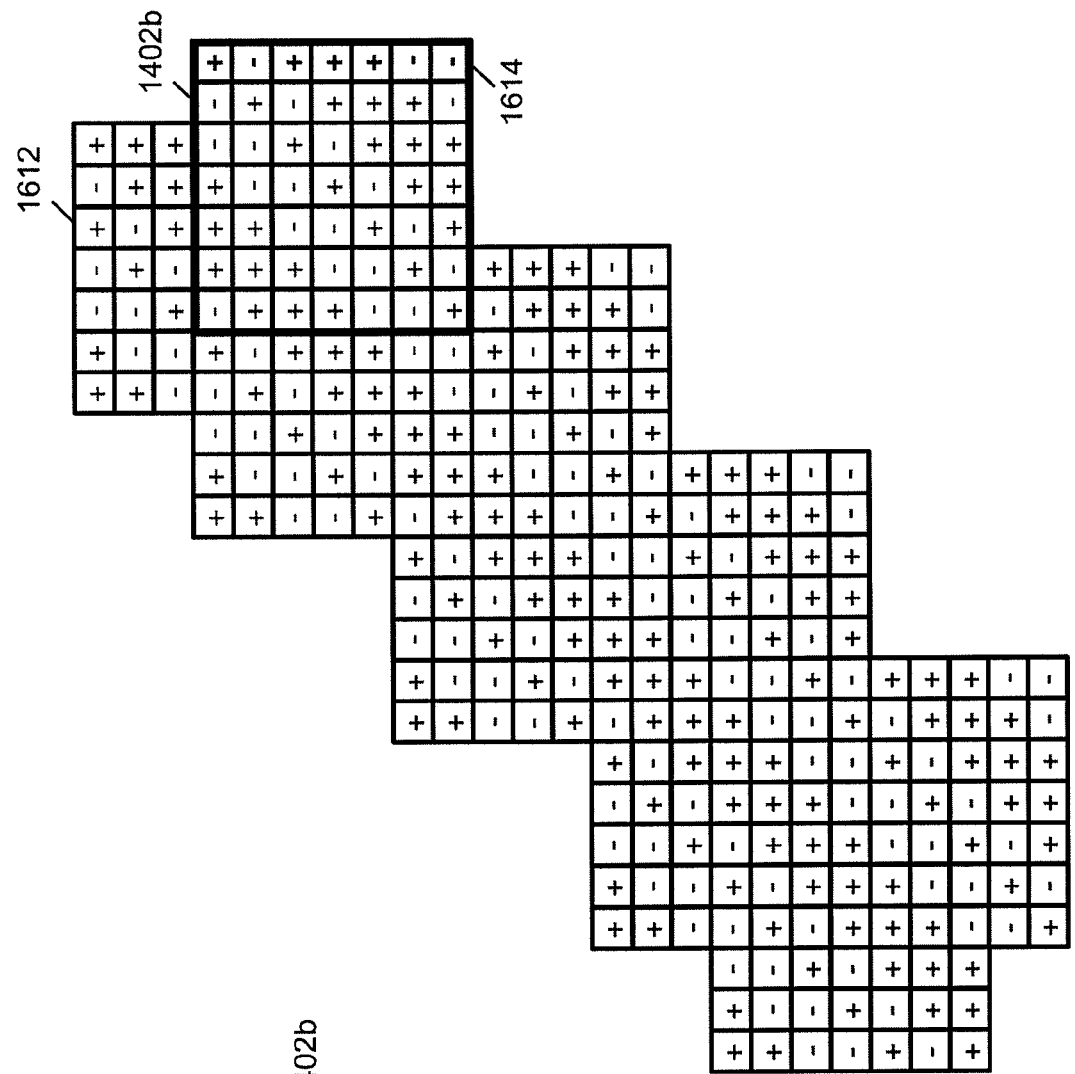
FIG. 16c depicts an exemplary magnetic field emission structure where a mirror image magnetic field emission structure corresponding to a 7×7 barker-like code will hover anywhere above the structure provided it does not rotate.

FIG. 16c depicts an exemplary magnetic field emission structure 1612 where a mirror image magnetic field emission structure 1402b of a 7×7 barker-like code will hover with a −7 (repel) force anywhere above the structure 1612 provided it is properly oriented (i.e., no rotation). Various sorts of such structures can be created using partial code modulos. Should one or more rows or columns of magnets have its magnetic strength increased (or decreased) then the magnetic field emission structure 1402b can be caused to move in a desired direction and at a desired velocity. For example, should the bolded column of magnets 1614 have magnetic strengths that are increased over the strengths of the rest of the magnets of the structure 1612, the magnetic field emission structure 1402b will be propelled to the left. As the magnetic field emission structure moves to the left, successive columns to the right might be provided the same magnetic strengths as column 1614 such that the magnetic field emission structure is repeatedly moved leftward. When the structure 1402b reaches the left side of the structure 1612 the magnets along the portion of the row beneath the top of structure 1402b could then have their magnetic strengths increased causing structure 1402b to be moved downward. As such, various modifications to the strength of magnets in the structure can be varied to effect movement of structure 1402b. Referring again to FIGS. 16a and 16b, one skilled in the art would recognize that the slide-lock codes could be similarly implemented so that when structure 1402b is slid further and further away from the alignment location (shown by the dark square), the magnetic strength of each row (or column) would become more and more increased. As such, structure 1402b could be slowly or quickly repelled back into its lock location. For example, a drawer using the slide-lock code with varied magnetic field strengths for rows (or columns) outside the alignment location could cause the drawer to slowly close until it locked in place. Variations of magnetic field strengths can also be implemented per magnet and do not require all magnets in a row (or column) to have the same strength.

FIG. 17a depicts a magnetic field emission structure 1702 comprising nine magnets positioned such that they half overlap in one direction. The structure is designed to have a peak spatial force when (substantially) aligned and have relatively minor side lobe strength at any rotation off alignment. The positions of the magnets are shown against a coordinate grid 1704. The center column of magnets forms a linear sequence of three magnets each centered on integer grid positions. Two additional columns of magnets are placed on each side of the center column and on adjacent integer column positions, but the row coordinates are offset by one half of a grid position. More particularly, the structure comprises nine magnets at relative coordinates of +1(0,0), −1(0,1), +1(0,2), −1(1,0.5), +1(1,1.5), −1(1,2.5), +1(2,0), −1(2,1), +1(2,2), where within the notation s(x,y), "s" indicates the magnet strength and polarity and "(x,y)" indicates x and y coordinates of the center of the magnet relative to a reference position (0,0). The magnet structure, according to the above definition is then placed such that magnet +1(0,0) is placed at location (9,9.5) in the coordinate frame 1704 of FIG. 17a.

When paired with a complementary structure, and the force is observed for various rotations of the two structures around the center coordinate at (10, 11), the structure 1702 has a peak spatial force when (substantially) aligned and has relatively minor side lobe strength at any rotation off alignment FIG. 17b depicts the spatial force function 1706 of a magnetic field emission structure 1702 interacting with its mirror image magnetic field emission structure. The peak 1708 occurs when substantially aligned.

FIG. 18a depicts an exemplary code 1802 intended to produce a magnetic field emission structure having a first stronger lock when aligned with its mirror image magnetic field emission structure and a second weaker lock when rotated 90° relative to its mirror image magnetic field emission structure. FIG. 18a shows magnet structure 1802 is against a coordinate grid 1804. The magnet structure 1802 of FIG. 18a comprises magnets at positions: −1(3,7), −1(4,5), −1(4,7), +1(5,3), +1(5,7), −1(5,11), +1(6,5), −1(6,9), +1(7,3), −1(7,7), +1(7,11), −1(8,5), −1(8,9), +1(9,3), −1(9,7), +1(9, 11), +1(10,5), −1(10,9) +1(11,7). Additional field emission structures may be derived by reversing the direction of the x coordinate or by reversing the direction of the y coordinate or by transposing the x and y coordinates.

FIG. 18*b* depicts spatial force function 1806 of a magnetic field emission structure 1802 interacting with its mirror image magnetic field emission structure. The peak occurs when substantially aligned.

FIG. 18*c* depicts the spatial force function 1808 of magnetic field emission structure 1802 interacting with its mirror magnetic field emission structure after being rotated 90°. The peak occurs when substantially aligned but one structure rotated 90°.

Figure 19C:
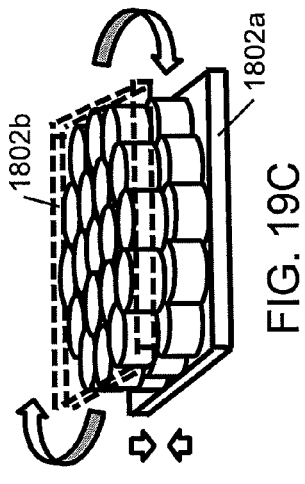
FIGS. 19a-19i depict the exemplary magnetic field emission structure of FIG. 18a and its mirror image magnetic field emission structure and the resulting spatial forces produced in accordance with their various alignments as they are twisted relative to each other.
Figure 19F:
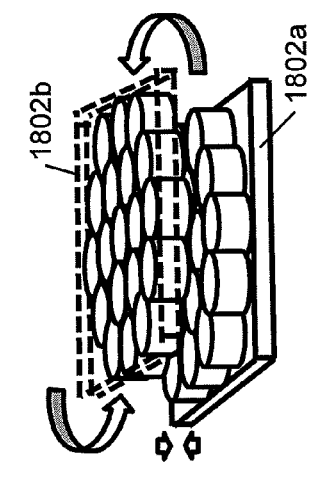
Figure 19I:
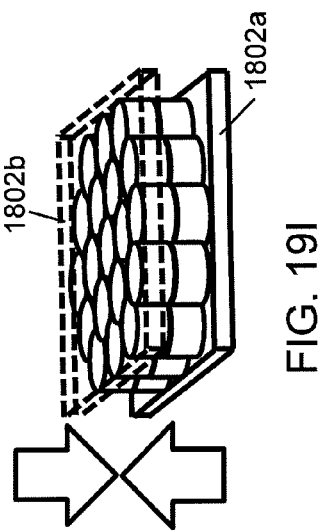
Figure 19B:
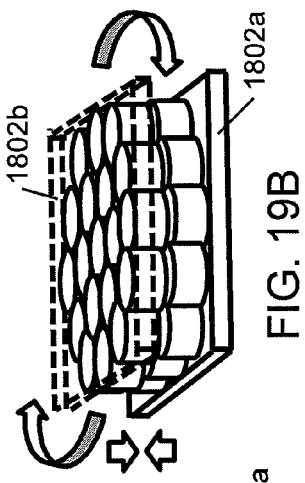
Figure 19E:
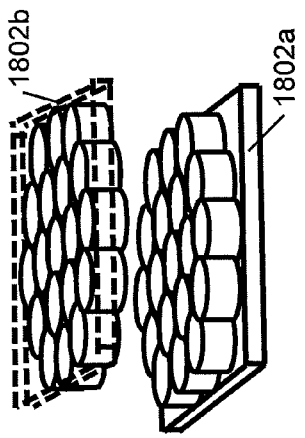
Figure 19H:
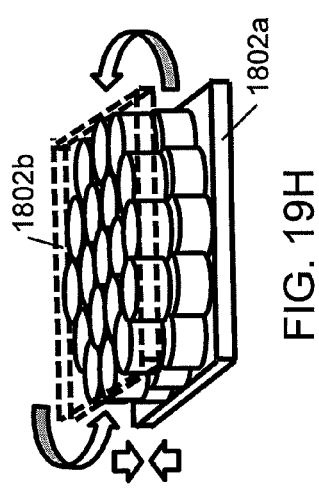
Figure 19A:
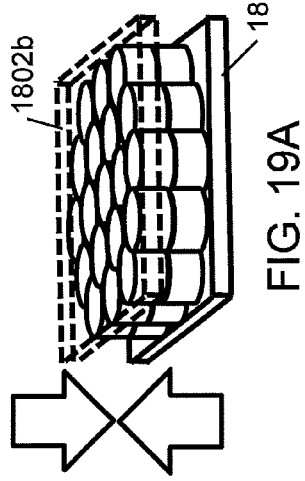
Figure 19D:
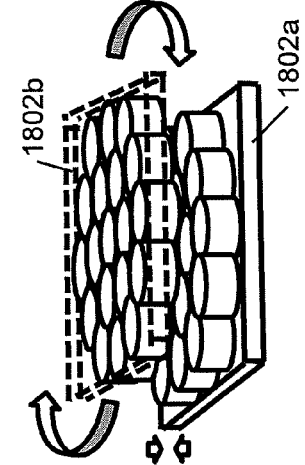
Figure 19G:
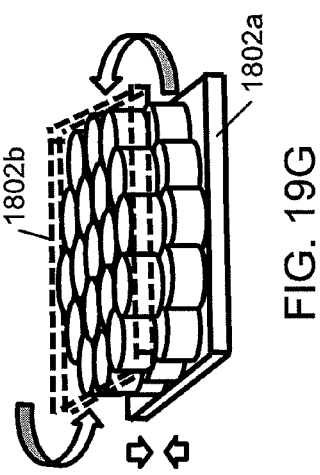

FIGS. 19*a*-19*i* depict the exemplary magnetic field emission structure 1802*a* and its mirror image magnetic field emission structure 1802*b* and the resulting spatial forces produced in accordance with their various alignments as they are twisted relative to each other. In FIG. 19*a*, the magnetic field emission structure 1802*a* and the mirror image magnetic field emission structure 1802*b* are aligned producing a peak spatial force. In FIG. 19*b*, the mirror image magnetic field emission structure 1802*b* is rotated clockwise slightly relative to the magnetic field emission structure 1802*a* and the attractive force reduces significantly. In FIG. 19*c*, the mirror image magnetic field emission structure 1802*b* is further rotated and the attractive force continues to decrease. In FIG. 19*d*, the mirror image magnetic field emission structure 1802*b* is still further rotated until the attractive force becomes very small, such that the two magnetic field emission structures are easily separated as shown in FIG. 19*e*. Given the two magnetic field emission structures held somewhat apart as in FIG. 19*e*, the structures can be moved closer and rotated towards alignment producing a small spatial force as in FIG. 19*f*. The spatial force increases as the two structures become more and more aligned in FIGS. 19*g* and 19*h* and a peak spatial force is achieved when aligned as in FIG. 19*i*. It should be noted that the direction of rotation was arbitrarily chosen and may be varied depending on the code employed. Additionally, the mirror image magnetic field emission structure 1802*b* is the mirror of magnetic field emission structure 1802*a* resulting in an attractive peak spatial force. The mirror image magnetic field emission structure 1802*b* could alternatively be coded such that when aligned with the magnetic field emission structure 1802*a* the peak spatial force would be a repelling force in which case the directions of the arrows used to indicate amplitude of the spatial force corresponding to the different alignments would be reversed such that the arrows faced away from each other.

Figure 20B:
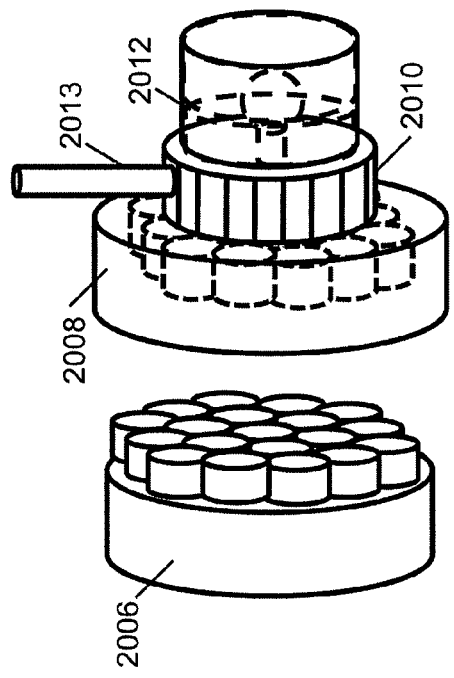
FIG. 20b depicts exemplary magnetic field emission structures having exemplary housings configured such that one housing can be inserted inside the other housing, exemplary alternative turning mechanism, exemplary swivel mechanism, an exemplary lever.
Figure 20A:
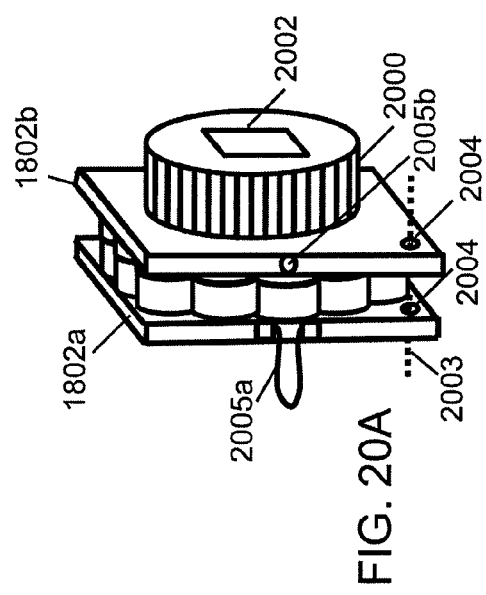
FIG. 20a depicts exemplary magnetic field emission structures, an exemplary turning mechanism, an exemplary tool insertion slot, exemplary alignment marks, an exemplary latch mechanism, and an exemplary axis for an exemplary pivot mechanism.

FIG. 20*a* depicts two magnetic field emission structures 1802*a* and 1802*b*. One of the magnetic field emission structures 1802*b* includes a turning mechanism 2000 that includes a tool insertion slot 2002. Both magnetic field emission structures include alignment marks 2004 along an axis 2003. A latch mechanism such as the hinged latch clip 2005*a* and latch knob 2005*b* may also be included preventing movement (particularly turning) of the magnetic field emission structures once aligned. Under one arrangement, a pivot mechanism (not shown) could be used to connect the two structures 1802*a*, 1802*b* at a pivot point such as at pivot location marks 2004 thereby allowing the two structures to be moved into or out of alignment via a circular motion about the pivot point (e.g., about the axis 2003).

FIG. 20*b* depicts a first circular magnetic field emission structure housing 2006 and a second circular magnetic field emission structure housing 2008 configured such that the first housing 2006 can be inserted into the second housing 2008. The second housing 2008 is attached to an alternative turning mechanism 2010 that is connected to a swivel mechanism 2012 that would normally be attached to some other object. Also shown is a lever 2013 that can be used to provide turning leverage.

Figure 20C:
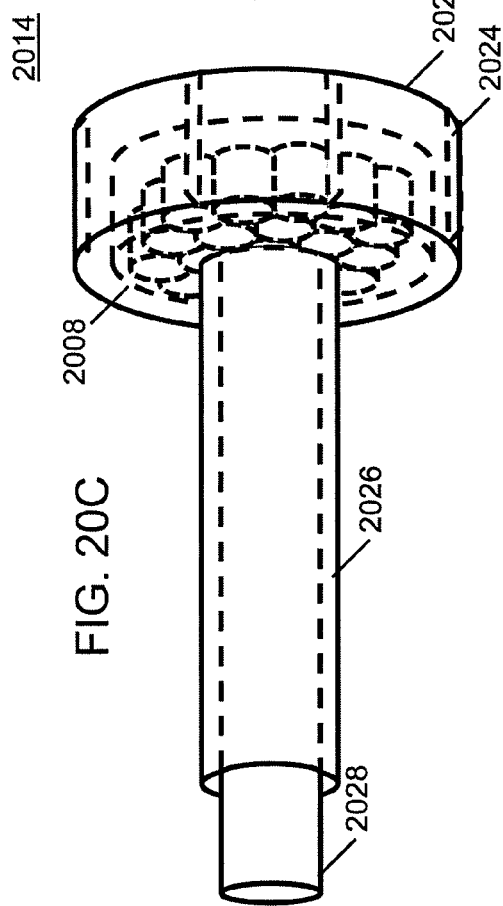
FIG. 20c depicts an exemplary tool assembly including an exemplary drill head assembly.

FIG. 20*c* depicts an exemplary tool assembly 2014 including a drill head assembly 2016. The drill head assembly 2016 comprises a first housing 2006 and a drill bit 2018. The tool assembly 2014 also includes a drill head turning assembly 2020 comprising a second housing 2008. The first housing 2006 includes raised guides 2022 that are configured to slide into guide slots 2024 of the second housing 2008. The second housing 2008 includes a first rotating shaft 2026 used to turn the drill head assembly 2016. The second housing 2008 also includes a second rotating shaft 2028 used to align the first housing 2006 and the second housing 2008.

FIG. 20*d* depicts an exemplary hole cutting tool assembly 2030 having an outer cutting portion 3032 including a first magnetic field emission structure 1802*a* and an inner cutting portion 2034 including a second magnetic field emission structure 1802*b*. The outer cutting portion 2032 comprises a first housing 2036 having a cutting edge 2038. The first housing 2036 is connected to a sliding shaft 2040 having a first bump pad 2042 and a second bump pad 2044. It is configured to slide back and forth inside a guide 2046, where movement is controlled by the spatial force function of the first and second magnetic field emission structures 1802*a* and 1802*b*. The inner cutting portion 2034 comprises a second housing 2048 having a cutting edge 2050. The second housing 2048 is maintained in a fixed position by a first shaft 2052. The second magnetic field emission structure 1802*b* is turned using a shaft 2054 so as to cause the first and second magnetic field emission structures 1802*a* and 1802*b* to align momentarily at which point the outer cutting portion 2032 is propelled towards the inner cutting potion 2034 such that cutting edges 2038 and 2050 overlap. The circumference of the first housing 2036 is slightly larger than the second housing 2048 so as to cause the two cutting edges 2038 and 2050 to precisely cut a hole in something passing between them (e.g., cloth). As the shaft 2054 continues to turn, the first and second magnetic field emission structures 1802*a* and 1802*b* quickly become misaligned whereby the outer cutting portion 2032 is propelled away from the inner cutting portion 2034. Furthermore, if the shaft 2054 continues to turn at some revolution rate (e.g., 1 revolution/second) then that rate defines the rate at which holes are cut (e.g., in the cloth). As such, the spatial force function can be controlled as a function of the movement of the two objects to which the first and second magnetic field emission structures are associated. In this instance, the outer cutting portion 3032 can move from left to right and the inner cutting portion 2032 turns at some revolution rate.

FIG. 20*e* depicts an exemplary machine press tool comprising a bottom portion 2058 and a top portion 2060. The bottom portion 2058 comprises a first tier 2062 including a first magnetic field emission structure 1802*a*, a second tier 2064 including a second magnetic field emission structure 2066*a*, and a flat surface 2068 having below it a third magnetic field emission structure 2070*a*. The top portion 2060 comprises a first tier 2072 including a fourth magnetic field emission structure 1802*b* having mirror coding as the first magnetic field emission structure 1802*a*, a second tier 2074 including a fifth magnetic field emission structure 2066*b* having mirror coding as the second magnetic field emission structure 2066*a*, and a third tier 2076 including a sixth magnetic field emission structure 2070*b* having mirror coding as the third magnetic field emission structure 2070*a*. The second and third tiers of the top portion 2060 are configured to receive the two tiers of the bottom portion 2058. As the bottom and top portions 2058, 2060 are brought close to each other and the top portion 2060 becomes aligned with the bottom portion 2058 the spatial force functions of the complementary pairs of magnetic field emission structures causes a pressing of any material (e.g., aluminum) that is placed between the two portions. By turning either the bottom portion 2058 or the top portion 2060, the magnetic field emission structures become misaligned such that the two portions separate.

FIG. 20f depicts an exemplary gripping apparatus 2078 including a first part 2080 and a second part 2082. The first part 2080 comprises a saw tooth or stairs like structure where each tooth (or stair) has corresponding magnets making up a first magnetic field emission structure 2084a. The second part 2082 also comprises a saw tooth or stairs like structure where each tooth (or stair) has corresponding magnets making up a second magnetic field emission structure 2084b that is a mirror image of the first magnetic field emission structure 2084a. Under one arrangement each of the two parts shown are cross-sections of parts that have the same cross section as rotated up to 360° about a center axis 2086. Generally, the present invention can be used to produce all sorts of holding mechanism such as pliers, jigs, clamps, etc. As such, the present invention can provide a precise gripping force and inherently maintains precision alignment.

Figure 20G:
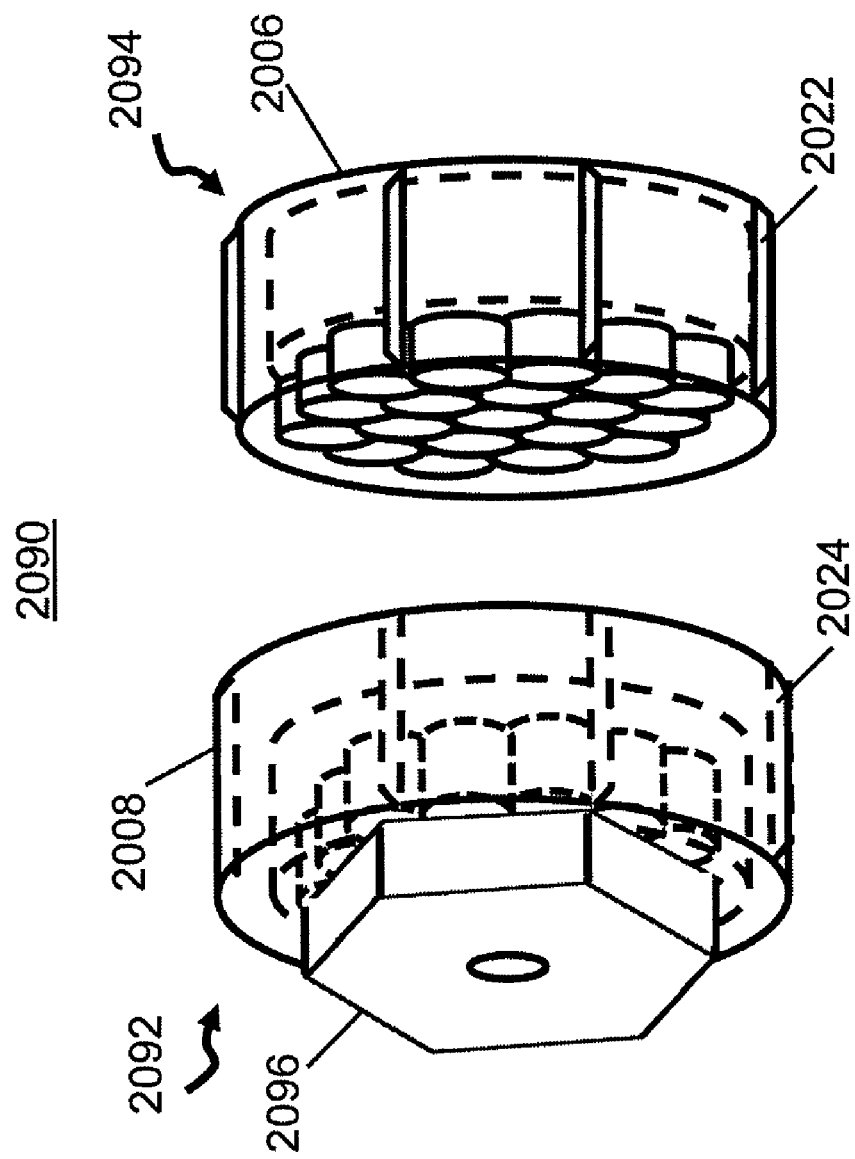
FIG. 20g depicts an exemplary clasp mechanism including a magnetic field emission structure slip ring mechanism.

FIG. 20g depicts an exemplary clasp mechanism 2090 including a first part 2092 and a second part 2094. The first part 2092 includes a first housing 2008 supporting a first magnetic field emission structure. The second part 2094 includes a second housing 2006 used to support a second magnetic field emission structure. The second housing 2006 includes raised guides 2022 that are configured to slide into guide slots 2024 of the first housing 2008. The first housing 2008 is also associated with a magnetic field emission structure slip ring mechanism 2096 that can be turned to rotate the magnetic field emission structure of the first part 2092 so as to align or misalign the two magnetic field emission structures of the clasp mechanism 2090. Generally, all sorts of clasp mechanisms can be constructed in accordance with the present invention whereby a slip ring mechanism can be turned to cause the clasp mechanism to release. Such clasp mechanisms can be used as receptacle plugs, plumbing connectors, connectors involving piping for air, water, steam, or any compressible or incompressible fluid. The technology is also applicable to Bayonette Neil-Concelman (BNC) electronic connectors, Universal Serial Bus (USB) connectors, and most any other type of connector used for any purpose.

The gripping force described above can also be described as a mating force. As such, in certain electronics applications this ability to provide a precision mating force between two electronic parts or as part of a connection may correspond to a desired characteristic, for example, a desired impedance. Furthermore, the invention is applicable to inductive power coupling where a first magnetic field emission structure that is driven with AC will achieve inductive power coupling when aligned with a second magnetic field emission structure made of a series of solenoids whose coils are connected together with polarities according to the same code used to produce the first magnetic field emission structure. When not aligned, the fields will close on themselves since they are so close to each other in the driven magnetic field emission structure and thereby conserve power. Ordinary inductively coupled systems' pole pieces are rather large and cannot conserve their fields in this way since the air gap is so large.

Figure 21:
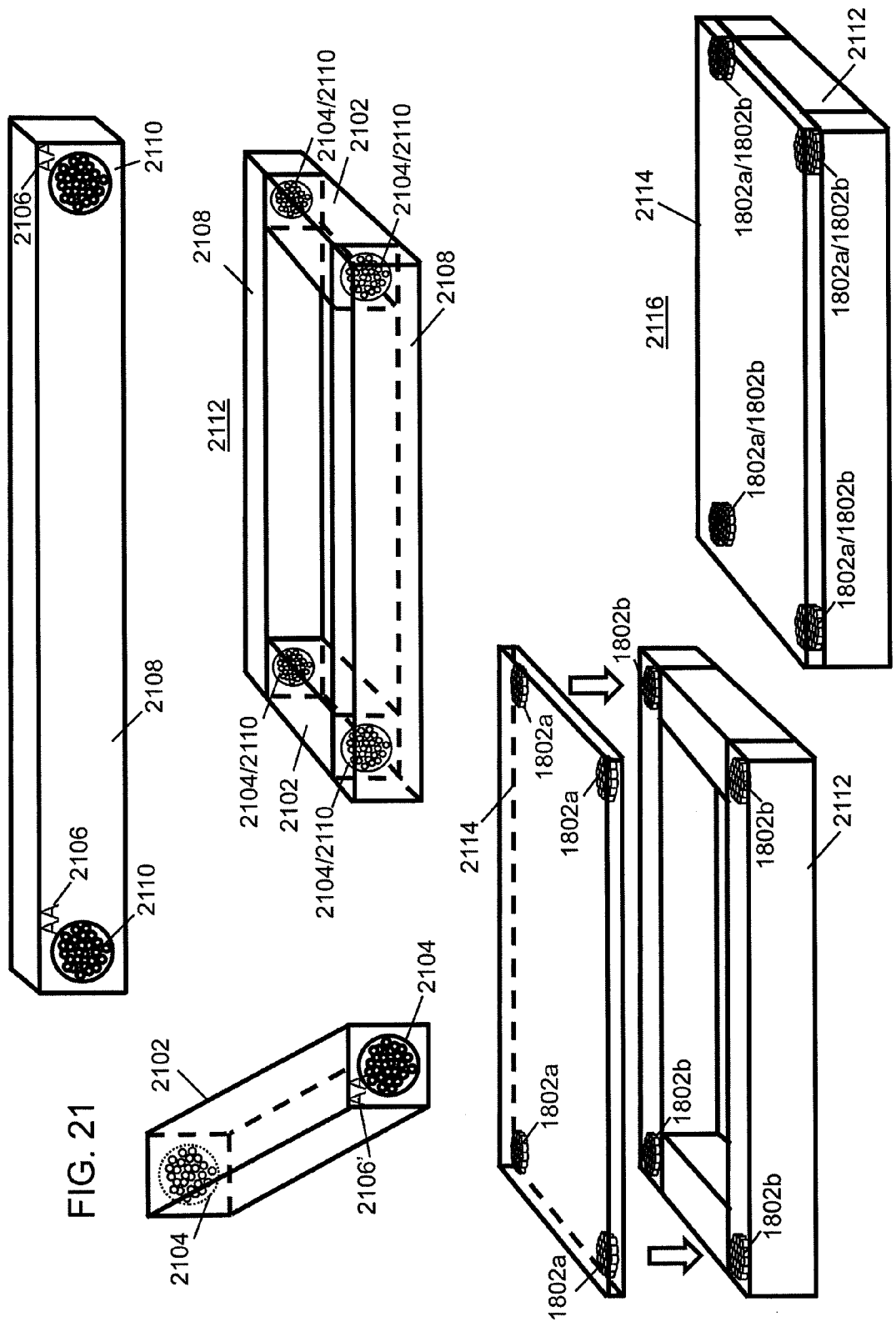
FIG. 21 depicts exemplary magnetic field emission structures used to assemble structural members and a cover panel to produce an exemplary structural assembly.

FIG. 21 depicts a first elongated structural member 2102 having magnetic field emission structures 2104 on each of two ends and also having an alignment marking 2106 ("AA").

FIG. 21 also depicts a second elongated structural member 2108 having magnetic field emission structures 2110 on both ends of one side and having alignment markings 2106 ("AA"). The magnetic field emission structures 2104 and 2110 are configured such that they can be aligned to attach the first and second structural members 2102 and 2108. FIG. 21 further depicts a structural assembly 2112 including two of the first elongated structural members 2102 attached to two of the second elongated structural members 2108 whereby four magnetic field emission structure pairs 2104/2110 are aligned. FIG. 21 includes a cover panel 2114 having four magnetic field emission structures 1802a that are configured to align with four magnetic field emission structures 1802b to attach the cover panel 2114 to the structural assembly 2112 to produce a covered structural assembly 2116. The markings shown could be altered so that structures that complement the AA structures are labeled AA'. Structures complementary to AA labeled structures could instead be labeled "aa". Additionally, various numbering or color coding schemes could be employed. For example, red AA labels could indicate structures complementary to structures having blue AA labels, etc. One skilled in the art will recognize that all sorts of approaches for labeling such structures could be used to enable one with less skill to easily understand which such structures are intended to be used together and which structures not intended to be used together.

Generally, the ability to easily turn correlated magnetic structures such that they disengage is a function of the torque easily created by a person's hand by the moment arm of the structure. The larger it is, the larger the moment arm, which acts as a lever. When two separate structures are physically connected via a structural member, as with the cover panel 2114, the ability to use torque is defeated because the moment arms are reversed. This reversal is magnified with each additional separate structure connected via structural members in an array. The force is proportional to the distance between respective structures, where torque is proportional to force times radius. As such, under one arrangement, the magnetic field emission structures of the covered structural assembly 2116 include a turning mechanism enabling them to be aligned or misaligned in order to assemble or disassemble the covered structural assembly. Under another arrangement, the magnetic field emission structures do not include a turning mechanism.

Figure 22:
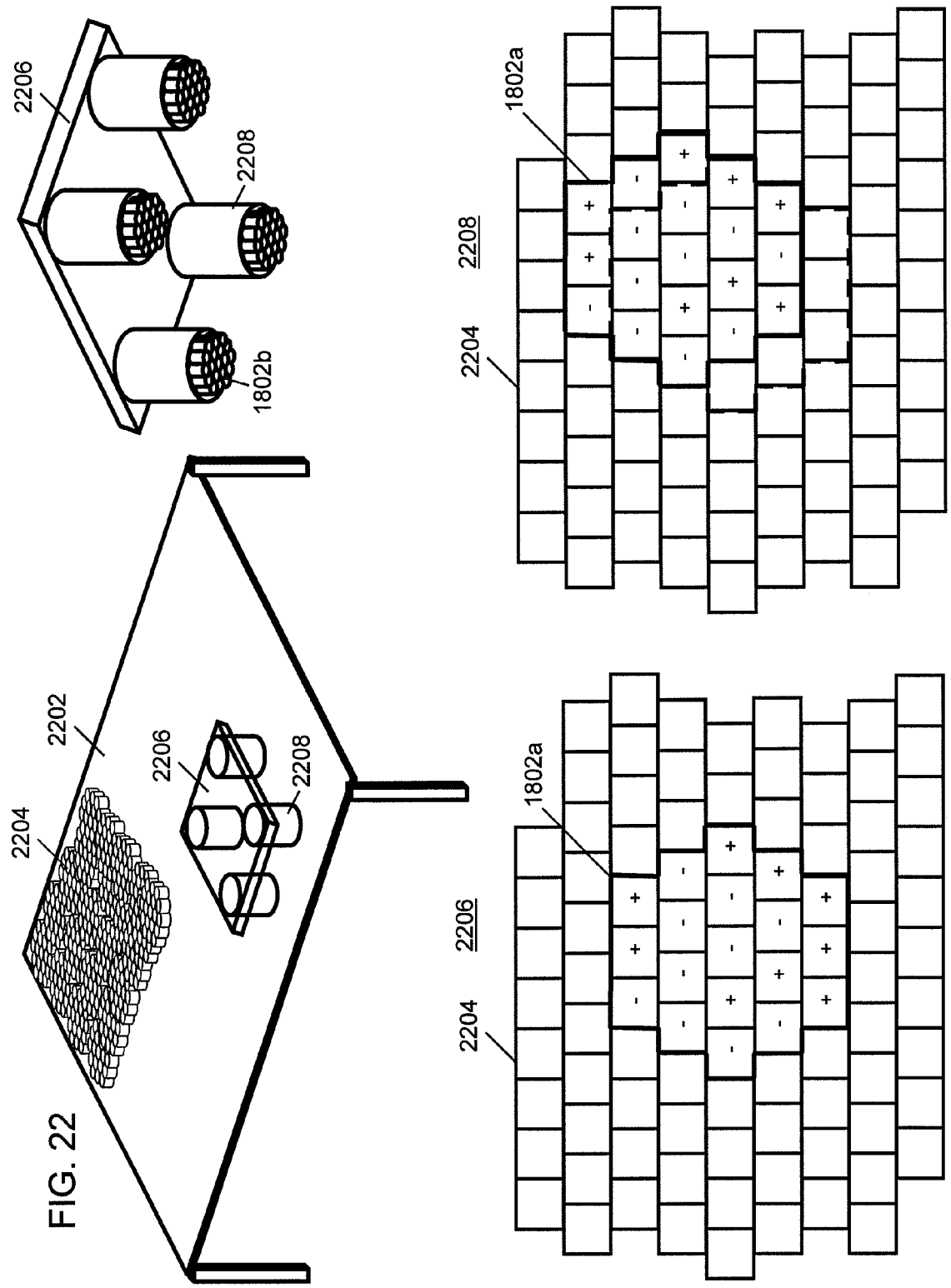
FIG. 22 depicts a table having beneath its surface a two-dimensional electromagnetic array where an exemplary movement platform having contact members with magnetic field emission structures can be moved by varying the states of the individual electromagnets of the electromagnetic array.
Figure 23:
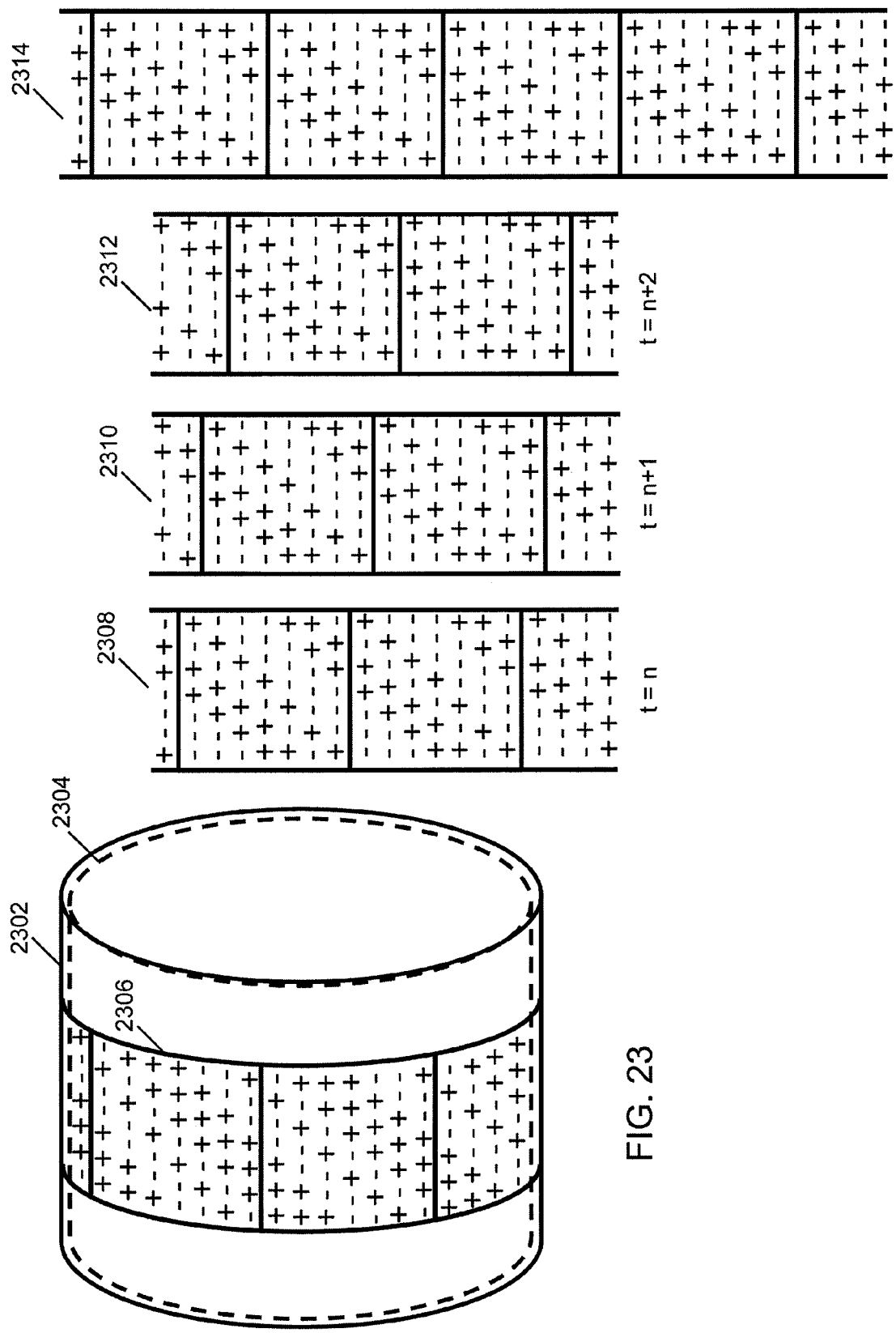
FIG. 23 depicts a cylinder inside another cylinder where either cylinder can be moved relative to the other cylinder by varying the state of individual electromagnets of an electromagnetic array associated with one cylinder relative to a magnetic field emission structure associated with the other cylinder.
Figure 24:
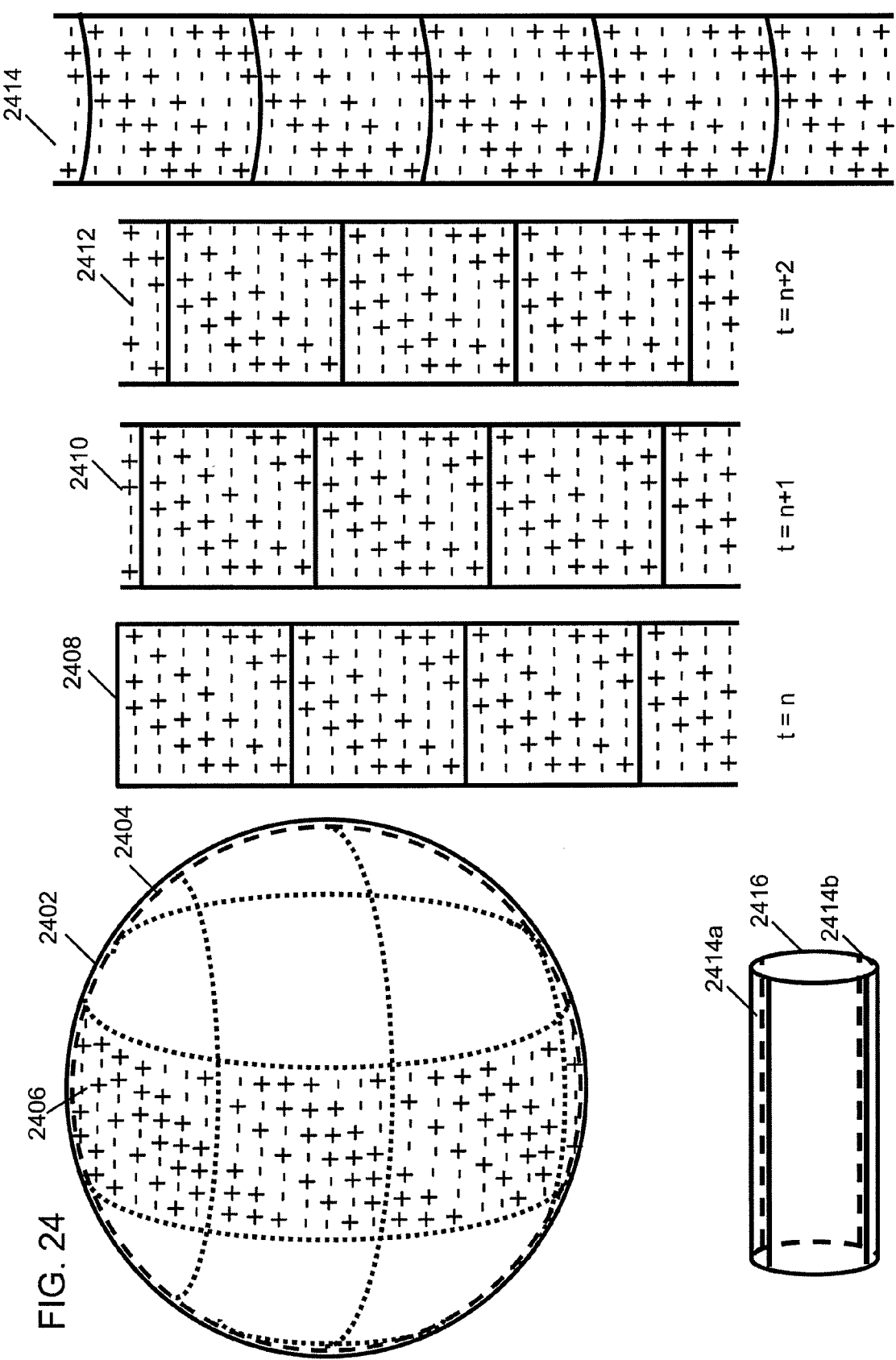
FIG. 24 depicts a sphere inside another sphere where either sphere can be moved relative to the other sphere by varying the state of individual electromagnets of an electromagnetic array associated with one sphere relative to a magnetic field emission structure associated with the other sphere.

FIGS. 22-24 depict uses of arrays of electromagnets used to produce a magnetic field emission structure that is moved in time relative to a second magnetic field emission structure associated with an object thereby causing the object to move.

FIG. 22 depicts a table 2202 having a two-dimensional electromagnetic array 2204 beneath its surface as seen via a cutout. On the table 2202 is a movement platform 2206 comprising at least one table contact member 2208. The movement platform 2206 is shown having four table contact members 2208 each having a magnetic field emission structure 1802b that would be attracted by the electromagnet array 2204. Computerized control of the states of individual electromagnets of the electromagnet array 2204 determines whether they are on or off and determines their polarity. A first example 2210 depicts states of the electromagnetic array 2204 configured to cause one of the table contact members 2208 to attract to a subset of the electromagnets corresponding to the magnetic field emission structure 1802a. A second example 2212 depicts different states of the electromagnetic array 2204 configured to cause the table contact member 2208 to be attracted (i.e., move) to a different subset of the electromagnetic corresponding to the magnetic field emission structure 1802a. Per the two examples, one skilled in the art can recognize that the table contact member(s) can be moved about table 2202 by varying the states of the electromagnets of the electromagnetic array 2204.

FIG. 23 depicts a first cylinder 2302 slightly larger than a second cylinder 2304 contained inside the first cylinder 2302. A magnetic field emission structure 2306 is placed around the first cylinder 2302 (or optionally around the second cylinder 2304). An array of electromagnets (not shown) is associated with the second cylinder 2304 (or optionally the first cylinder 2302) and their states are controlled to create a moving mirror image magnetic field emission structure to which the magnetic field emission structure 2306 is attracted so as to cause the first cylinder 2302 (or optionally the second cylinder 2304) to rotate relative to the second cylinder 2304 (or optionally the first cylinder 2302). The magnetic field emission structures 2308, 2310, and 2312 produced by the electromagnetic array at time t=n, t=n+1, and t=n+2, show a pattern mirroring that of the magnetic field emission structure 2306 around the first cylinder 2302. (Note: The mirror image notation employed for structures 2308, 2310, and 2310 is the same as previously used for FIG. 14a and in several other figures.) The pattern is shown moving downward in time so as to cause the first cylinder 2302 to rotate counterclockwise. As such, the speed and direction of movement of the first cylinder 2302 (or the second cylinder 2304) can be controlled via state changes of the electromagnets making up the electromagnetic array. Also depicted in FIG. 23 is a electromagnetic array 2314 that corresponds to a track that can be placed on a surface such that a moving mirror image magnetic field emission structure can be used to move the first cylinder 2302 backward or forward on the track using the same code shift approach shown with magnetic field emission structures 2308, 2310, and 2312.

FIG. 24 depicts a first sphere 2402 slightly larger than a second sphere 2404 contained inside the first sphere 2402. A magnetic field emission structure 2406 is placed around the first sphere 2402 (or optionally around the second sphere 2404). An array of electromagnets (not shown) is associated with the second sphere 2404 (or optionally the first sphere 2402) and their states are controlled to create a moving mirror image magnetic field emission structure to which the magnetic field emission structure 2406 is attracted so as to cause the first sphere 2402 (or optionally the second sphere 2404) to rotate relative to the second sphere 2404 (or optionally the first sphere 2402). The magnetic field emission structures 2408, 2410, and 2412 produced by the electromagnetic array at time t=n, t=n+1, and t=n+2, show a pattern mirroring that of the magnetic field emission structure 2406 around the first sphere 2402. (Note: The notation for a mirror image employed is the same as with FIG. 14a and other figures). The pattern is shown moving downward in time so as to cause the first sphere 2402 to rotate counterclockwise and forward. As such, the speed and direction of movement of the first sphere 2402 (or the second sphere 2404) can be controlled via state changes of the electromagnets making up the electromagnetic array. Also note that the electromagnets and/or magnetic field emission structure could extend so as to completely cover the surface(s) of the first and/or second spheres 2402, 2404 such that the movement of the first sphere 2402 (or second sphere 2404) can be controlled in multiple directions along multiple axes. Also depicted in FIG. 24 is an electromagnetic array 2414 that corresponds to a track that can be placed on a surface such that moving magnetic field emission structure can be used to move first sphere 2402 backward or forward on the track using the same code shift approach shown with magnetic field emission structures 2408, 2410, and 2412. A cylinder 2416 is shown having a first electromagnetic array 2414a and a second electromagnetic array 2414b which would control magnetic field emission structures to cause sphere 2402 to move backward or forward in the cylinder.

Figure 25:
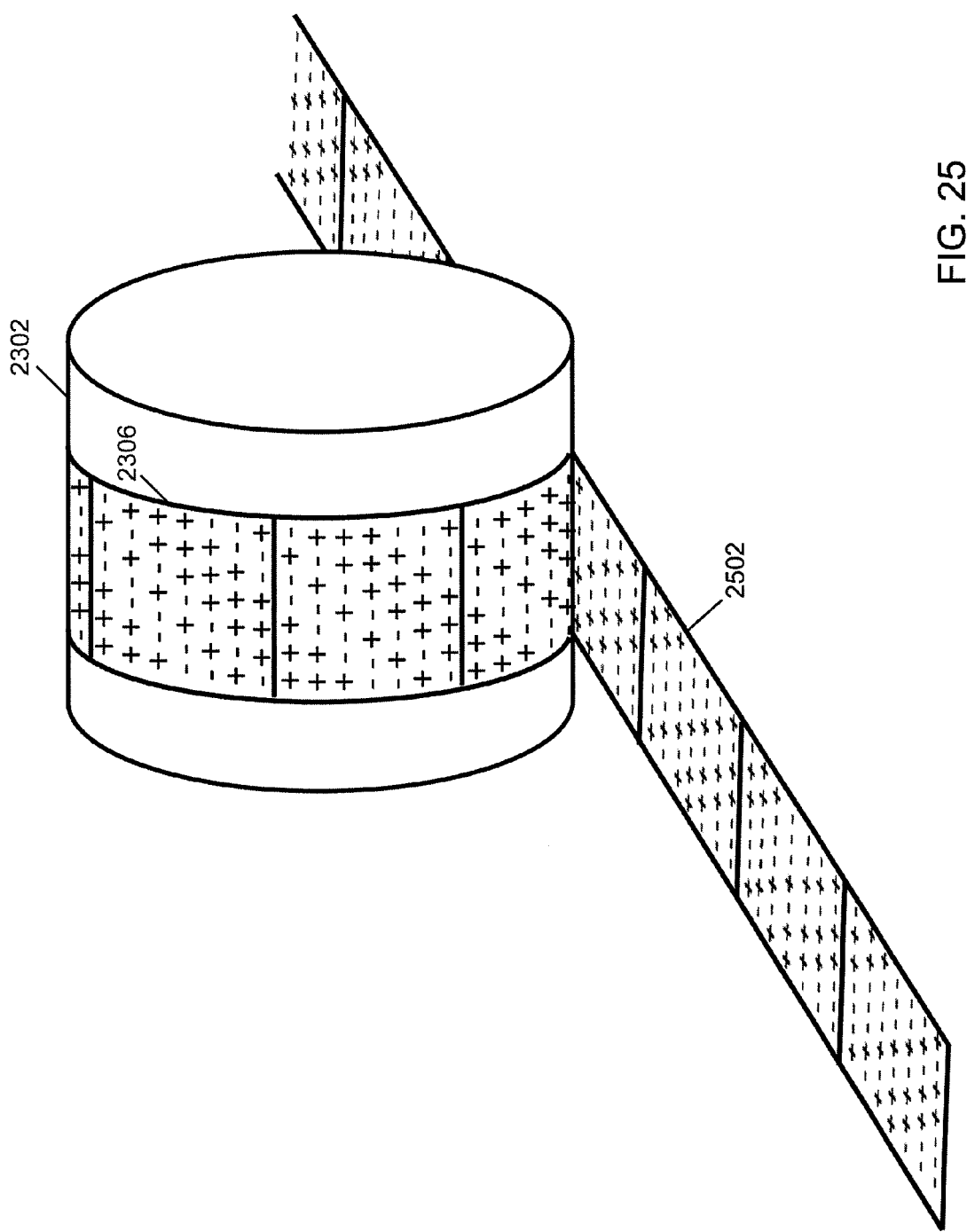
FIG. 25 depicts an exemplary cylinder having a magnetic field emission structure and a correlated surface where the magnetic field emission structure and the correlated surface provide traction and a gripping force as the cylinder is turned.

FIGS. 25-27 depict a correlating surface being wrapped back on itself to form either a cylinder (disc, wheel), a sphere, and a conveyor belt/tracked structure that when moved relative to a mirror image correlating surface will achieve strong traction and a holding (or gripping) force. Any of these rotary devices can also be operated against other rotary correlating surfaces to provide gear-like operation. Since the hold-down force equals the traction force, these gears can be loosely connected and still give positive, non-slipping rotational accuracy. Correlated surfaces can be perfectly smooth and still provide positive, non-slip traction. As such, they can be made of any substance including hard plastic, glass, stainless steel or tungsten carbide. In contrast to legacy friction-based wheels the traction force provided by correlated surfaces is independent of the friction forces between the traction wheel and the traction surface and can be employed with low friction surfaces. Devices moving about based on magnetic traction can be operated independently of gravity for example in weightless conditions including space, underwater, vertical surfaces and even upside down.

If the surface in contact with the cylinder is in the form of a belt, then the traction force can be made very strong and still be non-slipping and independent of belt tension. It can replace, for example, toothed, flexible belts that are used when absolutely no slippage is permitted. In a more complex application the moving belt can also be the correlating surface for self-mobile devices that employ correlating wheels. If the conveyer belt is mounted on a movable vehicle in the manner of tank treads then it can provide formidable traction to a correlating surface or to any of the other rotating surfaces described here.

FIG. 25 depicts an alternative approach to that shown in FIG. 23. In FIG. 25 a cylinder 2302 having a first magnetic field emission structure 2306 and being turned clockwise or counter-clockwise by some force will roll along a second magnetic field emission structure 2502 having mirror coding as the first magnetic field emission structure 2306. Thus, whereas in FIG. 23, an electromagnetic array was shifted in time to cause forward or backward movement, the fixed magnetic field emission structure 2502 values provide traction and a gripping (i.e., holding) force as cylinder 2302 is turned by another mechanism (e.g., a motor). The gripping force would remain substantially constant as the cylinder moved down the track independent of friction or gravity and could therefore be used to move an object about a track that moved up a wall, across a ceiling, or in any other desired direction within the limits of the gravitational force (as a function of the weight of the object) overcoming the spatial force of the aligning magnetic field emission structures. The approach of FIG. 25 can also be combined with the approach of FIG. 23 whereby a first cylinder having an electromagnetic array is used to turn a second cylinder having a magnetic field emission structure that also achieves traction and a holding force with a mirror image magnetic field emission structure corresponding to a track.

FIG. 26 depicts an alternative approach to that shown in FIG. 24. In FIG. 26 a sphere 2402 having a first magnetic field emission structure 2406 and being turned clockwise or counter-clockwise by some force will roll along a second magnetic field emission structure 2602 having mirror coding as the first magnetic field emission structure 2406. Thus, whereas in FIG. 24, an electromagnetic array was shifted in time to cause forward or backward movement, the fixed second magnetic field emission structure 2602 values provide traction and a gripping (i.e., holding) force as sphere 2402 is turned by another mechanism (e.g., a motor). The gripping force would remain substantially constant as the sphere 2402 moved down the track independent of friction or gravity and could therefore be used to move an object about a track that moved up a wall, across a ceiling, or in any other desired direction within the limits of the gravitational force (as a function of the weight of the object) overcoming the spatial force of the aligning magnetic field emission structures. A cylinder 2416 is shown having a first magnetic field emission structure 2602a and second magnetic field emission structure 2602b which have mirror coding as magnetic field emission structure 2406. As such they work together to provide a gripping force causing sphere 2402 to move backward or forward in the cylinder 2416 with precision alignment.

FIG. 27a and FIG. 27b depict an arrangement where a first magnetic field emission structure 2702 wraps around two cylinders 2302 such that a much larger portion 2704 of the first magnetic field emission structure is in contact with a second magnetic field emission structure 2502 having mirror coding as the first magnetic field emission structure 2702. As such, the larger portion 2704 directly corresponds to a larger gripping force.

An alternative approach for using a correlating surface is to have a magnetic field emission structure on an object (e.g, an athlete's or astronaut's shoe) that is intended to partially correlate with the correlating surface regardless of how the surface and the magnetic field emission structure are aligned. Essentially, correlation areas would be randomly placed such the object (shoe) would achieve partial correlation (gripping force) as it comes randomly in contact with the surface. For example, a runner on a track wearing shoes having a magnetic field emission structure with partial correlation encoding could receive some traction from the partial correlations that would occur as the runner was running on a correlated track.

Figure 28A:
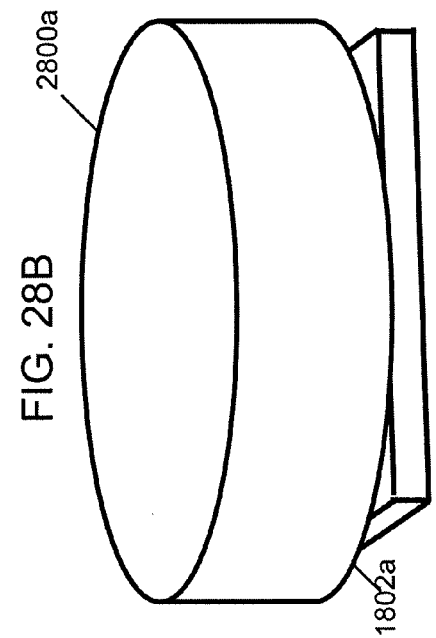
FIGS. 28a through 28d depict an exemplary method of manufacturing magnetic field emission structures using a ferromagnetic material.
Figure 28B:
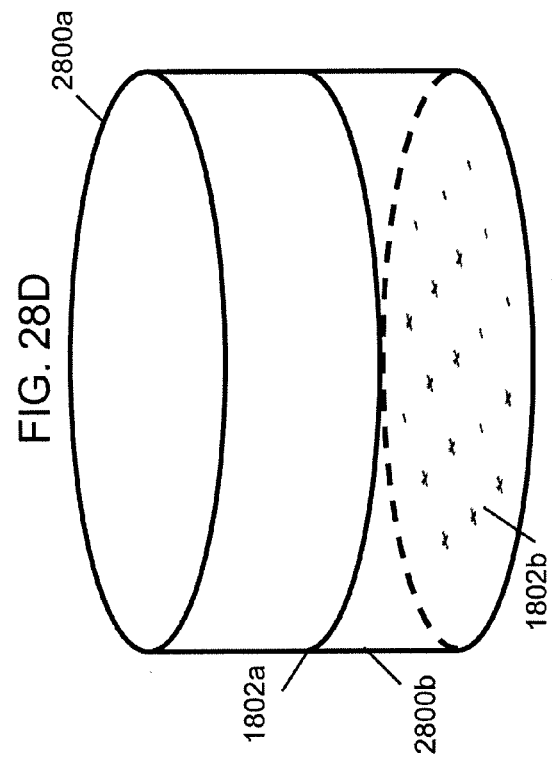
Figure 28C:
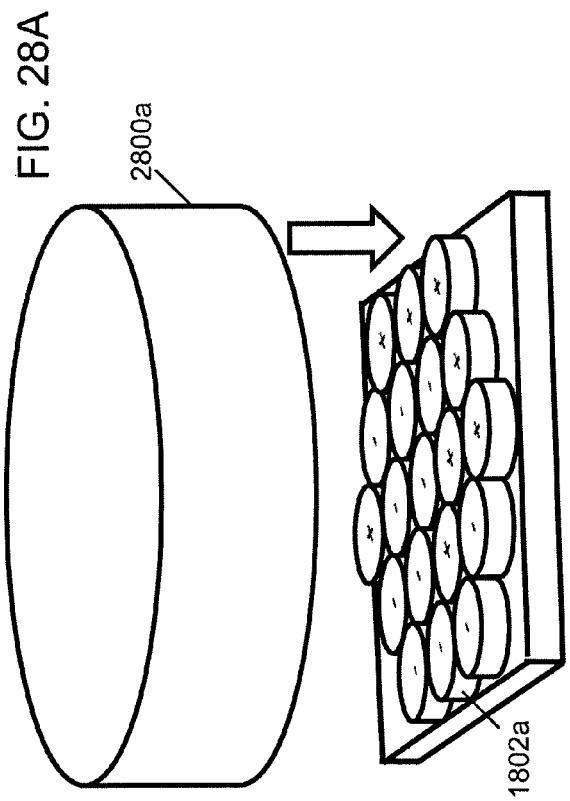
Figure 28D:
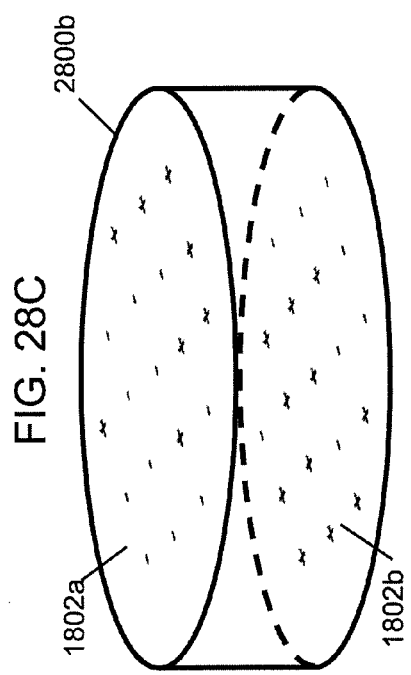

FIGS. 28a through 28d depict a manufacturing method for producing magnetic field emission structures. In FIG. 28a, a first magnetic field emission structure 1802a comprising an array of individual magnets is shown below a ferromagnetic material 2800a (e.g., iron) that is to become a second magnetic field emission structure having the same coding as the first magnetic field emission structure 1802a. In FIG. 28b, the ferromagnetic material 2800a has been heated to its Curie temperature (for antiferromagnetic materials this would instead be the Neel temperature). The ferromagnetic material 2800a is then brought in contact with the first magnetic field emission structure 1802a and allowed to cool. Thereafter, the ferromagnetic material 2800a takes on the same magnetic field emission structure properties of the first magnetic field emission structure 1802a and becomes a magnetized ferromagnetic material 2800b, which is itself a magnetic field emission structure, as shown in FIG. 28c. As depicted in FIG. 28d, should another ferromagnetic material 2800a be heated to its Curie temperature and then brought in contact with the magnetized ferromagnetic material 2800b, it too will take on the magnetic field emission structure properties of the magnetized ferromagnetic material 2800b as previously shown in FIG. 28c.

An alternative method of manufacturing a magnetic field emission structure from a ferromagnetic material would be to use one or more lasers to selectively heat up field emission source locations on the ferromagnetic material to the Curie temperature and then subject the locations to a magnetic field. With this approach, the magnetic field to which a heated field emission source location may be subjected may have a constant polarity or have a polarity varied in time so as to code the respective source locations as they are heated and cooled.

To produce superconductive magnet field structures, a correlated magnetic field emission structure would be frozen into a super conductive material without current present when it is cooled below its critical temperature.

FIG. 29 depicts the addition of two intermediate layers 2902 to a magnetic field emission structure 2800b. Each intermediate layer 2902 is intended to smooth out (or suppress) spatial forces when any two magnetic field emission structures are brought together such that sidelobe effects are substantially shielded. An intermediate layer 2902 can be active (i.e., saturable such as iron) or inactive (i.e., air or plastic).

FIGS. 30a through 30c provide a side view, an oblique projection, and a top view, respectively, of a magnetic field emission structure 2800b having a surrounding heat sink material 3000 and an embedded kill mechanism comprising an embedded wire (e.g., nichrome) coil 3002 having connector leads 3004. As such, if heat is applied from outside the magnetic field emission structure 2800b, the heat sink material 3000 prevents magnets of the magnetic field emission structure from reaching their Curie temperature. However, should it be desirable to kill the magnetic field emission structure, a current can be applied to connector leads 3004 to cause the wire coil 3002 to heat up to the Curie temperature. Generally, various types of heat sink and/or kill mechanisms can be employed to enable control over whether a given magnetic field emission structure is subjected to heat at or above the Curie temperature. For example, instead of embedding a wire coil, a nichrome wire might be plated onto individual magnets.

FIG. 31a depicts an oblique projection of a first pair of magnetic field emission structures 3102 and a second pair of magnetic field emission structures 3104 each having magnets indicated by dashed lines. Above the second pair of magnetic field emission structures 3104 (shown with magnets) is another magnetic field emission structure where the magnets are not shown, which is intended to provide clarity to the interpretation of the depiction of the two magnetic field emission structures 3104 below. Also shown are top views of the circumferences of the first and second pair of magnetic field emission structures 3102 and 3104. As shown, the first pair of magnetic field emission structures 3102 have a relatively small number of relatively large (and stronger) magnets when compared to the second pair of magnetic field emission structures 3104 that have a relatively large number of relatively small (and weaker) magnets. For this figure, the peak spatial force for each of the two pairs of magnetic field emission structures 3102 and 3104 are the same. However, the distances D1 and D2 at which the magnetic fields of each of the pairs of magnetic field emission structures 3102 and 3104 substantially interact (shown by up and down arrows) depends on the strength of the magnets and the area over which they are distributed. As such, the much larger surface of the second magnetic field emission structure 3104 having much smaller magnets will not substantially attract until much closer than that of first magnetic field emission structure 3102. This magnetic strength per unit area attribute as well as a magnetic spatial frequency (i.e., # magnetic reversals per unit area) can be used to design structures to meet safety requirements. For example, two magnetic field emission structures 3104 can be designed to not have significant attraction force if a finger is between them (or in other words the structures wouldn't have significant attraction force until they are substantially close together thereby reducing (if not preventing) the opportunity/likelihood for body parts or other things such as clothing getting caught in between the structures).

Figure 31B:
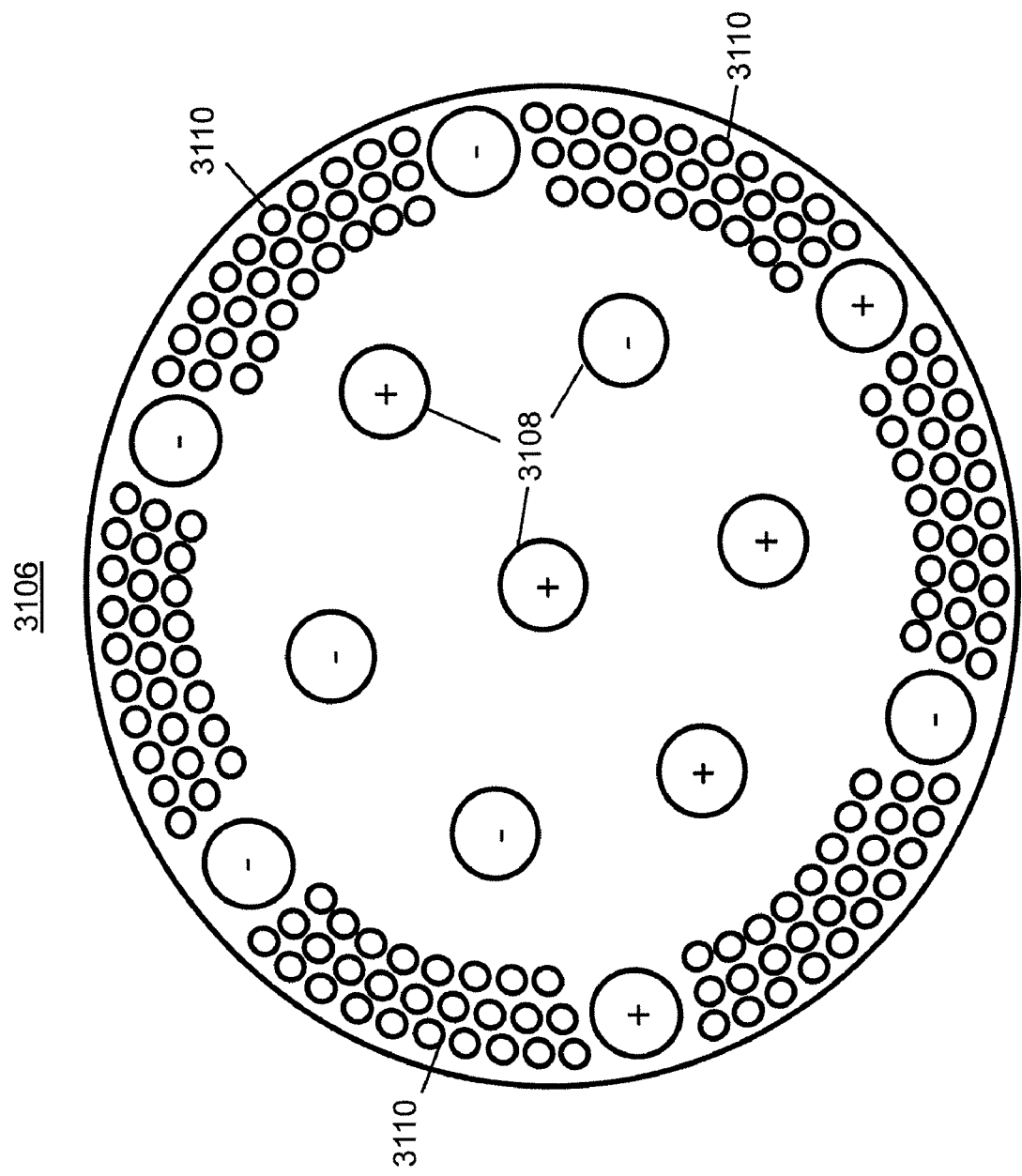
FIG. 31b depicts a magnetic field emission structure made up of a sparse array of large magnetic sources combined with a large number of smaller magnetic sources whereby alignment with a mirror magnetic field emission structure is provided by the large sources and a repel force is provided by the smaller sources.

FIG. 31b depicts a magnetic field emission structure 3106 made up of a sparse array of large magnetic sources 3108 combined with a large number of smaller magnetic sources 3110 whereby alignment with a mirror image magnetic field emission structure would be provided by the large sources and a repel force would be provided by the smaller sources. Generally, as was the case with FIG. 31a, the larger (i.e., stronger) magnets achieve a significant attraction force (or repelling force) at a greater separation distance than smaller magnets. Because of this characteristic, combinational structures having magnetic sources of different strengths can be constructed that effectively have two (or more) spatial force functions corresponding to the different levels of magnetic strengths employed. As the magnetic field emission structures are brought closer together, the spatial force function of the strongest magnets is first to engage and the spatial force functions of the weaker magnets will engage when the magnetic field emission structures are moved close enough together at which the spatial force functions of the different sized magnets will combine. Referring back to FIG. 31b, the sparse array of stronger magnets 3108 is coded such that it can correlate with a mirror image sparse array of comparable magnets. However, the number and polarity of the smaller (i.e., weaker) magnets 3110 can be tailored such that when the two magnetic field emission structures are substantially close together, the magnetic force of the smaller magnets can overtake that of the larger magnets 3108 such that an equilibrium will be achieved at some distance between the two magnetic field emission structures. As such, alignment can be provided by the stronger magnets 3108 but contact of the two magnetic field emission structures can be prevented by the weaker magnets 3110. Similarly, the smaller, weaker magnets can be used to add extra attraction strength between the two magnetic field emission structures.

One skilled in the art will recognize that the all sorts of different combinations of magnets having different strengths can be oriented in various ways to achieve desired spatial forces as a function of orientation and separation distance between two magnetic field emission structures. For example, a similar aligned attract—repel equilibrium might be achieved by grouping the sparse array of larger magnets 3108 tightly together in the center of magnetic field emission structure 3106. Moreover, combinations of correlated and non-correlated magnets can be used together, for example, the weaker magnets 3110 of FIG. 31b may all be uncorrelated magnets. Furthermore, one skilled in the art will recognize that such an equilibrium enables frictionless traction (or hold) forces to be maintained and that such techniques could be employed for many of the exemplary drawings provided herein. For example, the magnetic field emission structures of the two spheres shown in FIG. 24 could be configured such that the spheres never come into direct contact, which could be used, for example, to produce frictionless ball joints.

FIG. 32 depicts an exemplary magnetic field emission structure assembly apparatus comprising one or more vacuum tweezers 3202 that are capable of placing magnets 100a and 100b having first and second polarities into machined holes 3204 in a support frame 3206. Magnets 100a and 100b are taken from at least one magnet supplying device 3208 and inserted into holes 3204 of support frame 3206 in accordance with a desired code. Under one arrangement, two magnetic tweezers are employed with each being integrated with its own magnet supply device 3208 allowing the vacuum tweezers 3202 to only move to the next hole 3204 whereby a magnet is fed into vacuum tweezers 3202 from inside the device. Magnets 100a and 100b may be held in place in a support frame 3206 using an adhesive (e.g., a glue). Alternatively, holes 3204 and magnets 100a and 100b could have threads whereby vacuum tweezers 3202 or an alternative insertion tool would screw them into place. A completed magnetic field assembly 3210 is also depicted in FIG. 32. Under an alternative arrangement the vacuum tweezers would place more than one magnet into a frame 3206 at a time to include placing all magnets at one time. Under still another arrangement, an array of coded electromagnets 3212 is used to pick up and place at one time all the magnets 3214 to be placed into the frame 3206 where the magnets are provided by a magnet supplying device 3216 that resembles the completed magnetic field assembly 3210 such that magnets are fed into each supplying hole from beneath (as shown in 3208) and where the coded electromagnets attract the entire array of loose magnets. With this approach the array of electromagnets 3212 may be recessed such that there is a guide 3218 for each loose magnet as is the case with the bottom portion of the vacuum tweezers 3202. With this approach, an entire group of loose magnets can be inserted into a frame 3206 and when a previously applied sealant has dried sufficiently the array of electromagnets 3212 can be turned so as to release the now placed magnets. Under an alternative arrangement the magnetic field emission structure assembly apparatus would be put under pressure. Vacuum can also be used to hold magnets into a support frame 3206.

As described above, vacuum tweezers can be used to handle the magnets during automatic placement manufacturing. However, the force of vacuum, i.e. 14.7 psi, on such a small surface area may not be enough to compete with the magnetic force. If necessary, the whole manufacturing unit can be put under pressure. The force of a vacuum is a function of the pressure of the medium. If the workspace is pressurize to 300 psi (about 20 atmospheres) the force on a tweezer tip 1/16" across would be about 1 pound which depending on the magnetic strength of a magnet might be sufficient to compete with its magnetic force. Generally, the psi can be increased to whatever is needed to produce the holding force necessary to manipulate the magnets.

If the substrate that the magnets are placed in have tiny holes in the back then vacuum can also be used to hold them in place until the final process affixes them permanently with, for example, ultraviolet curing glue. Alternatively, the final process by involve heating the substrate to fuse them all together, or coating the whole face with a sealant and then wiping it clean (or leaving a thin film over the magnet faces) before curing. The vacuum gives time to manipulate the assembly while waiting for whatever adhesive or fixative is used.

FIG. 33 depicts a cylinder 2302 having a first magnetic field emission structure 2306 on the outside of the cylinder where the code pattern 1402a is repeated six times around the cylinder. Beneath the cylinder 2302 is an object 3302 having a curved surface with a slightly larger curvature as does the cylinder 2302 (such as the curvature of cylinder 2304) and having a second magnetic field emission structure 3304 that is also coded using the code pattern 1402a. The cylinder 2302 is turned at a rotational rate of 1 rotation per second by shaft 3306. Thus, as the cylinder 2302 turns, six times a second the code pattern 1402a of the first magnetic field emission structure 2306 of the cylinder 2302 aligns with the second magnetic field emission structure 3304 of the object 3302 causing the object 3302 to be repelled (i.e., moved downward) by the peak spatial force function of the two magnetic field emission structures 2306, 3304. Similarly, had the second magnetic field emission structure 3304 been coded using code pattern 1402b, then 6 times a second the code pattern 1402a of the first magnetic field emission structure 2306 of the cylinder 2302 aligns with the second magnetic field emission structure 3304 of the object 3302 causing the object 3302 to be attracted (i.e., moved upward) by the peak spatial force function of the two magnetic field emission structures. Thus, the movement of the cylinder 2302 and corresponding first magnetic field emission structure 2306 can be used to control the movement of the object 3302 having its corresponding second magnetic field emission structure 3304. Additional magnetic field emission structures and/or other devices capable of controlling movement (e.g., springs) can also be used to control movement of the object 3302 based upon the movement of the first magnetic field emission structure 2306 of the cylinder 2302. One skilled in the art will recognize that a shaft 3306 may be turned as a result of wind turning a windmill, a water wheel or turbine, ocean wave movement, and other methods whereby movement of the object 3302 can result from some source of energy scavenging. Another example of energy scavenging that could result in movement of object 3302 based on magnetic field emission structures is a wheel of a vehicle that would correspond to a cylinder 2302 where the shaft 3306 would correspond to the wheel axle. Generally, the present invention can be used in accordance with one or more movement path functions of one or more objects each associated with one or more magnetic field emission structures, where each movement path function defines the location and orientation over time of at least one of the one or more objects and thus the corresponding location and orientation over time of the one or more magnetic field emission structures associated with the one or more objects. Furthermore, the spatial force functions of the magnetic field emission structures can be controlled over time in accordance with such movement path functions as part of a process which may be controlled in an open-loop or closed-loop manner. For example, the location of a magnetic field emission structure produced using an electromagnetic array may be moved, the coding of such a magnetic field emission structure can be changed, the strengths of magnetic sources can be varied, etc. As such, the present invention enables the spatial forces between objects to be precisely controlled in accordance with their movement and also enables movement of objects to be precisely controlled in accordance with such spatial forces.

FIG. 34 depicts a valve mechanism 3400 based upon the sphere of FIG. 24 where a magnetic field emission structure 2414 is varied to move the sphere 2402 upward or downward in a cylinder having a first opening 3404 having a circumference less than or equal to that of a sphere 2402 and a second opening 3406 having a circumference greater than the sphere 2402. As such, a magnetic field emission structure 2414 can be varied such as described in relation to FIG. 24 to control the movement of the sphere 2402 so as to control the flow rate of a gas or liquid through the valve 3402. Similarly, a valve mechanism 3400 can be used as a pressure control valve. Furthermore, the ability to move an object within another object having a decreasing size enables various types of sealing mechanisms that can be used for the sealing of windows, refrigerators, freezers, food storage containers, boat hatches, submarine hatches, etc., where the amount of sealing force can be precisely controlled. One skilled in the art will recognized that many different types of seal mechanisms to include gaskets, o-rings, and the like can be employed with the present invention.

FIG. 35 depicts a cylinder apparatus 3500 where a movable object such as sphere 2042 or closed cylinder 3502 having a first magnetic field emission structure 2406 is moved in a first direction or in second opposite direction in a cylinder 2416 having second magnetic field emission structure 2414a (and optionally 2414b). By sizing the movable object (e.g., a sphere or a closed cylinder) such that an effective seal is maintained in cylinder 2416, the cylinder apparatus 3500 can be used as a hydraulic cylinder, pneumatic cylinder, or gas cylinder. In a similar arrangement cylinder apparatus 3500 can be used as a pumping device.

As described herein, magnetic field emission structures can be produced with any desired arrangement of magnetic (or electric) field sources. Such sources may be placed against each other, placed in a sparse array, placed on top of, below, or within surfaces that may be flat or curved. Such sources may be in multiple layers (or planes), may have desired directionality characteristics, and so on. Generally, by varying polarities, positions, and field strengths of individual field sources over time, one skilled in the art can use the present invention to achieve numerous desired attributes. Such attributes include, for example:

Precision alignment, position control, and movement control
Non-wearing attachment
Repeatable and consistent behavior
Frictionless holding force/traction
Ease/speed/accuracy of assembly/disassembly
Increased architectural strength
Reduced training requirements
Increased safety
Increased reliability
Ability to control the range of force
Quantifiable, sustainable spatial forces (e.g., holding force, sealing force, etc.)
Increased maintainability/lifetime
Efficiency FIGS. 36a through 36g provide a few more examples of how magnetic field sources can be arranged to achieve desirable spatial force function characteristics. FIG. 36a depicts an exemplary magnetic field emission structure 3600 made up of rings about a circle. As shown, each ring comprises one magnet having an identified polarity. Similar structures could be produced using multiple magnets in each ring, where each of the magnets in a given ring is the same polarity as the other magnets in the ring, or each ring could comprise correlated magnets. Generally, circular rings, whether single layer or multiple layer, and whether with or without spaces between the rings, can be used for electrical, fluid, and gas connectors, and other purposes where they could be configured to have a basic property such that the larger the ring, the harder it would be to twist the connector apart. As shown in FIG. 36b, one skilled in the art would recognize that a hinge 3602 could be constructed using alternating magnetic field emission structures attached two objects where the magnetic field emission structures would be interleaved so that they would align (i.e., effectively lock) but they would still pivot about an axes extending though their innermost circles. FIG. 36c depicts an exemplary magnetic field emission structure 3604 having sources resembling spokes of a wheel. FIG. 36d depicts an exemplary magnetic field emission structure 3606 resembling a rotary encoder where instead of on and off encoding, the sources are encoded such that their polarities vary. The use of a magnetic field emission structure in accordance with the present invention instead of on and off encoding should eliminate alignment problems of conventional rotary encoders.

FIG. 36e depicts an exemplary magnetic field emission structure having sources arranged as curved spokes. FIG. 36f depicts an exemplary magnetic field emission structure made up of hexagon-shaped sources. FIG. 36g depicts an exemplary magnetic field emission structure made up of triangular sources. FIG. 36h depicts an exemplary magnetic field emission structure made up of partially overlapped diamond-shaped sources. Generally, the sources making up a magnetic field emission structure can have any shape and multiple shapes can be used within a given magnetic field emission structure. Under one arrangement, one or more magnetic field emission structures correspond to a Fractal code.

Figure 37A:
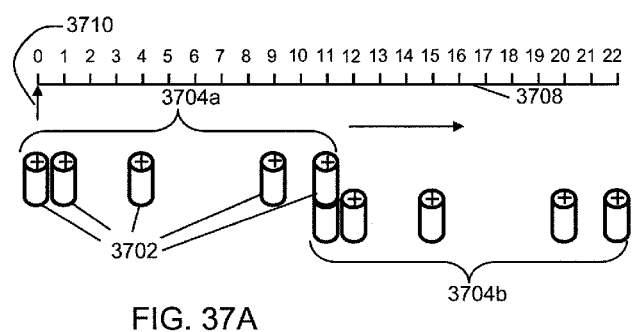
FIG. 37a depicts two magnet structures coded using a Golomb ruler code.
Figure 37B:
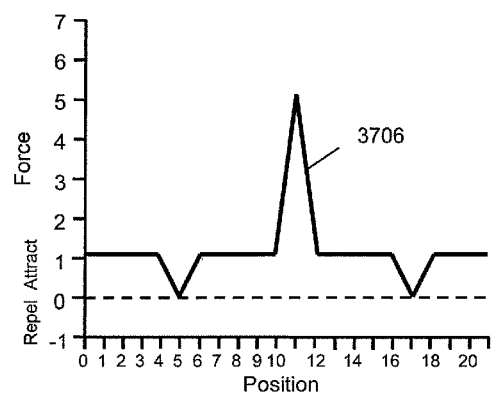

FIG. 37a and FIG. 37b show two magnet structures 3704a, 3704b coded using a Golomb ruler code. A Golomb ruler is a set of marks on a ruler such that no two marks are the same distance from any other two marks. Two identical Golomb rulers may be slid by one another with only one mark at a time aligning with the other ruler except at the sliding point where all marks align. Referring to FIG. 37a, magnets 3702 of structure 3704a are placed at positions 0, 1, 4, 9 and 11, where all magnets are oriented in the same polarity direction. Pointer 3710 indicates the position of cluster 3704a against scale 3708. The stationary base structure 3704b uses the same relative magnet positioning pattern shifted to begin at position 11.

FIG. 37b shows the normal (perpendicular) magnetic force 3706 as a function of the sliding position between the two structures 3704a and 3704b of FIG. 37a. Note that only one magnet pair lines up between the two structures for any sliding position except at position 5 and 17, where no magnet pairs line up, and at position 11, where all five magnet pairs line up. Because all magnets are in the same direction, the misaligned force value is 1, indicating attraction. Alternatively, some of the magnet polarities may be reversed according to a second code or pattern (with a complementary pattern on the complementary magnet structure) causing the misaligned force to alternate between 1 and −1, but not to exceed a magnitude of 1. The aligned force would remain at 5 if both magnet structures have the same polarity pattern. Table 5 shows a number of exemplary Golomb ruler codes. Golomb rulers of higher orders up to 24 can be found in the literature.

TABLE 5

Golomb Ruler Codes

| order | length | marks |
|---|---|---|
| 1 | 0 | 0 |
| 2 | 1 | 0 1 |
| 3 | 3 | 0 1 3 |
| 4 | 6 | 0 1 4 6 |
| 5 | 11 | 0 1 4 9 11 |
|   |   | 0 2 7 8 11 |
| 6 | 17 | 0 1 4 10 12 17 |
|   |   | 0 1 4 10 15 17 |
|   |   | 0 1 8 11 13 17 |
|   |   | 0 1 8 12 14 17 |
| 7 | 25 | 0 1 4 10 18 23 25 |
|   |   | 0 1 7 11 20 23 25 |
|   |   | 0 1 11 16 19 23 25 |
|   |   | 0 2 3 10 16 21 25 |
|   |   | 0 2 7 13 21 22 25 |

Golomb ruler codes offer a force ratio according to the order of the code, e.g., for the order 5 code of FIG. 37a, the aligned force to the highest misaligned force is 5:1. Where the magnets are of differing polarities, the ratio may be positive or negative, depending on the shift value.

Costas arrays are one example of a known two dimensional code. Costas Arrays may be considered the two dimensional analog of the one dimensional Golomb rulers. Lists of known Costas arrays are available in the literature. In addition, Welch-Costas arrays may be generated using the Welch technique. Alternatively, Costas arrays may be generated using the Lempel-Golomb technique.

Figure 37C:
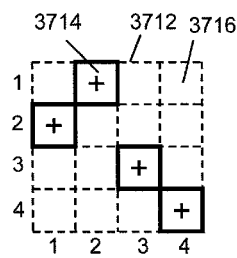
FIG. 37c depicts an exemplary Costas array.

FIG. 37c shows an exemplary Costas array. Referring to FIG. 37c, the grid 3712 shows coordinate positions. The "+" 3714 indicates a location containing a magnet, blank 3716 in a grid location indicates no magnet. Each column contains a single magnet, thus the array of FIG. 37c may be specified as {2,1,3,4}, specifying the row number in each successive column that contains a magnet. Additional known arrays up to order 5 (five magnets in a 5×5 grid) are as follows, where N is the order:

N=1
{1}
N=2
{1,2} {2,1}
N=3
{1,3,2} {2,1,3} {2,3,1} {3,1,2}
N=4
{1,2,4,3} {1,3,4,2} {1,4,2,3} {2,1,3,4} {2,3,1,4} {2,4,3,1} {3,1,2,4} {3,2,4,1}
{3,4,2,1} {4,1,3,2} {4,2,1,3} {4,3,1,2}
N=5
{1,3,4,2,5} {1,4,2,3,5} {1,4,3,5,2} {1,4,5,3,2} {1,5,3,2,4} {1,5,4,2,3} {2,1,4,5,3}
{2,1,5,3,4} {2,3,1,5,4} {2,3,5,1,4} {2,3,5,4,1} {2,4,1,5,3} {2,4,3,1,5} {2,5,1,3,4}
{2,5,3,4,1} {2,5,4,1,3} {3,1,2,5,4} {3,1,4,5,2} {3,1,5,2,4} {3,2,4,5,1} {3,4,2,1,5}
{3,5,1,4,2} {3,5,2,1,4} {3,5,4,1,2} {4,1,2,5,3} {4,1,3,2,5} {4,1,5,3,2} {4,2,3,5,1}
{4,2,5,1,3} {4,3,1,2,5} {4,3,1,5,2} {4,3,5,1,2} {4,5,1,3,2} {4,5,2,1,3} {5,1,2,4,3}
{5,1,3,4,2} {5,2,1,3,4} {5,2,3,1,4} {5,2,4,3,1} {5,3,2,4,1}

Additional Costas arrays may be formed by flipping the array (reversing the order) vertically for a first additional array and by flipping horizontally for a second additional array and by transposing (exchanging row and column numbers) for a third additional array. Costas array magnet structures may be further modified by reversing or not reversing the polarity of each successive magnet according to a second code or pattern as previously described with respect to Golomb ruler codes.

Additional codes including polarity codes, ruler or spacing codes or combinations of ruler and polarity codes of one or two dimensions may be found by computer search. The computer search may be performed by randomly or pseudorandomly or otherwise generating candidate patterns, testing the properties of the patterns, and then selecting patterns that meet desired performance criteria. Exemplary performance criteria include, but are not limited to, peak force, maximum misaligned force, width of peak force function as measured at various offset displacements from the peak and as determined as a force ratio from the peak force, polarity of misaligned force, compactness of structure, performance of codes with sets of codes, or other criteria. The criteria may be applied differently for different degrees of freedom.

Additional codes may be found by using magnets having different magnetic field strengths (e.g., as measured in gauss). Normalized measurement methods may involve multiple strengths (e.g., 2, 3, 7, 12) or fractional strengths (e.g. ½, 1.7, 3.3).

In accordance with one embodiment, a desirable coded magnet structure generally has a non-regular pattern of magnet polarities and/or spacings. The non-regular pattern may include at least one adjacent pair of magnets with reversed polarities, e.g., +, −, or −, +, and at least one adjacent pair of magnets with the same polarities, e.g., +, + or −, −. Quite often code performance can be improved by having one or more additional adjacent magnet pairs with differing polarities or one or more additional adjacent magnet pairs with the same polarities. Alternatively, or in combination, the coded magnet structure may include magnets having at least two different spacings between adjacent magnets and may include additional different spacings between adjacent magnets. In some embodiments, the magnet structure may comprise regular or non-regular repeating subsets of non-regular patterns.

FIGS. 38a through 38e illustrate exemplary ring magnet structures based on linear codes. Referring to FIG. 38a, ring magnet structure 3802 comprises seven magnets arranged in a circular ring with the magnet axes perpendicular to the plane of the ring and the interface surface is parallel to the plane of the ring. The exemplary magnet polarity pattern or code shown in FIG. 38a is the Barker 7 code. One may observe the "+, +, +, −, −, +, −" pattern beginning with magnet 3804 and moving clockwise as indicated by arrow 3806. A further interesting feature of this configuration is that the pattern may be considered to then wrap on it and effectively repeat indefinitely as one continues around the circle multiple times. Thus, one could use cyclic linear codes arranged in a circle to achieve cyclic code performance for rotational motion around the ring axis. The Barker 7 base pattern shown would be paired with a complementary ring magnet structure placed on top of the magnet structure face shown. As the complementary ring magnet structure is rotated, the force pattern can be seen to be equivalent to that of FIG. 10 because the complementary magnet structure is always overlapping a head to tail Barker 7 cyclic code pattern.

FIG. 38b shows a magnet structure based on the ring code 3802 of FIG. 38a with an additional magnet in the center. Magnet structure 3808 has an even number of magnets. At least two features of interest are modified by the addition of the magnet 3810 in the center. For rotation about the ring axis, one may note that the center magnet pair (in the base and in the complementary structure) remains aligned for all rotations. Thus, the center magnet pair adds a constant attraction or repelling force. Such magnets are referred to herein as biasing magnet sources. When using such magnets, the graph of FIG. 10 would be shifted from a repelling force of −1 and attracting force of 7 to a repelling force of 0 and an attracting force of 8 such that the magnetic structures would yield a neutral force when not aligned. Note also that the central magnet pair may be any value, for example −3, yielding an equal magnitude repelling and attracting force of −4 and +4, respectively.

In a further alternative, a center magnet 3810 may be paired in the complementary structure with a non-magnetized, magnetic iron or steel piece. The center magnet would then provide attraction, no matter which polarity is chosen for the center magnet.

A second feature of the center magnet of FIG. 38b is that for a value of −1 as shown, the total number of magnets in the positive direction is equal to the total number of magnets in the negative direction. Thus, in the far field, the magnetic field approaches zero, minimizing disturbances to such things as magnetic compasses and the like.

FIG. 38c illustrates two concentric rings, each based on a linear cyclic code, resulting in magnet structure 3812. An inner ring 3802 is as shown in FIG. 38a, beginning with magnet 3804. An outer ring is also a Barker 7 code beginning with magnet 3814. Beginning the outer ring on the opposite side as the inner ring keeps the plusses and minuses somewhat laterally balanced.

FIG. 38d illustrates the two concentric rings of FIG. 38c wherein the outer ring magnets are the opposite polarity of adjacent inner ring magnets resulting in magnet structure 3816. The inner ring Barker 7 begins with magnet 3804. The outer ring Barker 7 is a negative Barker 7 beginning with magnet 3818. Each outer ring magnet is the opposite of the immediate clockwise inner ring adjacent magnet. Since the far field magnetic field is cancelled in adjacent pairs, the field decays as rapidly as possible from the equal and opposite magnet configuration. More generally, linear codes may be constructed of opposite polarity pairs to minimize far field magnetic effects.

FIG. 38e illustrates a Barker 7 inner ring and Barker 13 outer ring. The Barker 7 begins with magnet 3804 and the Barker 13 begins with magnet 3822. The result is composite ring magnet structure 3820.

Although Barker codes are shown in FIGS. 38a through 38e, other codes may be uses as alternative codes or in combination with Barker codes, particularly in adjacent rings. Maximal Length PN codes or Kasami codes, for example, may form rings using a large number of magnets. One or two rings are shown, but any number of rings may be used. Although the ring structure and ring codes shown are particularly useful for rotational systems that are mechanically constrained to prevent lateral movement as may be provided by a central shaft or external sleeve, the rings may also be used where lateral position movement is permitted. It may be appreciated that a single ring, in particular, has only one or two points of intersection with another single ring when not aligned. Thus, non-aligned forces would be limited by this geometry in addition to code performance.

Figures 39F, 39G:
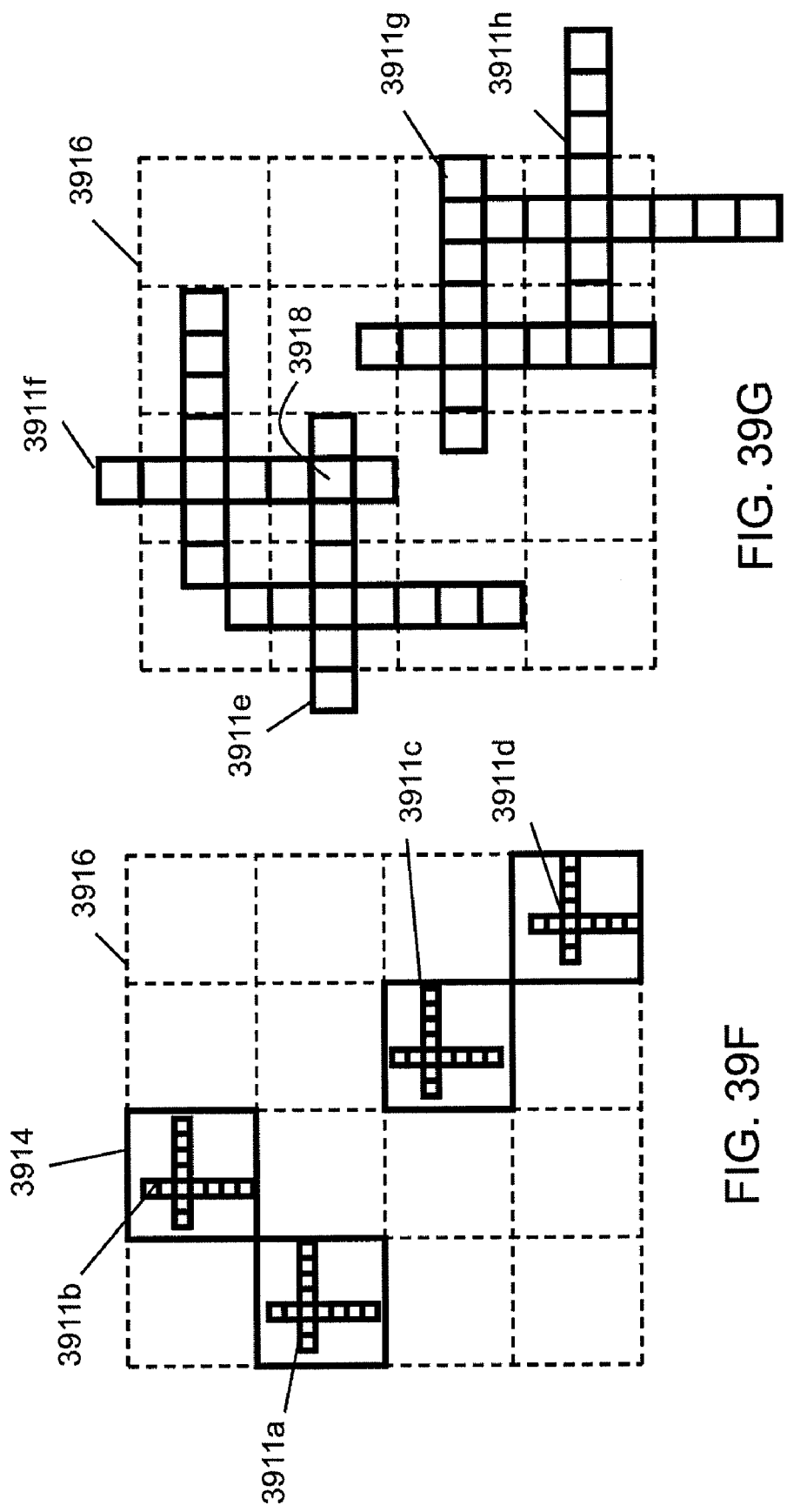

FIGS. 39a through 39g depict exemplary embodiments of two dimensional coded magnet structures. Referring to FIG. 39a, the exemplary magnet structure 3900 comprises two Barker coded magnet substructures 502 and 3902. Substructure 502 comprises magnets with polarities determined by a Barker 7 length code arranged horizontally (as viewed on the page). Substructure 3902 comprises magnets with polarities also determined by a Barker 7 length code, but arranged vertically (as viewed on the page) and separated from substructure 502. In use, structure 3900 is combined with a complementary structure of identical shape and complementary magnet polarity. It can be appreciated that the complementary structure would have an attracting (or repelling, depending on design) force of 14 magnet pairs when aligned. Upon shifting the complementary structure to the right one magnet width substructure 502 and the complementary portion would look like FIG. 5f and have a force of zero. Substructure 3902 would be shifted off to the side with no magnets overlapping producing a force of zero. Thus, the total from both substructures 502 and 3902 would be zero. As the complementary structure is continued to be shifted to the right, substructure 502 would generate alternately zero and −1. The resulting graph would look like FIG. 6 except that the peak would be 14 instead of 7. It can be further appreciated that similar results would be obtained for vertical shifts due to the symmetry of the structure 3900. Diagonal movements where the complementary structure for 3902 overlaps 502 can only intersect one magnet at a time. Thus, the peak two dimensional nonaligned force is 1 or −1. Adding rotational freedom can possibly line up 3902 with 502 for a force of 7, so the code of FIG. 39a performs best where rotation is limited.

FIG. 39b depicts a two dimensional coded magnet structure comprising two codes with a common end point component. Referring to FIG. 39b, the structure 3903 comprises structure 502 based on a Barker 7 code running horizontally and structure 3904 comprising six magnets that together with magnet 3906 form a Barker 7 code running vertically. Magnet 3906 being common to both Barker sequences. Performance can be appreciated to be similar to FIG. 39a except the peak is 13.

FIG. 39c depicts a two dimensional coded magnet structure comprising two one dimensional magnet structures with a common interior point component. The structure of FIG. 39c comprises structure 502 based on a Barker 7 code running horizontally and structure 3908 comprising six magnets that together with magnet 3910 form a Barker 7 code running vertically. Magnet 3910 being common to both Barker sequences. Performance can be appreciated to be similar to FIG. 39a except the peak is 13. In the case of FIG. 39c diagonal shifts can overlap two magnet pairs.

FIG. 39d depicts an exemplary two dimensional coded magnet structure based on a one dimensional code. Referring to FIG. 502, a square is formed with structure 502 on one side, structure 3904 on another side. The remaining sides 3912 and 3914 are completed using negative Barker 7 codes with common corner components. When paired with an attraction complementary structure, the maximum attraction is 24 when aligned and 2 when not aligned for lateral translations in any direction including diagonal. Further, the maximum repelling force is −7 when shifted laterally by the width of the square. Because the maximum magnitude non-aligned force is opposite to the maximum attraction, many applications can easily tolerate the relatively high value (compared with most non-aligned values of 0, ±1, or ±2) without confusion. For example, an object being placed in position using the magnet structure would not stick to the −7 location. The object would only stick to the +1, +2 or +24 positions, very weakly to the +1 or +2 positions and very strongly to the +24 position, which could easily be distinguished by the installer.

FIG. 39e illustrates a two dimensional code derived by using multiple magnet substructures based on a single dimension code placed at positions spaced according to a Golomb Ruler code. Referring to FIG. 39e, five magnet substructures 3920-3928 with polarities determined according to a Barker 7 code are spaced according to an order 5 Golomb ruler code at positions 0, 1, 4, 9, and 11 on scale 1930. The total force in full alignment is 35 magnet pairs. The maximum non-aligned force is seven when one of the Barker substructures lines up with another Barker 7 substructure due to a horizontal shift of the complementary code. A vertical shift can result in −5 magnet pairs. Diagonal shifts are a maximum of −1.

The exemplary structures of FIGS. 39a through 39e are shown using Barker 7 codes, the structures may instead use any one dimension code, for example, but not limited to random, pseudo random, LFSR, Kasami, Gold, or others and may mix codes for different legs. The codes may be run in either direction and may be used in the negative version (multiplied by −1.) Further, several structures are shown with legs at an angle of 90 degrees. Other angles may be used if desired, for example, but not limited to 60 degrees, 45 degrees, 30 degrees or other angles. Other configurations may be easily formed by one of ordinary skill in the art by replication, extension, substitution and other teachings herein.

FIGS. 39f and 39g illustrate two dimensional magnet structures based on the two dimensional structures of FIGS. 39a through 39e combined with Costas arrays. Referring to FIG. 39f, the structure of FIG. 39f is derived from the structure 3911 of FIG. 39c replicated 3911a-3911d and placed at code locations 3914 based on a coordinate grid 3916 in accordance with exemplary Costas array of FIG. 37c. The structure of FIG. 39g is derived using FIG. 39c and FIG. 37c as described for FIG. 39f except that the scale (relative size) is changed. The structure 3911 of FIG. 39c is enlarged to generate 3911e-3911h, which have been enlarged sufficiently to overlap at component 3918. Thus, the relative scale can be adjusted to trade the benefits of density (resulting in more force per area) with the potential for increased misaligned force.

FIGS. 40a and 40b depict the use of multiple magnetic structures to enable attachment and detachment of two objects using another object functioning as a key. It is noted that attachment of the two objects does not necessarily require another object functioning as a key. Referring to FIG. 40a, a first magnetic field structure 4002a is coded using a first code. A two-sided attachment mechanism 4004 has a second magnetic field structure 4002b also coded using the first code such that it corresponds to the mirror image of the second magnetic field structure 4002a, and has a third magnetic field structure 4002c coded using a second code. The dual coded attachment mechanism 4004 is configured so that it can turn about axis 4005 allowing it to be moved so as to allow attachment to and detachment from the first magnetic field structure. The dual coded attachment mechanism 4004 may include a separation layer 4006 consisting of a high permeability material that keeps the magnetic fields of the second magnetic field structure 4002b from interacting with the magnetic fields of the third magnetic field structure 4002c. The dual coded attachment mechanism 4004 also includes at least tab 4008 used to stop the movement of the dual coded attachment mechanism. A key mechanism 4010 includes a fourth magnetic field structure 4002d also coded using the second code such that it corresponds to the mirror image of the third magnetic field structure 4002c, and includes a gripping mechanism 4012 that would typically be turned by hand. The gripping mechanism 4012 could however be attached to or replaced by an automation device. As shown, the key mechanism 4010 can be attached to the dual coded attachment mechanism 4004 by aligning substantially the fourth magnetic field structure 4002d with the third magnetic field structure 4002c. The gripping mechanism can then be turned about axis 4005 to turn the dual coded attachment mechanism 4004 so as to align the second magnetic field structure 4002b with the first magnetic field structure 4002a, thereby attaching the dual coded attachment mechanism 4004 to the first magnetic field structure 4002a. Typically, the first magnetic field structure would be associated with a first object 4014, for example, a window frame, and the dual coded attachment mechanism 4004 would be associated with a second object 4016, for example, a storm shutter, as shown in FIG. 40B. For the example depicted in FIG. 40B, the dual coded attachment mechanism 4004 is shown residing inside the second object 4016 thereby allowing the key mechanism to be used to attach and/or detach the two objects 4014, 4016 and then be removed and stored separately. Once the two objects are attached, the means for attachment would not need to be visible to someone looking at the second object.

FIG. 40c and 40d depict the general concept of using a tab 4008 so as to limit the movement of the dual coded attachment mechanism 4004 between two travel limiters 4020a and 4020b. Dual coded attachment mechanism is shown having a hole through its middle that enables is to turn about the axis 4005. Referring to FIG. 40c, the two travel limiters 4020a and 4020b might be any fixed object placed at desired locations that limit the turning radius of the dual coded attachment mechanism 4004. FIG. 40d depicts an alternative approach where object 4016 includes a travel channel 4022 that is configured to enable the dual coded attachment mechanism 4004 to turn about the axis 4005 using hole 4018 and has travel limiters 4020a and 4020b that limit the turning radius. One skilled in the art would recognize that the tab 4008 and at least one travel limiter is provided to simplify the detachment of key mechanism 4012 from the dual coded attachment mechanism 4004.

FIG. 40*e* depicts exemplary assembly of the second object 4016 which is separated into a top part 4016*a* and a bottom part 4016*b*, with each part having a travel channel 4022*a* (or 4022*b*) and a spindle portion 4024*a* (or 4024*b*). The dual coded attachment mechanism 4004 is placed over the spindle portion 4022*b* of the bottom part 4016*b* and then the spindle portion 4024*a* of the top part 4016 is placed into the spindle portion 4022*b* of the bottom part 4016*b* and the top and bottom parts 4016*a*, 4016*b* are then attached in some manner, for example, glued together. As such, once assembled, the dual coded attachment mechanism is effectively hidden inside object 4016. One skilled in the art would recognize that many different designs and assembly approaches could be used to achieve the same result.

In one embodiment, the attachment device may be fitted with a sensor, e.g., a switch or magnetic sensor 4026 to indicate attachment or detachment. The sensor may be connected to a security alarm 4028 to indicate tampering or intrusion or other unsafe condition. An intrusion condition may arise from someone prying the attachment device apart, or another unsafe condition may arise that could be recognized by the sensor. The sensor may operate when the top part 4016*a* and bottom part 4016*b* are separated by a predetermined amount, e.g., 2 mm or 1 cm, essentially enough to operate the switch. In a further alternative, the switch may be configured to disregard normal separations and report only forced separations. For this, a second switch may be provided to indicate the rotation position of the top part 4016*a*. If there is a separation without rotating the top part, an intrusion condition would be reported. The separation switch and rotation switch may be connected together for combined reporting or may be separately wired for separate reporting. The switches may be connected to a controller which may operate a local alarm or call the owner or authorities using a silent alarm in accordance with the appropriate algorithm for the location.

In one embodiment, the sensor may be a hall effect sensor or other magnetic sensor. The magnetic sensor may be placed behind one of the magnets of magnet structure 4002*a* or in a position not occupied by a magnet of 4002*a* but near a magnet of 4002*b*. The magnetic sensor would detect the presence of a complementary magnet in 4002*b* by measuring an increase in field from the field of the proximal magnet of 4002*a* and thus be able to also detect loss of magnet structure 4002*b* by a decrease of magnetic field. The magnetic sensor would also be able to detect rotation of 4002*b* to a release configuration by measuring a double decrease in magnetic field strength due to covering the proximal magnet of 4002*a* with an opposite polarity magnet from magnet structure 4002*b*. When in an attached configuration, the magnetic field strength would then increase to the nominal level. Since about half of the magnets are paired with same polarity and half with opposite polarity magnets when in the release configuration, the sensor position would preferably be selected to be a position seeing a reversal in polarity of magnet structure 4002*b*.

In operation using mechanical switches, when the key mechanism 4012 is used to rotate the dual coded attachment mechanism 4004, the stop tab 4008 operates the rotation switch indicating proper entry so that when the attachment device is separated and the separation switch is operated, no alarm is sounded In an intrusion situation, the separation switch may be operated without operating the rotation switch. The operation of the rotation switch may be latched in the controller because in some embodiments, separation may release the rotation switch. For switch operation, the stop tab 4008 or another switch operating tab may extend from the dual coded magnet assembly to the base where the first coded magnet assembly 4002*a* resides so that the switch may be located elsewhere.

In operation using the magnetic sensor, normal detachment will first be observed by a double decrease (for example 20%) in magnetic field strength due to the rotation of the magnet structure 4004*b* followed by a single increase (for example 10%) due to the removal of the panel. Abnormal detachment would be observed by a single decrease (for example 10%) in the measured magnetic field strength. Thus, a single decrease of the expected amount, especially without a subsequent increase would be detected as an alarm condition.

Alternatively, a magnetic sensor may be placed in an empty position (not having a magnet) in the pattern of 4002*a*. Upon rotation of 4002*b* to the release position, the previously empty position would see the full force of a magnet of 4002*b* to detect rotation.

Figure 41A:
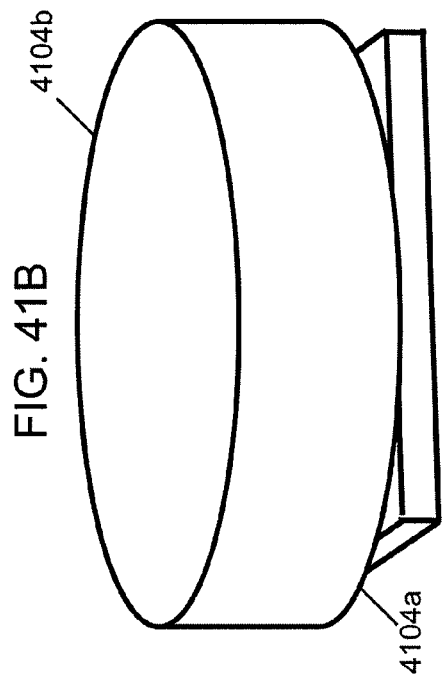
FIGS. 41a-41d depict manufacturing of a dual coded attachment mechanism using a ferromagnetic, ferrimagnetic, or antiferromagnetic material.
Figure 41B:
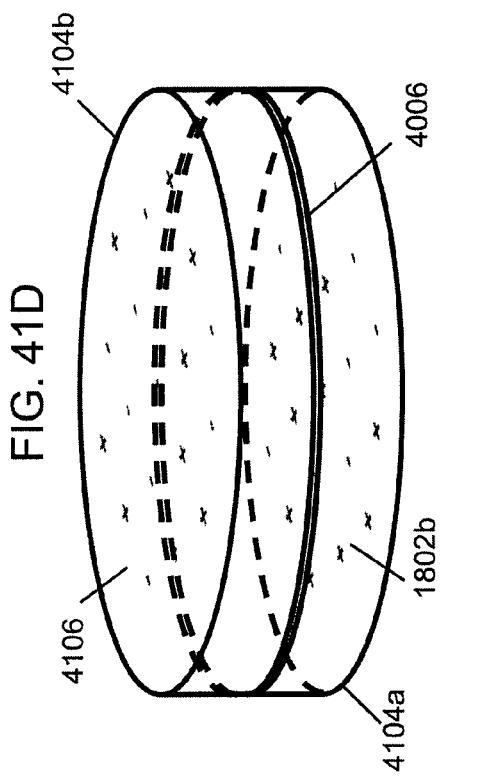
Figure 41C:
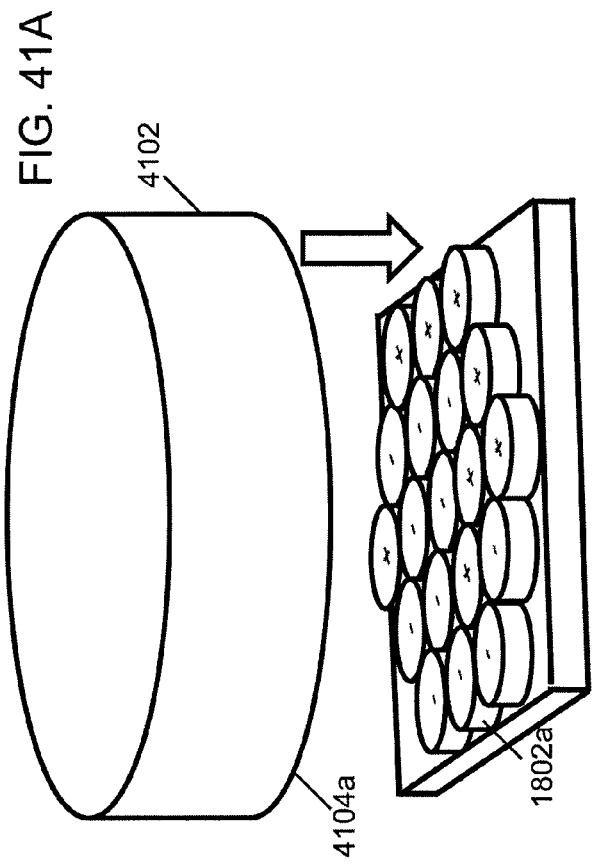
Figure 41D:
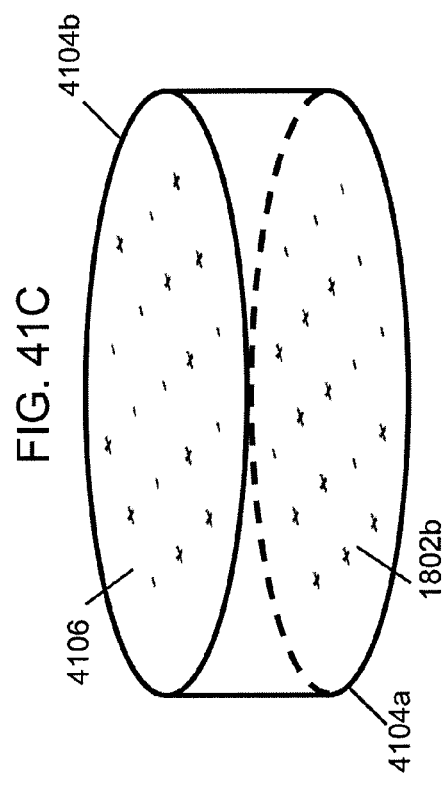

FIGS. 41*a* through 41*d* depict manufacturing of a dual coded attachment mechanism using a ferromagnetic, ferrimagnetic, or antiferromagnetic material. As previously described, such materials can be heated to their Curie (or Neel) temperatures and then will take on the magnetic properties of another material when brought into proximity with that material and cooled below the Curie (or Neel) temperature. Referring to FIG. 41*a* and 41*b*, a ferromagnetic, ferrimagnetic, or antiferromagnetic material 4102 is heated to its Curie (or Neel) temperature and one side 4104*a* is brought into proximity with a first magnetic field structure 1802*a* having desired magnetic field properties. Once cooled, as shown in FIG. 41*c*, the side 4104*a* comprises a second magnetic field structure 1802*b* having magnetic field properties that mirror those of the first magnetic field structure 1802*a*. A similar process can be performed to place a third magnetic field structure 4106 onto the second side 4104*b*, which may be done concurrently with the placement of the second magnetic field structure 1802*a* onto the first side 4104*a*. Depending on the thickness and properties of the ferromagnetic, ferrimagnetic, or antiferromagnetic material employed, it may be necessary or desirable to use two portions separated by a separation layer 4106 in which case the two portions and the separation layer would typically be attached together, for example, using an adhesive. Not shown in FIGS. 41*a* through 41*d* is a hole 4118, which can be drilled or otherwise placed in the ferromagnetic, ferrimagnetic, or antiferromagnetic material before or after it has received its magnetic field structures.

Figure 42B:
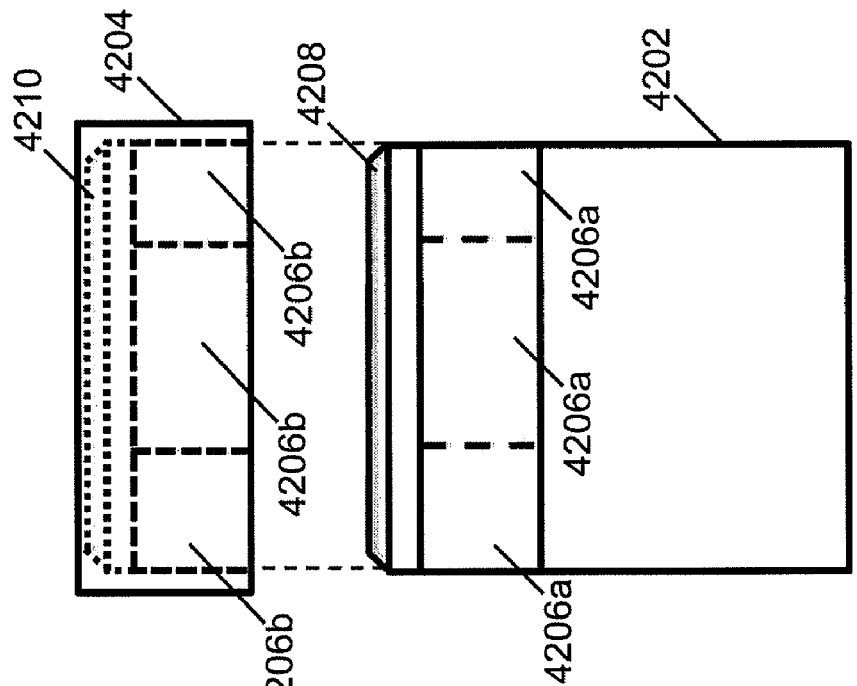
FIGS. 42a and 42b depict two views of an exemplary sealable container in accordance with the present invention.
Figure 42A:
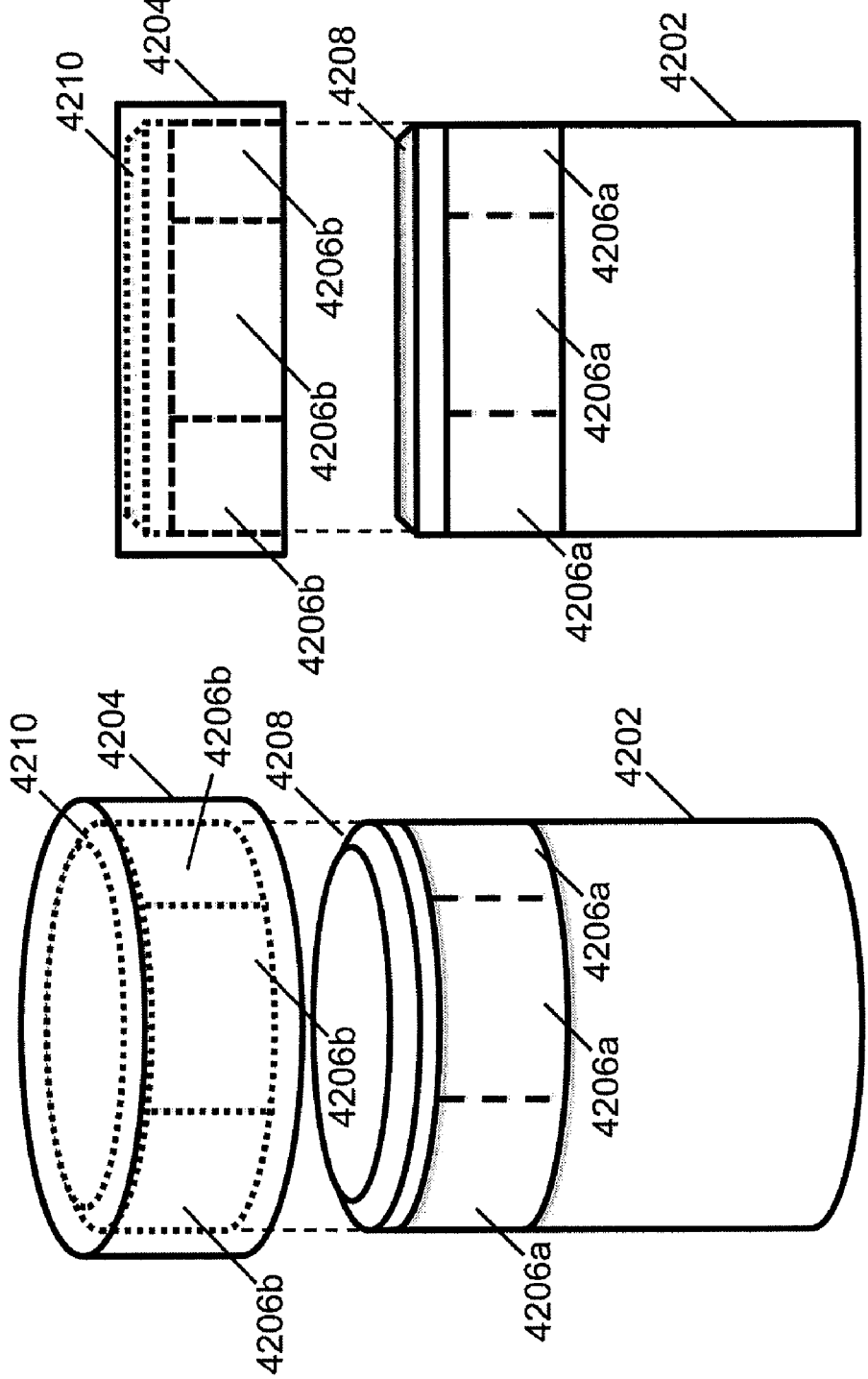

FIGS. 42*a* and 42*b* depict two views of an exemplary sealable container 4200 in accordance with the present invention. As shown in FIGS. 42*a* and 42*b*, sealable container 4200 includes a main body 4202 and a top 4204. On the outside of the upper portion of the main body 4202 is a magnetic field structure 4206*a*. As shown, a repeating magnetic field structure 4206*a* is used which repeats, for example, five times. On the inside of the top 4204 is a second magnetic field structure 4206*b* that also repeats, for example, five times. The second magnetic field structure 4206*b* is the mirror image of the first magnetic field structure 4206*a* and can be brought into substantial alignment at any one of five different alignment points due to the repeating of the structures. When the top 4204 is placed over the main body 4202 and substantial alignment is achieved, a sloping face 4208 of the main body 4202 achieves a compressive seal with a complementary sloping face 4210 of the top 4202 as a result of the spatial force function corresponding to the first and second magnetic field structures.

FIGS. 42c and 42d depict an alternative sealable container 4200 in accordance with the present invention. As shown in FIGS. 42c and 42d, the alternative sealable container 4200 is the same as the container 4200 of FIGS. 42a and 42b except the first magnetic field structure 4206a of the main body 4202 is located on a top surface of the main body and does not repeat. Similarly, the second magnetic field structure 4206b of the top 4204 is located on an inner surface near the upper part of top 4204. As such, the magnetic field structures interact in a plane perpendicular to that of FIG. 42a and 42b.

Moreover, since the magnetic fields do not repeat, there is only one alignment position whereby the top 4204 will attach to main body 4202 to achieve a compressive seal.

FIG. 42e is intended to depict an alternative arrangement for the complementary sloping faces 4208, 4210, where the peak of the slopes is on the outside of the seal as opposed to the inside. FIGS. 42f through 42h depict additional alternative shapes that could marry up with a complementary shape to form a compressive seal. One skilled in the art would recognize that many different such shapes can be used with the present invention. FIG. 42i depicts an alternative arrangement where a gasket 4226 is used, which might reside inside the top 4204 of the sealable container 4200. Various other sealing methods could also be employed such as use of Teflon tape, joint compound, or the like.

One skilled in the art will recognize that many different kinds of sealable container can be designed in accordance with the present invention. Such containers can be used for paint buckets, pharmaceutical containers, food containers, etc. Such containers can be designed to release at a specific pressure. Generally, the invention can be employed for many different types of tube in tube applications from umbrellas, to tent poles, waterproof flashlights to scaffolding, etc. The invention can also include a safety catch mechanism or a push button release mechanism.

As previously described, electromagnets can be used to produce magnetic field emission structures whereby the states of the electromagnets can be varied to change a spatial force function as defined by a code. As described below, electro-permanent magnets can also be used to produce such magnetic field emission structures. Generally, a magnetic field emission structure may include an array of magnetic field emission sources (e.g., electromagnets and/or electro-permanent magnets) each having positions and polarities relating to a spatial force function where at least one current source associated with at least one of the magnetic field emission sources can be used to generate an electric current to change the spatial force function.

FIGS. 43a through 43e depict five states of an electro-permanent magnet apparatus in accordance with the present invention. Referring to FIG. 43a, the electro-permanent magnet apparatus includes a controller 4302 that outputs a current direction control signal 4304 to current direction switch 4306, and a pulse trigger signal 4308 to pulse generator 4310. When it receives a pulse trigger signal 4308, pulse generator 4310 produces a pulse 4316 that travels about a permanent magnet material 4312 via at least one coil 4314 in a direction determined by current direction control signal 4304. Permanent magnet material 4312 can have three states: non-magnetized, magnetized with South-North polarity, or magnetized with North-South polarity. Permanent magnet material 4312 is referred to as such since it will retain its magnetic properties until they are changed by receiving a pulse 4316. In FIG. 43a, the permanent magnetic material is in its non-magnetized state. In FIG. 43b, a pulse 4316 is generated in a first direction that causes the permanent magnet material 4312 to attain its South-North polarity state (a notation selected based on viewing the figure). In FIG. 43c, a second pulse 4316 is generated in the opposite direction that causes the permanent magnet to again attain its non-magnetized state. In FIG. 43d, a third pulse 4316 is generated in the same direction as the second pulse causing the permanent magnet material 4312 to become to attains its North-South polarity state. In FIG. 43e, a fourth pulse 4316 is generated in the same direction as the first pulse 4316 causing the permanent magnet material 4312 to once again become non-magnetized. As such, one skilled in the art will recognized that the controller 4302 can control the timing and direction of pulses to control the state of the permanent magnetic material 4312 between the three states, where directed pulses either magnetize the permanent magnetic material 4312 with a desired polarity or cause the permanent magnetic material 4312 to be demagnetized.

FIG. 44a depicts an alternative electro-permanent magnet apparatus in accordance with the present invention. Referring to FIG. 44a, the alternative electro-permanent magnet apparatus is the same as that shown in FIGS. 43a-43e except the permanent magnetic material includes an embedded coil 4400. As shown in the figure, the embedded coil is attached to two leads 4402 that connect to the current direction switch 4306. The pulse generator 4310 and current direction switch 4306 are grouped together as a directed pulse generator 4404 that received current direction control signal 4304 and pulse trigger signal 4308 from controller 4302.

FIG. 44b depicts and permanent magnetic material 4312 having seven embedded coils 4400a-4400g arranged linearly. The embedded coils 4400a-4400g have corresponding leads 4402a-4402g connected to seven directed pulse generators 4404a-4404g that are controlled by controller 4302 via seven current direction control signals 4304a-4304g and seven pulse trigger signals 4308a-4308g. One skilled in the art will recognize that various arrangements of such embedded coils can be employed including two-dimensional arrangements and three-dimensional arrangements. One exemplary two-dimensional arrangement could be employed with a table like the table depicted in FIG. 22.

Figure 45D:
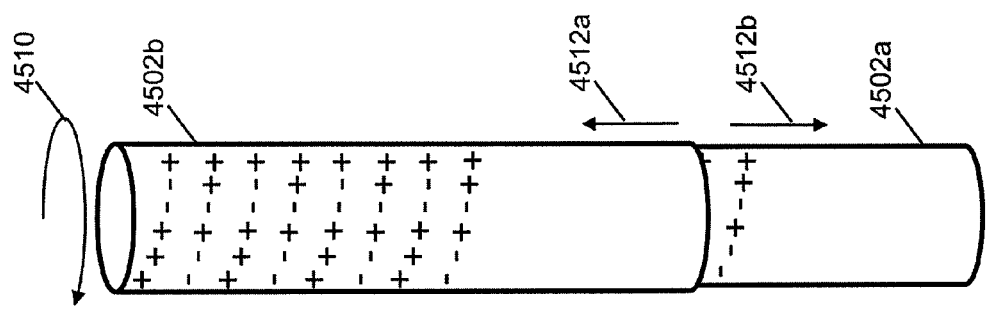
FIGS. 45a-45e depict exemplary use of helically coded magnetic field structures.
Figure 45C:
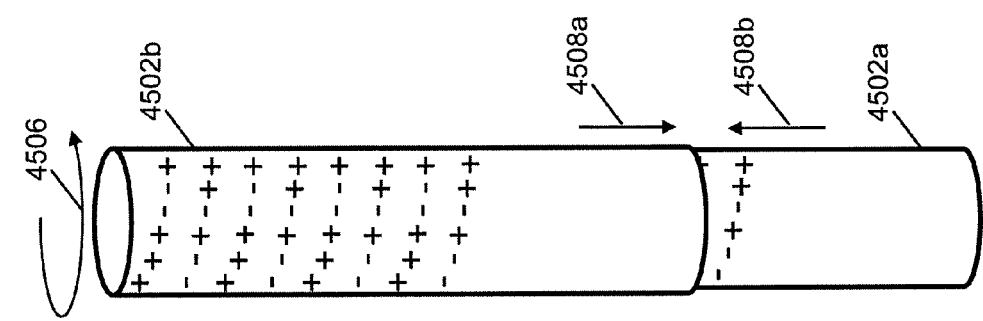
Figure 45B:
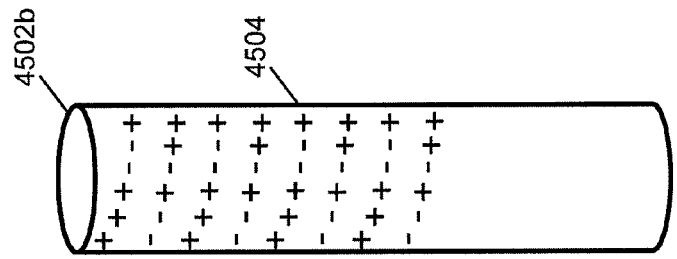
Figure 45A:
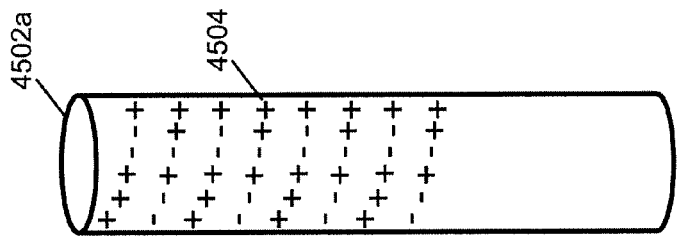
Figure 45E:
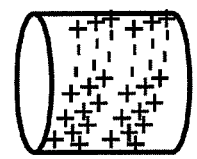

FIGS. 45a through 45e depict exemplary use of helically coded magnetic field structures. Referring to FIG. 45a a first tube 4502a has a magnetic field structure 4504 having positions in accordance with a code 4504 that defines a helix shape that wraps around the tube 4502a much like threads on a screw. Referring to FIG. 45b, a second tube 4502b having a slightly greater diameter than the first tube 4502a is coded with the same code 4504. As such the magnetic field structure inside the second tube 4502b would mirror that of the magnetic field structure on the outside of the first tube 4502a. As shown in FIG. 45c, the second tube 4502b can be placed over the first tube 4502a and by turning (holding the top) the second tube 4502b counter clockwise, the second tube 4502b will achieve a lock with the first tube 4502a causing the first tube 4502a to be pulled 4508a 4508b into the second tube 4502b as the second tube is turned while the first tube is held in place (at the bottom). Alternatively, the first tube 4502a can be turned counter clockwise while holding the second tube to produce the same relative movement between the two tubes. As depicted in FIG. 45d, by reversing the direction which the tubes are turned from that shown in FIG. 45c, the first tube will be drawn outside 4512a 4512b the second tube. FIG. 45e depicts an alternative helical coding approach where multiple instances of the same code are used to define the magnetic field structure. Similar arrangement can be employed where multiple such codes are used. The use of helically coded magnetic field structures enables a variably sized tubular structure much like certain shower curtain rods, etc. Helically coded magnetic field structures can also support worm drives, screw drive systems, X-Y devices, screw pressing mechanisms, vices, etc.

FIGS. 46a through 46h depict exemplary male and female connector components. FIGS. 46a, 46b, and 46c, provide a top view, front view, and back view of an exemplary male connector component 4600, respectively. Male connector component 4600 has sides 4601, a top 4602, and a hole 4603. Sides 4601 and top 4602 are magnetized in accordance with a code 4604. FIGS. 46d, 46e, and 46f, provide a top view, front view, and back view of an exemplary female connector component 4606a, respectively. At least a portion 4608 of the female connector component 4606a is magnetized in accordance with code 4604. As depicted, the bottom portion 4608 can be magnetized so that the inside edge of a hole 4610 within the female connector component 4606a has the mirror image field structure as the sides 4601 of the male connector component 4600. The diameter 4612 of the female connector component 4606a determines where the female connector component 4606a will connect with the male connector component 4600 when the male connector component 4606a is placed into the female connector component 4606a. The connector components can then be turned relative to each other to achieve alignment of their respective magnetic field structures and therefore achieve a holding force (and seal). FIG. 46g depicts a front view of the male connector component 4600 placed inside the female connector component 4606a such that they couple near the bottom of male connector component 4606a where the outside diameter of the male connector component is the same as the diameter 4612 of the inside edge of the hole 4610 inside the female connector component 4606a. FIG. 46h depicts an alternative arrangement where the hole of the female connector component 4606b has a diameter that tapers comparably to that of the outside diameter of the male connector component 4600. As shown, the hole 4610 varies from a first diameter 4614 to a second diameter 4616. Although not depicted, the inside sides of the female connector component 4606b could be magnetized much like the sides of the male connector component 4600 thereby providing more holding force (and sealing force) when their corresponding magnetic field structures are aligned.

Figures 47A, 47B, 47C:
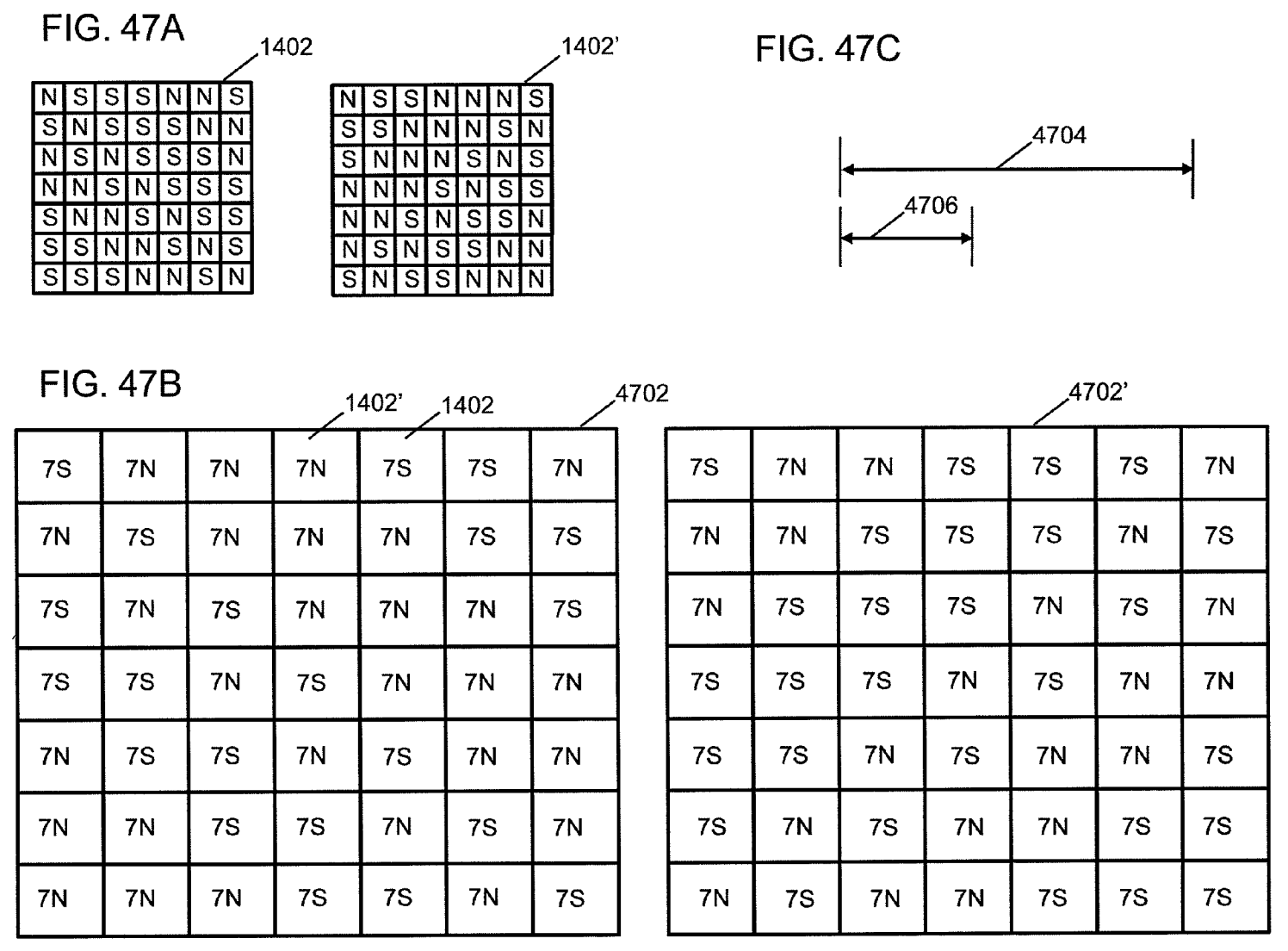

One skilled in the art will recognize that in a manner opposite to that depicted in FIGS. 46a through 46g, the male component could have straight sides while the female connector component could have tapered sides. With this arrangement, the diameter of the outside of the male connector component determines where the male and female connector components would connect. This alternative connector arrangement and the connectors depicted in FIGS. 46a through 46h lend themselves to all sorts of connection devices including those for connecting hoses, for example, for carrying water, air, fuel, etc. Such connectors can also be used with various well known conventional sealing mechanisms, for example, 0-rings or such seals as described in relation to FIGS. 42a through 42h. Moreover, similar connectors could FIGS. 47a through 47c depict exemplary multi-level coding. Referring to FIG. 47a, a first magnetic field structure 1402 is the mirror image of a second magnetic field structure 1402'. Referring to FIG. 47b, two much larger magnetic field structures 4700, 4702' have cells that correspond to either the first magnetic field structure 1402 or the second magnetic field structure 1402'. As shown in FIG. 47b, the first magnetic field structures 1402 appear as being a 7S force since the magnetic field structure 1402 has seven more South poles showing on its surface as it does North poles. Similarly, the second magnetic field structures 1402' appear as being a 7N force since the magnetic field structure 1402' has seven more North poles showing on its surface as it does South poles. Thus, as depicted in FIG. 47c, as two larger magnetic field structures are held apart by a first distance 4704, their individual cells will appear as combined magnetic field forces of 7S or 7N. But, at a second closer distance 4706, the cells will appear as individual magnetic sources as shown in FIG. 47a. It should be noted that the distances shown in FIG. 47c are arbitrarily selected to describe the general concept of multi-level coding. It should be further noted that cells of the larger magnetic field structures 4702 4702' are coded the same as the individual magnetic sources of the first and second magnetic field structures 1402 1402'.

FIG. 48a depicts an exemplary use of biasing magnet sources to affect spatial forces of magnetic field structures. Referring to FIG. 48a, a top down view of two magnetic field structures is depicted. A first magnetic field structure 4800 comprises magnetic field sources arranged in accordance with four repeating code modulos 4802 of a Barker Length 7 code and also having on either side magnetic field sources having North polarity and a strength of 3. The individual sources have a strength of 1, as was the case in the example depicted in FIGS. 9a through 9p. A second magnetic field structure 4804 is also coded in accordance with the Barker Length 7 code such that the bottom side of the second magnetic field structure has the mirror image coding of the top side of the first magnetic field structure. Both magnetic field structures have biasing magnets 4806 configured to always provide a repel strength of 6 (or −6) whenever the second magnetic field structure 4804 is placed on top of the first magnetic field structure 4800. When the second magnetic field structure 4804 is moved across the top of the first magnetic field structure 4800 the spatial forces produced will be as depicted in FIG. 48b. When FIG. 48b is compared to FIG. 10, one skilled in the art will recognize that zero attraction line has moved from a first position 4808 to a second position 4810 as a result of the biasing magnets 4806 and that many different arrangements of biasing magnets can be used to vary spatial force functions by adding constant repelling or attracting forces alongside those forces that vary based on relative positioning of magnetic field structures.

The repeating magnetic field structures of FIG. 48a provide a spatial force function (depicted in FIG. 48b) that is useful for various applications where one desires there to be ranges of free movement of a first object relative to another object yet locations where the second object is attracted to the first object such that it will become stationary at any of those locations. Such locations can be describes as detents. An example application could be a window, which might be closed when the second magnetic field structure 4804 of FIG. 48a is at position 0 and move freely when being lifted yet have detents (i.e., stopping points) at positions 7, 14, 21, etc. where the window would remain stationary. Such detents can be used with all sorts of different magnetic field structures including, for example, helically code magnetic field structures like those depicted in FIGS. 45a through 45e.

Figure 49A:
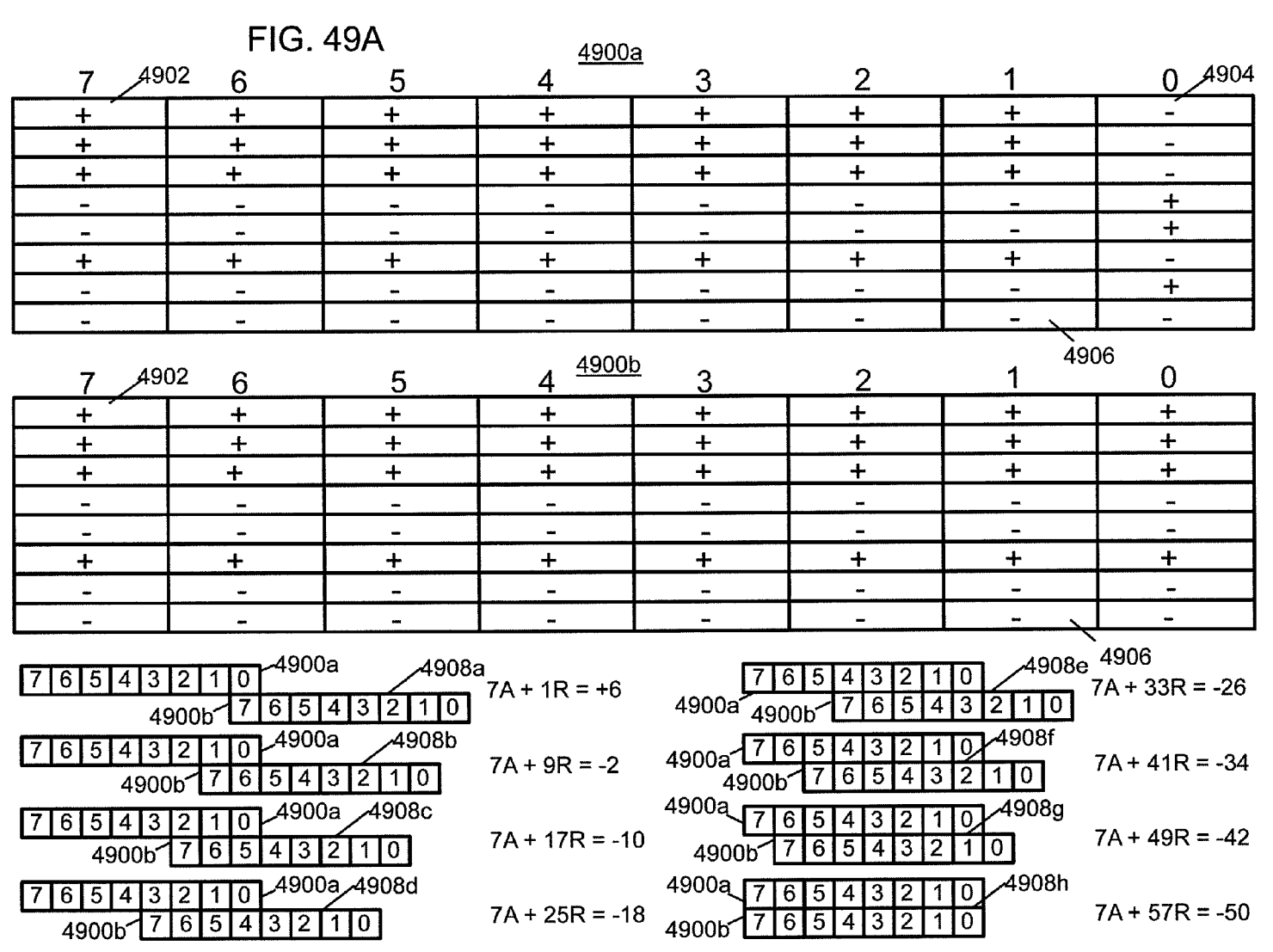

FIG. 49a depicts exemplary magnetic field structures designed to enable automatically closing drawers. The poles (+, −) depicted for the magnetic sources of the first magnetic field structure 4900a represent the values on the top of the structure as viewed from the top. The poles depicted for the magnetic sources of the second magnetic field structure 4900b represent the values on the bottom of the structure as viewed from the top. Each of the structures consists of eight columns numbered left to right 0 to 7. The first seven rows of the structures are coded in accordance with a Barker Length 7 code 4902 or the mirror image of the code 4094. The eighth row of each structure is a biasing magnet 4906. At the bottom of FIG. 49*a*, eight different alignments 4908*a* through 4908*h* of the two magnetic field structures 4900*a* 4900*b* are shown with the magnetic force calculated to the right of each depicted alignment. One skilled in the art will recognize that if the first structure 4900*a* was attached to a cabinet and the second structure 4900*b* was attached to a drawer, that a first alignment position 4908*a* having a +6 magnetic force might be the closed position for the drawer and each of the other seven positions 4908*b* through 4908*h* represent open positions having a successively increasing repelling force. With this arrangement, a person could open the drawer and release it at any open position and the drawer would automatically close.

Figure 49B:
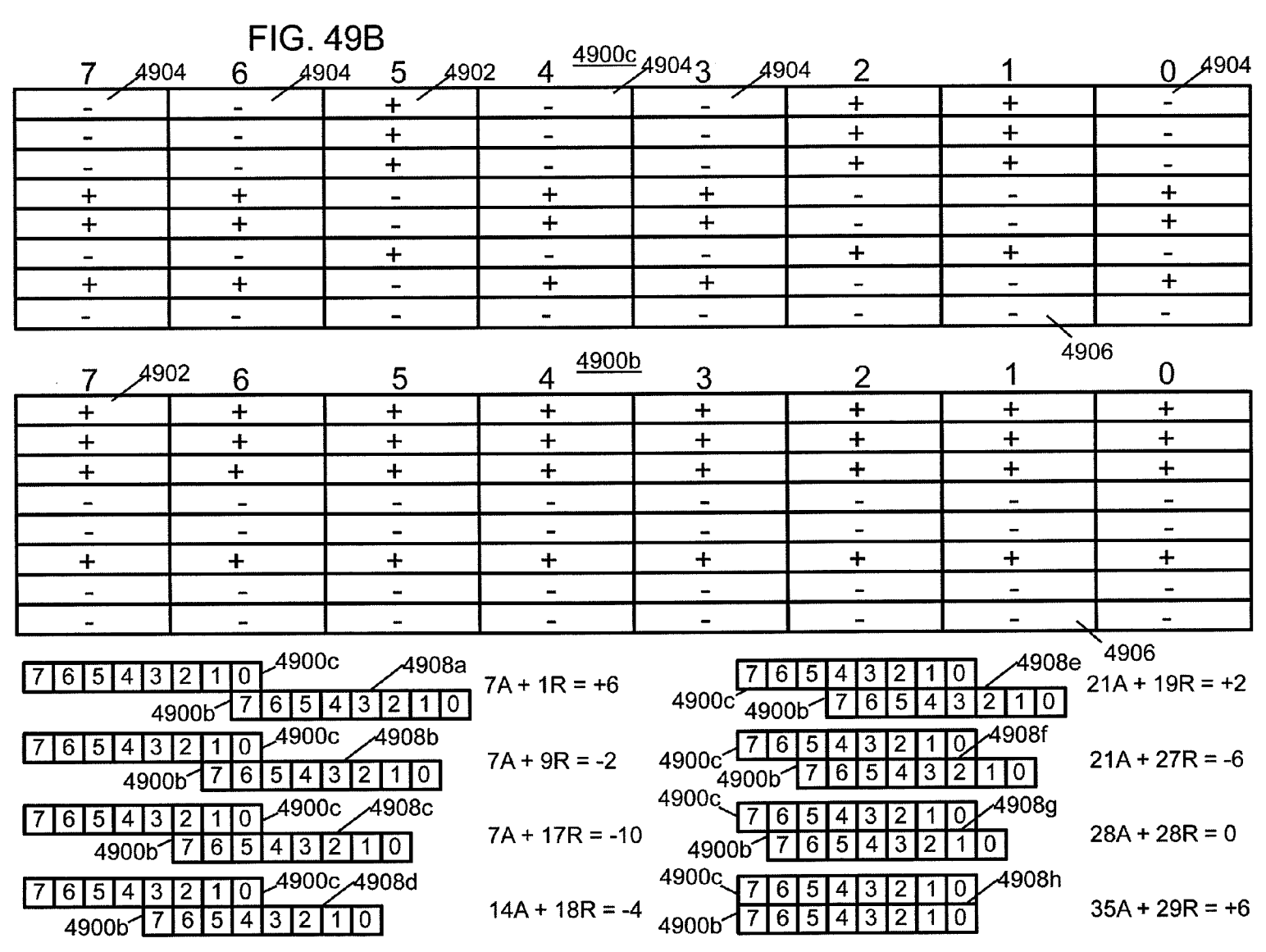

FIG. 49*b* depicts an alternative example of magnetic field structures enabling automatically closing drawers. Referring to FIG. 49*b*, a third magnetic field structure 4900*c* is shown in place of the first magnetic field structure 4900*a* of FIG. 49*a*, where the magnet sources of columns 3, 4, 6, and 7 are changed from the being coded in accordance with the Barker Length 7 code 4902 to being coded to be the mirror image of the code 4904. With this arrangement, the drawer has a closed position 4908*a*, a half open position 4908*e* and fully open position 4908*h* where the drawer will remain stationary. As such, the half open position can be described as being a detent position. Generally, one skilled in the art will recognize that magnetic field structures can be designed such as in FIGS. 49*a* and 49*b* so as to cause a first object to move relative to a second object due to spatial forces produced by the magnetic field structures.

Figure 50:
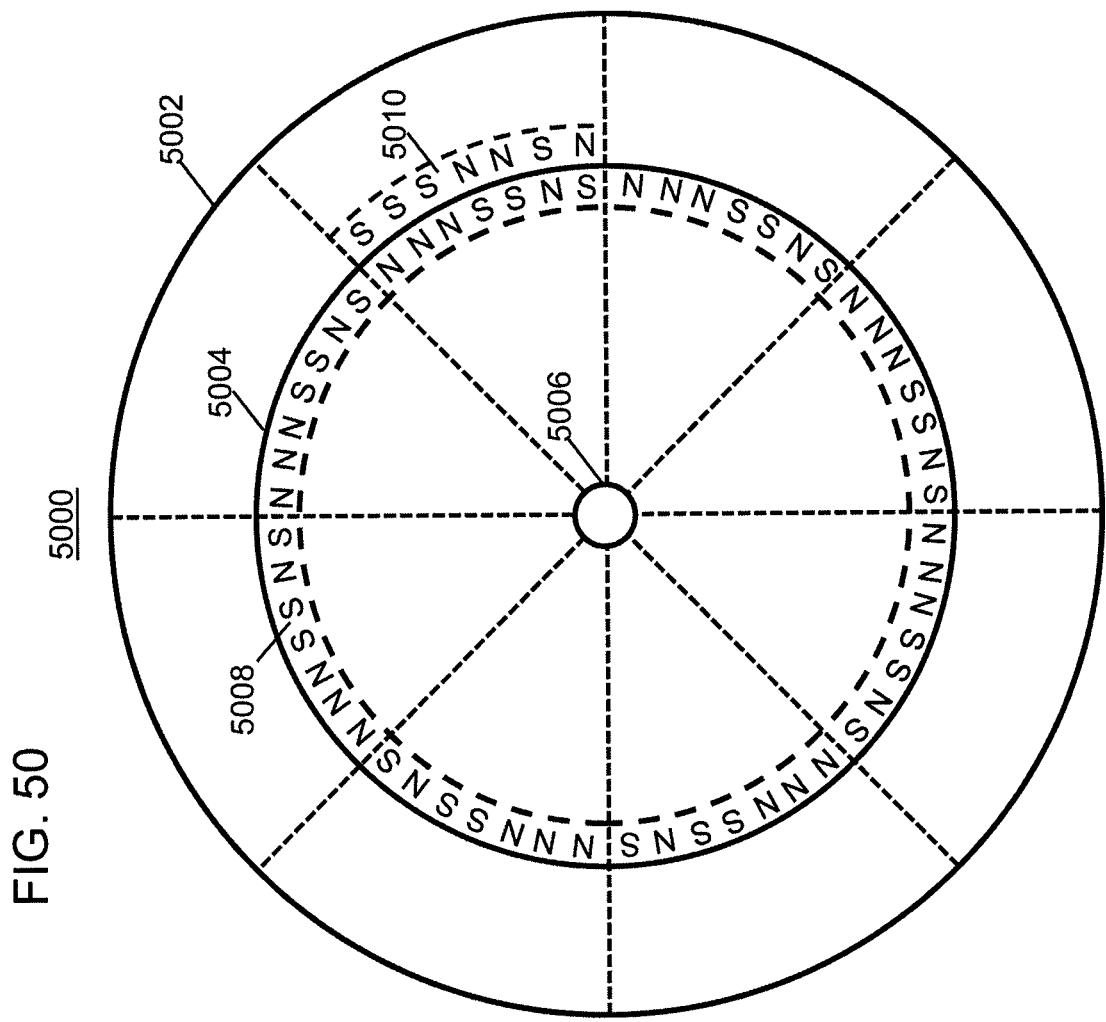
FIG. 50 depicts exemplary circular magnetic field structures.

FIG. 50 depicts an exemplary circular magnetic field structure. Referring to FIG. 50, a first circular object 5002 is attached to a second circular object 5004 such that at least one of the first circular object 5002 or the second circular object can move about an axis 5006. As shown, a first magnetic field structure 5008 comprises eight code modulos of a Barker Length 7 code oriented in a circle such that they form a continuous structure. A second magnetic field structure 5010 is also coded in accordance with the Barker Length 7 code such that it is the mirror image of any one of the eight code modulos of the first magnetic field structure 5008. The second magnetic field structure is shown being alongside the first magnetic field structure but can be above or below it depending on how the two objects are oriented. The second magnetic field structure could alternatively span multiple code modulos of the first magnetic field structure to include all eight code modulos. Additional magnetic field structures like 5010 could also be employed. Other alternatives include multiple rings such as the first magnetic field structure 5008 having different radiuses. The arrangement depicted in FIG. 50 is useful for applications such as a Lazy Susan, a roulette wheel, or a game wheel such as that used in the "Wheel of Fortune" or "The Price is Right" game shows.

FIGS. 51*a* and 51*b* depict a side view and a top view of an exemplary mono-field defense mechanism, respectively, which can be added to the two-sided attachment mechanism depicted in FIGS. 40*a* and 40*b*. Referring to FIGS. 51*a* and 51*b*, the two-sided attachment mechanism includes first and second magnetic field structures 4002*b* and 4002*c* that turn together about an axis 4005. A key (not shown) having a magnetic field structure having the same code as the second magnetic field structure 4002*c* is used to turn the two-sided attachment mechanism such that the first magnetic field structure 4002*b* having a different code will release from a similarly coded magnetic field structure attached to an object, for example a window. One approach that might be used to defeat the unique key is to use a large magnet capable of producing a large mono-field. If the mono-field were large enough then it could potentially attach to the second magnetic field structure 4002*c* in order to turn the two-sided mechanism. Shown in FIGS. 51*a* and 51*b* is a defense mechanism 5102 consists of a piece of ferromagnetic material 5102 having a first tab 5104 and two second tabs 5106*a* and 5106*b*. The two attachment tabs 5106*a* and 5106*b* normally reside just above two first slots 5108*a* and 5108*b* that are in the top of the side of the two-sided attachment mechanism that includes the second magnetic field structure 4002*c*. The defense mechanism 5102 normally is situated alongside or even attached to the bottom of the side of the two-side attachment mechanism that includes the first magnetic field structure 4002*b*. It is configured to move downward when a large mono-field is applied to the second magnetic field structure 4002*c*. As such, when defense mechanism 5102 moves downward, the two second tabs 5106*a* and 5106*b* move into two first slots 5108*a* and 5108*b* and the first tab moves into a second slot 5114 associated with an object 5112 within which the two-sided attachment mechanism is installed thereby preventing the two-sided attachment mechanism from turning. When the large mono-field is removed, the defense mechanism moves back up to its normal position thereby allowing the two-sided attachment mechanism to turn when attached to an authentic key (or gripping) mechanism 4012. One skilled in the art will recognize that the arrangement of tabs and slots used in this exemplary embodiment can be modified within the scope of the invention. Furthermore, such defense mechanisms can be designed to be included in the region about the two-sided attachment mechanism instead of within it so as to perform the same purpose, which is to prevent the two-sided attachment mechanism from turning when in the presence of a large mono-field.

More generally, a defense mechanism can be used with magnetic field structures to produce a tension latch rather than a twist one. A tension latch can be unlocked when a key mechanism is brought near it and is properly aligned. Various arrangements can be used, for example, the key mechanism could be attached (magnetically) to the latch in order to move it towards or away from a door jamb so as to latch or unlatch it. With this arrangement, the defense mechanism would come forward when a mono-field is present, for example to cause a tab to go into a slot, to prevent the latch from being slid either way while the mono-field is present. One skilled in the art will recognize that the sheer force produced by two correlated magnetic structures can be used to move a latch mechanism from side-to-side, up-and-down, back-and-forth, or along any path (e.g., a curved path) within a plane that is parallel to the surface between the two structures.

Another approach for defending against a mono-field is to design the latch/lock such that it requires a repel force produced by the alignment of two magnetic field structures in order to function. Moreover, latches and locks that require movement of parts due to both repel and attract forces would be even more difficult to defeat with a large mono-field.

Exemplary applications of the invention include:
Position based function control.
Gyroscope, Linear motor, Fan motor.
Precision measurement, precision timing.
Computer numerical control machines.
Linear actuators, linear stages, rotation stages, goniometers, mirror mounts.
Cylinders, turbines, engines (no heat allows lightweight materials).
Seals for food storage.
Scaffolding.
Structural beams, trusses, cross-bracing.

Bridge construction materials (trusses).
Wall structures (studs, panels, etc.), floors, ceilings, roofs.
Magnetic shingles for roofs.
Furniture (assembly and positioning).
Picture frames, picture hangers.
Child safety seats.
Seat belts, harnesses, trapping.
Wheelchairs, hospital beds.
Toys—self assembling toys, puzzles, construction sets (e.g., Legos, magnetic logs).
Hand tools—cutting, nail driving, drilling, sawing, etc.
Precision machine tools—drill press, lathes, mills, machine press.
Robotic movement control.
Assembly lines—object movement control, automated parts assembly.
Packaging machinery.
Wall hangers—for tools, brooms, ladders, etc.
Pressure control systems, Precision hydraulics.
Traction devices (e.g., window cleaner that climbs building).
Gas/Liquid flow rate control systems, ductwork, ventilation control systems.
Door/window seal, boat/ship/submarine/space craft hatch seal.
Hurricane/storm shutters, quick assembly home tornado shelters/snow window covers/vacant building covers for windows and doors (e.g., cabins).
Gate Latch—outdoor gate (dog proof), Child safety gate latch (child proof).
Clothing buttons, Shoe/boot clasps.
Drawer/cabinet door fasteners.
Child safety devices—lock mechanisms for appliances, toilets, etc.
Safes, safe prescription drug storage.
Quick capture/release commercial fishing nets, crab cages.
Energy conversion—wind, falling water, wave movement.
Energy scavenging—from wheels, etc.
Microphone, speaker.
Applications in space (e.g., seals, gripping places for astronauts to hold/stand).
Analog-to-digital (and vice versa) conversion via magnetic field control.
Use of correlation codes to affect circuit characteristics in silicon chips.
Use of correlation codes to effect attributes of nanomachines (force, torque, rotation, and translations).
Ball joints for prosthetic knees, shoulders, hips, ankles, wrists, etc.
Ball joints for robotic arms.
Robots that move along correlated magnetic field tracks.
Correlated gloves, shoes.
Correlated robotic "hands" (all sorts of mechanisms used to move, place, lift, direct, etc. objects could use invention).
Communications/symbology.
Snow skis/skateboards/cycling shoes/ski board/water ski/boots
Keys, locking mechanisms.
Cargo containers (how they are made and how they are moved).
Credit, debit, and ATM cards.
Magnetic data storage, floppy disks, hard drives, CDs, DVDs.
Scanners, printers, plotters.
Televisions and computer monitors.
Electric motors, generators, transformers.
Chucks, fastening devices, clamps.
Secure Identification Tags.
Door hinges.
Jewelry, watches.
Vehicle braking systems.
Maglev trains and other vehicles.
Magnetic Resonance Imaging and Nuclear Magnetic Resonance Spectroscopy.
Bearings (wheels), axles.
Particle accelerators.
Mounts between a measurement device and a subject (xyz controller and a magnetic probe)/mounts for tribrachs and associated devices (e.g., survey instruments, cameras, telescopes, detachable sensors, TV cameras, antennas, etc.)
Mounts for lighting, sound systems, props, walls, objects, etc.—e.g., for a movie set, plays, concerts, etc. whereby objects are aligned once, detached, and reattached where they have prior alignment.
Equipment used in crime scene investigation having standardized look angles, lighting, etc.—enables reproducibility, authentication, etc. for evidentiary purposes.
Detachable nozzles such as paint gun nozzle, cake frosting nozzle, welding heads, plasma cutters, acetylene cutters, laser cutters, and the like where rapid removable/replacement having desired alignment provides for time savings.
Lamp shades attachment device including decorative figurines having correlated magnets on bottom that would hold lamp shade in place as well as the decoration.
Tow chain/rope.
Parachute harness.
Web belt for soldiers, handyman, maintenance, telephone repairman, scuba divers, etc.
Attachment for extremely sharp objects moving at high rate of speed to include lawnmower blades, edgers, propellers for boats, fans, propellers for aircraft, table saw blades, circular saw blades, etc.
Seal for body part transfer system, blood transfer, etc.
Light globes, jars, wood, plastic, ceramic, glass or metal containers.
Bottle seal for wine bottle, carbonated drinks etc. allowing one to reseal a bottle to include putting a vacuum or a pressure on the liquid.
Seals for cooking instruments.
Musical instruments.
Attach points for objects in cars, for beer cans, GPS device, phone, etc.
Restraint devices, hand cuffs, leg cuffs.
Leashes, collars for animals.
Elevator, escalators.
Large storage containers used on railroads, ships, planes.
Floor mat clasps.
Luggage rack/bicycle rack/canoe rack/cargo rack.
Trailer hitch cargo rack for bicycles, wheelchairs.
Trailer hitch.
Trailer with easily deployable ramp/lockable ramp for cargo trailers, car haulers, etc.
Devices for holding lawnmowers, other equipment on trailers.
18 wheeler applications for speeding up cargo handling for transport.
Attachment device for battery compartment covers.
Connectors for attachment of ear buds to iPod or iPhone.
While particular embodiments of the invention have been described, it will be understood, however, that the invention is not limited thereto, since modifications may be made by those skilled in the art, particularly in light of the foregoing teachings.

The invention claimed is:

1. A field emission system, comprising:
   a first field emission structure, said first field emission structure comprising a first plurality of field emission sources having positions and polarities in accordance with a spatial force function, said positions and polarities of said first plurality of field emission sources being in accordance with a first plurality of codes; and
   a second field emission structure, said second field emission structure comprising a second plurality of field emission sources having positions and polarities in accordance with said spatial force function, said positions and polarities of said second plurality of field emission sources being in accordance with a second plurality of codes.

2. The system of claim 1, wherein said positions of said first plurality of field emission sources are in accordance with a first code.

3. The system of claim 2, wherein said first code corresponds to a Costas array.

4. The system of claim 3, wherein said Costas array corresponds to one of a Welch-Costas array or an array generated using the Lempel-Golomb technique.

5. The system of claim 3, wherein said Costas array is flipped vertically.

6. The system of claim 3, wherein said Costas array is flipped horizontally.

7. The system of claim 3, wherein rows and columns of said Costas array are transposed.

8. The system of claim 2, wherein said positions of said second plurality of field emission sources are in accordance with said first code.

9. The system of claim 2, wherein said polarities of said first plurality of field emission sources are in accordance with a second code.

10. The system of claim 9, where said second code is one of a Barker code, a Gold code, a Kasami sequence, a hyperbolic congruential code, a quadratic congruential code, a linear congruential code, a pseudorandom code, or a chaotic code.

11. The system of claim 1, wherein said polarities of said second plurality of field emission sources are in accordance with said second code.

12. The system of claim 1, wherein at least some of said polarities of said second plurality of field emission sources are different than said polarities of said first plurality of field emission sources.

13. The system of claim 1, wherein said first field emission structure is complementary to said second field emission structure.

14. The system of claim 1, wherein at least one of said first field emission structure or said second field emission structure comprises a permanent magnet, an electromagnet, an electret, a magnetized ferromagnetic material, a portion of a magnetized ferromagnetic material, a soft magnetic material, or a superconductive magnetic material.

15. The system of claim 1, wherein said spatial force function comprises a peak attractive force.

16. The system of claim 1, wherein said spatial force function comprises a peak repellant force.

17. A field emission system, comprising:
   a first field emission structure having a first plurality of field emission sources having positions and polarities in accordance with a first plurality of codes; and
   a second field emission structure having a second plurality of field emission sources having positions and polarities in accordance with a second plurality of codes, said first plurality of field emission sources and second plurality of field emission sources having positions and polarities in accordance with a desired spatial force function.

18. The system of claim 17, wherein said positions of said first plurality of field emission sources are in accordance with a first code.

19. The system of claim 18, wherein said polarities of said first plurality of field emission sources are in accordance with a second code.

20. The system of claim 17, wherein said first field emission structure is complementary to said second field emission structure.

* * * * *